(12) United States Patent
Swier

(10) Patent No.: US 11,673,331 B2
(45) Date of Patent: Jun. 13, 2023

(54) SUPPLY STATION FOR DISPENSING BUILD MATERIAL

(71) Applicant: HEWLETT-PACKARD DEVELOPMENT COMPANY, L.P., Spring, TX (US)

(72) Inventor: Kevin E Swier, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 194 days.

(21) Appl. No.: 16/609,320

(22) PCT Filed: Oct. 5, 2017

(86) PCT No.: PCT/US2017/055309
§ 371 (c)(1),
(2) Date: Oct. 29, 2019

(87) PCT Pub. No.: WO2019/070278
PCT Pub. Date: Apr. 11, 2019

(65) Prior Publication Data
US 2020/0230941 A1    Jul. 23, 2020

(51) Int. Cl.
| | |
|---|---|
| *B29C 64/357* | (2017.01) |
| *B33Y 30/00* | (2015.01) |
| *B33Y 40/00* | (2020.01) |
| *B22F 12/00* | (2021.01) |
| *B22F 12/50* | (2021.01) |
| *B22F 12/90* | (2021.01) |

(Continued)

(52) U.S. Cl.
CPC .......... *B29C 64/357* (2017.08); *B22F 12/226* (2021.01); *B22F 12/50* (2021.01); *B22F 12/90* (2021.01); *B33Y 30/00* (2014.12); *B33Y 40/00* (2014.12); *B22F 10/28* (2021.01); *B22F 2999/00* (2013.01); *B29C 64/153* (2017.08); *B29C 64/165* (2017.08); *B29C 64/255* (2017.08); *B29K 2105/251* (2013.01); *B33Y 50/02* (2014.12)

(58) Field of Classification Search
CPC ................ B29C 64/255; B29C 64/357; G03G 15/0877; G03G 15/0872; G03G 15/087; G03G 15/0867
See application file for complete search history.

(56) References Cited

U.S. PATENT DOCUMENTS

| | | | |
|---|---|---|---|
| 5,617,198 A | 4/1997 | Ishikawa et al. | |
| 5,915,151 A | 6/1999 | Kaneko et al. | |

(Continued)

FOREIGN PATENT DOCUMENTS

| | | |
|---|---|---|
| CN | 1316334 | 10/2001 |
| CN | 104007640 | 8/2014 |

(Continued)

*Primary Examiner* — Joseph S Del Sole
*Assistant Examiner* — Ariella Machness
(74) *Attorney, Agent, or Firm* — Shook, Hardy & Bacon L.L.P.

(57) ABSTRACT

A supply station for dispensing build material from a build material container is provided. The supply station includes a stationary support structure supporting a cylindrical cage along an axis, wherein the cylindrical cage is configured to be rotated in a first angular direction to dispense build material from the build material container.

14 Claims, 45 Drawing Sheets

(51) Int. Cl.
    *B33Y 50/02*   (2015.01)
    *B29C 64/255*  (2017.01)
    *B29C 64/153*      (2017.01)
    *B29C 64/165*      (2017.01)
    *B29K 105/00*      (2006.01)
    *B22F 10/28*       (2021.01)

(56) References Cited

U.S. PATENT DOCUMENTS

| | | |
|---|---|---|
| 6,118,951 A | 9/2000 | Kato et al. |
| 6,336,020 B1 | 1/2002 | Ishikawa et al. |
| 6,785,497 B1 * | 8/2004 | Hasebe ............ G03G 15/0886 222/DIG. 1 |
| 7,505,718 B2 | 3/2009 | Kawamura et al. |
| 8,406,652 B2 | 3/2013 | Funada et al. |
| 9,465,317 B2 | 10/2016 | Kikuchi |
| 2001/0045678 A1 | 11/2001 | Kubo |
| 2008/0181674 A1 * | 7/2008 | Kaiho ............... G03G 15/0872 399/262 |
| 2009/0140003 A1 | 6/2009 | Fontaine |
| 2009/0263146 A1 * | 10/2009 | Pearce ............... G03G 15/0877 399/27 |
| 2010/0209141 A1 * | 8/2010 | Ikado ................ G03G 21/1676 399/119 |
| 2012/0269537 A1 * | 10/2012 | Nakajima ......... G03G 15/0886 399/103 |
| 2012/0321341 A1 * | 12/2012 | Hori .................. G03G 15/0872 399/110 |
| 2013/0209134 A1 | 8/2013 | Kaisha |
| 2015/0321256 A1 | 11/2015 | Abe |
| 2016/0004185 A1 * | 1/2016 | Enokuchi ........... G03G 15/087 399/262 |
| 2016/0279871 A1 | 9/2016 | Kerl |

FOREIGN PATENT DOCUMENTS

| | | |
|---|---|---|
| CN | 106701530 | 5/2017 |
| JP | 2017052650 | 3/2017 |
| SU | 512146 A1 | 6/1976 |
| SU | 770973 A1 | 10/1980 |
| WO | WO2014039378 A1 | 3/2014 |
| WO | WO2016030417 A1 | 3/2016 |

* cited by examiner

600

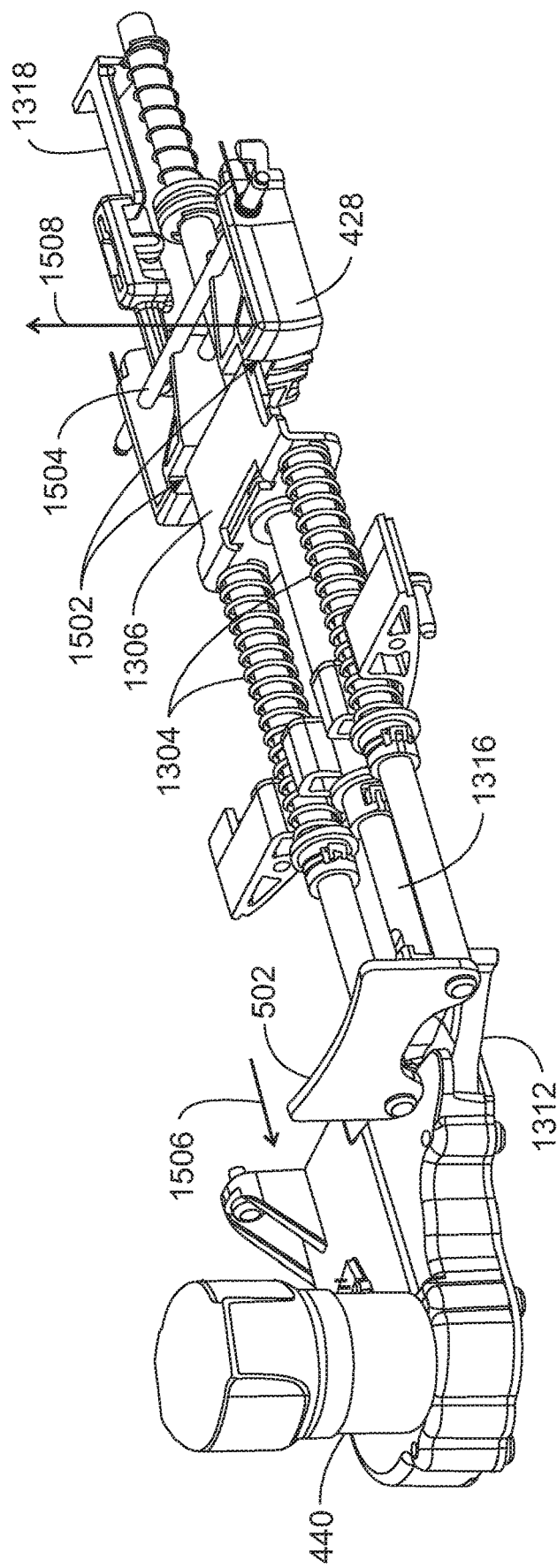

2800

456

456

SUPPLY STATION FOR DISPENSING BUILD MATERIAL

BACKGROUND

Three-dimensional (3D) printing may produce a 3D object by adding successive layers of build material, such as powder, to a build platform, then selectively solidifying portions of each layer under computer control to produce the 3D object. The build material may be powder, or powder-like material, including metal, plastic, ceramic, composite material, and other powders. In some examples the powder may be formed from, or may include, short fibers that may, for example, have been cut into short lengths from long strands or threads of material. The objects formed can be various shapes and geometries, and may be produced using a model, such as a 3D model or other electronic data source. The fabrication may involve laser melting, laser sintering, heat sintering, electron beam melting, thermal fusion, and so on. The model and automated control may facilitate the layered manufacturing and additive fabrication. The 3D printed objects may be prototypes, intermediate parts and assemblies, as well as end-use products. Product applications may include aerospace parts, machine parts, medical devices, automobile parts, fashion products, and other applications.

DESCRIPTION OF THE DRAWINGS

Certain examples are described in the following detailed description and in reference to the following drawings.

FIG. 15 is a drawing of the latching mechanism prior to release of the latch, in accordance with examples.

DETAILED DESCRIPTION

Figure 1:
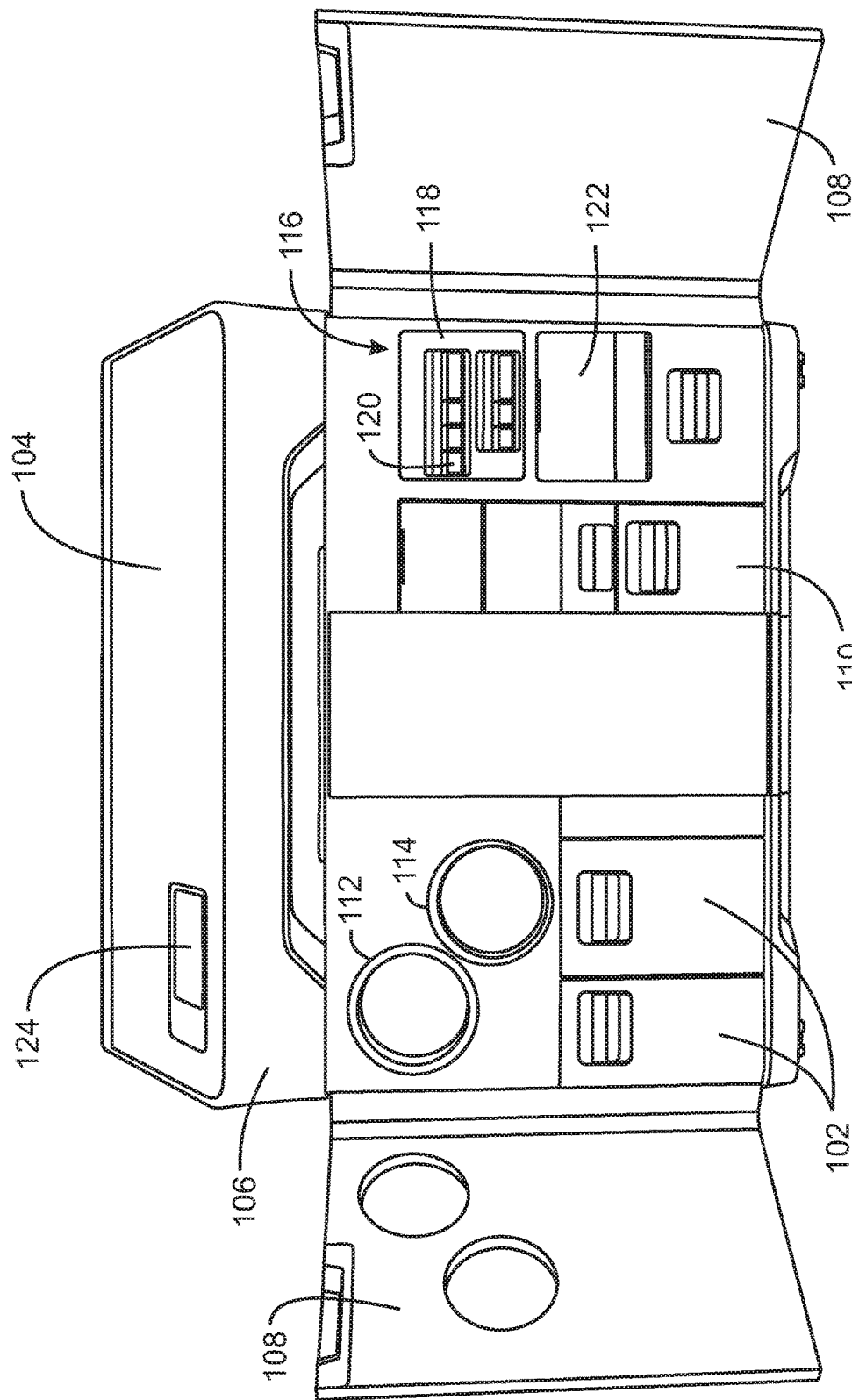
FIG. 1 is a drawing of a 3D printer, in accordance with examples.

Three dimensional printers may form 3D objects from different kinds of powder or powder-like build material. The cost of a 3D printer producing 3D objects may be related to the cost of the build material. Thus, there may be a desire for 3D printers to utilize recycled material as build material. Recycled build material may include, for example, build material that was used during a 3D printing process but which was not solidified during the 3D printing process. Such non-solidified build material may be recovered once a 3D printing process has completed and may be designated 'recycled build material' and reused in other 3D printing processes. For some applications, there may be benefit in utilizing new material because of reasons such as product purity, strength, and finish in certain instances. For some applications, a mix of new and recycled build material may be used, for example as a compromise between low cost and acceptable 3D object properties. For example, in some examples using about 20% new and about 80% recycled build material may be acceptable from both an economic and a quality perspective. Other proportions of new and recycled build material may be used depending on build material properties and acceptable object quality characteristics.

The build material may be a dry, or substantially dry, powder. In a three-dimensional printing example, the build material may have an average volume-based cross-sectional particle diameter size of between about 5 and about 400 microns, between about 10 and about 200 microns, between about 15 and about 120 microns or between about 20 and about 70 microns. Other examples of suitable, average volume-based particle diameter ranges include about 5 to about 70 microns, or about 5 to about 35 microns. As used herein, a volume-based particle size is the size of a sphere that has the same volume as the powder particle. The average particle size is intended to indicate that most of the volume-based particle sizes in the container are of the mentioned size or size range. However, the build material may include particles of diameters outside of the mentioned range. For example, the particle sizes may be chosen to facilitate distributing build material layers having thicknesses of between about 10 and about 500 microns, or between about 10 and about 200 microns, or between about 15 and about 150 microns. One example of a manufacturing system may be pre-set to distribute powdered material layers of about 80 microns using build material containers that include build material having average volume-based particle diameters of between about 40 and about 60 microns. An additive manufacturing apparatus may also be configured or controlled to form powder layers having different layer thicknesses.

As described herein, the build material can be, for example, a semi-crystalline thermoplastic material, a metal material, a plastic material, a composite material, a ceramic material, a glass material, a resin material, or a polymer material, among other types of build material. Further, the build material may include multi-layer structures wherein each particle comprises multiple layers. In some examples, a center of a build material particle may be a glass bead, having an outer layer comprising a plastic binder to agglomerate with other particles for forming the structure. Other materials, such as fibers, may be included to provide different properties, for example, strength.

To mix recycle material and new material as build material for some 3D printers, a user may employ extra floor space and equipment external to the 3D printer. A user may also rely on peripheral resources in the extraction of printed 3D objects from a 3D printer. However, the use of dedicated resources external to the printer for mixing of build material and for extraction may increase costs, space requirements, and the risk of spills. Further, manual handling of build material in mixing, addition, and extraction may result in the cross-contamination of build material.

Examples described herein provide supply stations, for example, for a 3D printer, to facilitate handling of build material. The supply stations provide for the addition of new or recycle build material to an internal or integrated material handling system from build material containers that are inserted into the supply stations. The supply stations are disposed along parallel horizontal axes to lower the space used for conveying systems used to move the build material and to make handling the containers easier, for example, in comparison to supply stations that may be mounted along a vertical axis.

As used herein, horizontal indicates that the supply stations are substantially parallel to the surface that the 3D printer is resting on. This may be within about five degrees of parallel to the surface, within about 10 degrees of parallel to the surface, or within about 20 degrees of parallel to the surface. Further, the 3D printer does not need to be completely level to operate, but may work when place on an uneven surface that is within about five degrees of level, within about 10 degrees of level, or within about 20 degrees of level.

The material handling system may mix recycle material and new material to provide a build material mix to be used in a 3D printing process. The 3D printers described herein may also provide for the recovery of excess or non-solidified build material at the end of a 3D printing process. The recovered material may be held in the printer for use in further build processes. In some examples, the recovered material may be moved into a build material container which may then be removed from the 3D printer for storage, recycling, or for later use.

FIG. 1 is a drawing of a 3D printer 100, in accordance with examples. The 3D printer 100 may be used to generate a 3D object from a build material, for example, on a build platform. The build material may be a powder, and may include a plastic, a metal, a glass, or a coated material, such as a plastic-coated glass powder, among others.

The printer 100 may have covers or panels over compartments 102 for internal material vessels that hold build material. The material vessels may discharge build material through feeders into an internal conveying system for the 3D printing. The printer 100 may have a controller to adjust operation of the feeders to maintain a desired composition of build material including a specified ratio of materials in the build material. The internal material vessels may be removable via user-access to the compartments 102. The printer 100 may have a housing and components internal to the housing for handling of build material. The printer 100 has a top surface 104, a lid 106, and doors or access panels 108. The access panels 108 may be locked during operation of the 3D printer 100. The printer 100 may include a compartment 110 for an additional internal material vessel such as a recovered material vessel that recovers unfused or excess build material from a build enclosure of the printer 100.

As described in detail herein, build material may be added or removed from the 3D printer through build material containers that are horizontally inserted into supply stations. The supply stations may include a new supply station 112 for the addition of new build material, and a recycle supply station 114 for the addition of recycled build material. As described in examples, the recycle supply station 114 may also be used to offload recovered build material, for example, from the recovered material vessel. In one example, a single supply station may be provided which may be used for both adding new build material and for removing recycled build material from the printer.

In some examples, the 3D printer 100 may use a print liquid for use in a selective fusing process, or other purposes, such as decoration. For examples of a 3D printer 100 that employ a print liquid, a print-liquid system 116 may be included to receive and supply print liquid for the 3D printing. The print-liquid system 116 includes a cartridge receiver assembly 118 to receive and secure removable print-liquid cartridges 120. The print liquid system 116 may include a reservoir assembly 122 having multiple vessels or reservoirs for holding print liquid collected from the print liquid cartridges 120 inserted into the cartridge receiver assembly 118. The print liquid may be provided from the vessels or reservoirs to the 3D printing process, for example, to a print assembly or printbar above a build enclosure and build platform.

The 3D printer 100 may also include a user control panel or interface 124 associated with a computing system or controller of the printer 100. The control interface 124 and computing system or controller may provide for control functions of the printer 100. The fabrication of the 3D object in the 3D printer 100 may be under computer control. A data model of the object to be fabricated and automated control may direct the layered manufacturing and additive fabrication. The data model may be, for example, a computer aided design (CAD) model, a similar model, or other electronic source. As described with respect to FIG. 29, the computer system, or controller, may have a hardware processor and memory. The hardware processor may be a microprocessor, CPU, ASIC, printer control card, or other circuitry. The memory may include volatile memory and non-volatile memory. The computer system or controller may include firmware or code, e.g., instructions, logic, etc., stored in the memory and executed by the processor to direct operation of the printer 100 and to facilitate various techniques discussed herein.

Figure 2:
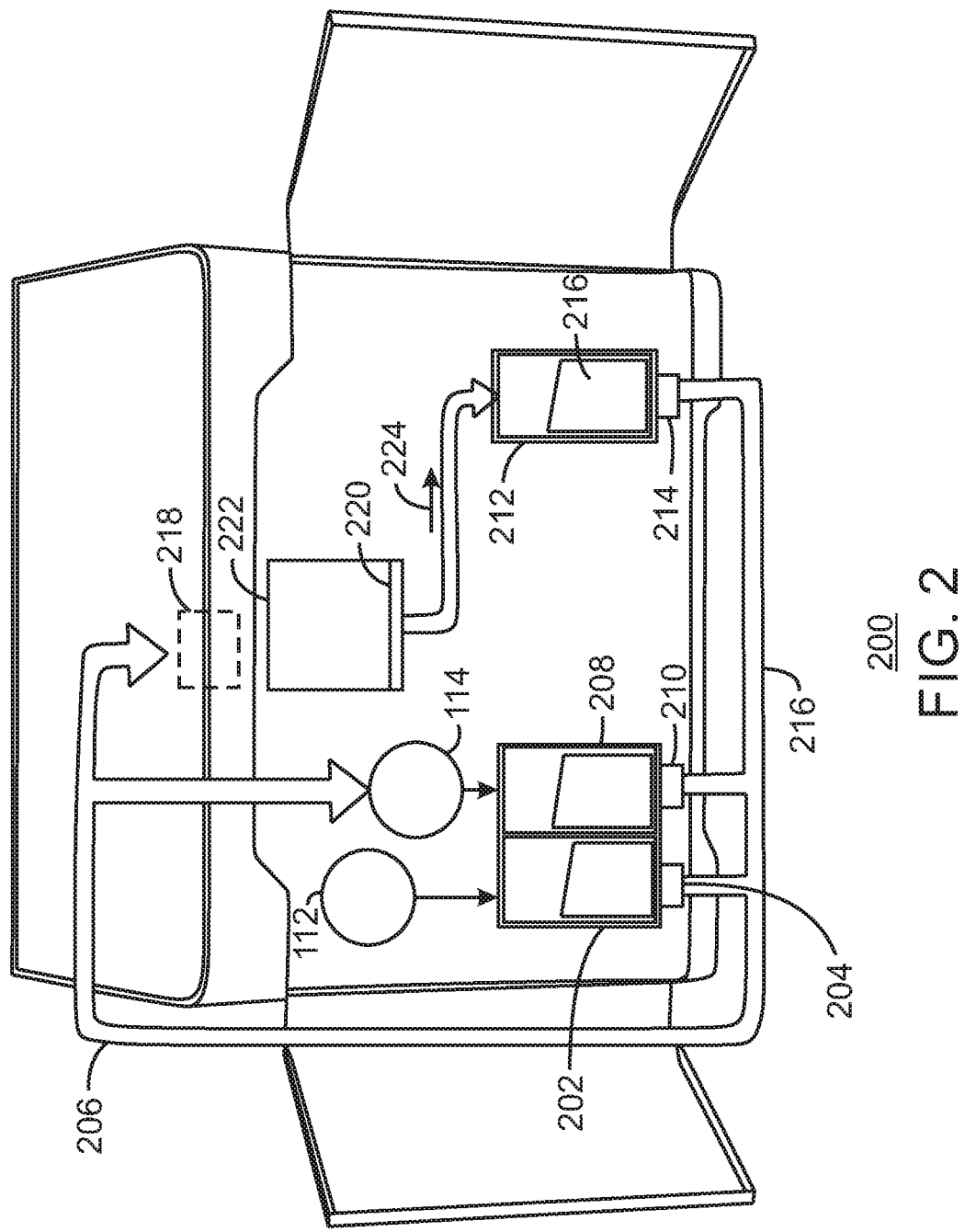
FIG. 2 is a schematic diagram of a 3D printer having a new material vessel that discharges new build material through a new feeder into a conveying system, in accordance with examples.

FIG. 2 is a schematic diagram of a 3D printer 200 having an internal new material vessel 202 that discharges new build material through a new feeder 204 into a conveying system 206, in accordance with examples. Like numbered items are as described with respect to FIG. 1. The printer 200 may include a recycle material vessel 208 to discharge recycle build material through a recycle feeder 210 to the conveying system 206. The printer 200 may have a controller to adjust operation of the feeders 204, 210 to maintain a composition and discharge rate of the build material for the 3D printing. Further, the printer 200 may include a recovered material vessel 212 to discharge recovered material 216 through a recovery feeder 214 into the conveying system 206. The conveying system 206 may transport the build material to a dispense vessel 218 which may supply build material for 3D printing. In the illustrated example, the dispense vessel 218 is disposed in an upper portion of the 3D printer 200. Moreover, although the conveying system 206 for the build material is depicted outside of the 3D printer 200 for clarity in this schematic view, the conveying system 206 is internal to the housing of the printer 200.

The 3D printer 200 may form a 3D object from the build material on a build platform 220 associated with a build enclosure 222. The 3D printing may include selective layer sintering (SLS), selective heat sintering (SHS), electron beam melting (EBM), thermal fusion, and fusing agent, or other 3D printing and additive manufacturing (AM) technologies to generate the 3D object from the build material. Recovered build material 224, for example, non-solidified or excess build material, may be recovered from the build enclosure 222. The recovered build material 224 may be treated and returned to the recovered material vessel 212.

Further, the printer 200 may include a new supply station 112 and a recycle supply station 114 to hold build material containers inserted by a user along a horizontal, or generally horizontal, axis. The supply stations 112 and 114 may provide new or recycled build material for the 3D printing to the new and recycle material vessels 202 and 208, respectively. Further, the conveying system 206 may return recovered material 216 to the recycle supply station 114. The recovered material 216 may be offloaded by being added to a build material container inserted in the recycle supply station 114, or may be diverted through the recycle supply station 114 to the recycle material vessel 208.

Lastly, as noted, the build material including the first material and the second material may be powder. A powder may be a granular material with a narrow size distribution, such as beads, or other shapes of small solids that may flow and be conveyed in an air stream. As used herein, the term "powder" as build material can, for example, refer to a powdered, or powder-like, material which may be layered and sintered via an energy source or fused via a fusing agent, or a fusing agent and energy source in a 3D printing job. In some examples, the build material may be formed into a shape using a chemical binder, such as a solvent binder or a reaction promoter. The build material can be, for example, a semi-crystalline thermoplastic material, a metal material, a plastic material, a composite material, a ceramic material, a glass material, a resin material, or a polymer material, among other types of build material.

Figure 3:
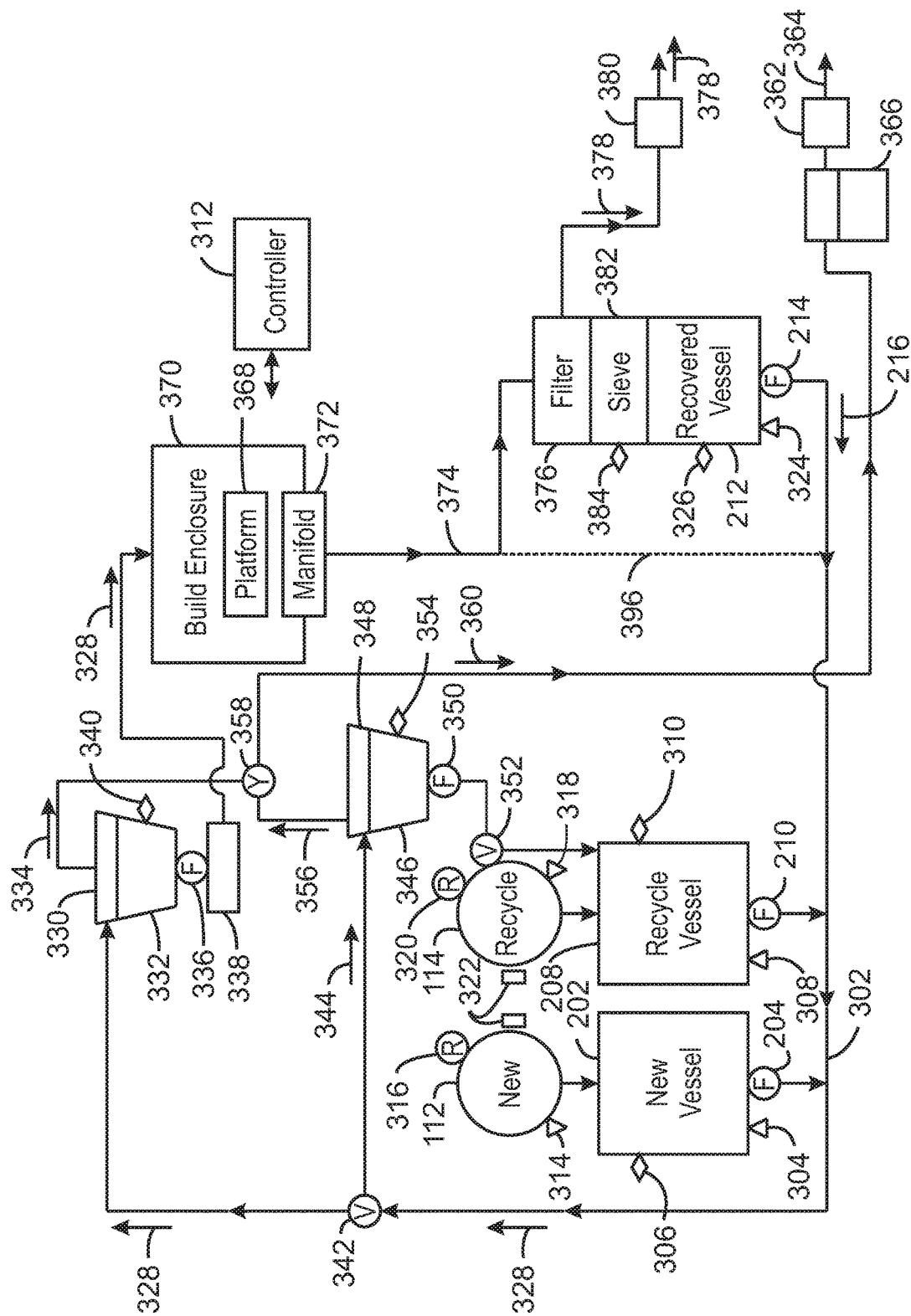
FIG. 3 is a block diagram of a 3D printer, in accordance with examples.

FIG. 3 is a block diagram of a 3D printer 300, in accordance with examples. Like numbered items are as described with respect to FIGS. 1 and 2. As shown in this drawing, material flows are shown by labelled arrows placed along conveying lines or conduits, which may be separately labeled. In this example, the 3D printer 300 may have a new material vessel 202 that discharges new material through a feeder 204, such as a rotary feeder, auger, or screw feeder, into a first conveying system 302, which may be a pneumatic conveying system. The feeder 204 may drop the new material into a conduit of the conveying system 302. The feeder 204 may meter or regulate material discharge or otherwise facilitate dispensing of the desired amount of new material from the new material vessel 202 into the first conveying system 302. In addition, the 3D printer 300 may include a recycle material vessel 208 that discharges recycle material through a feeder 210 into the first conveying system 302.

The new material vessel 202 may have a weight sensor 304 and a fill level sensor 306. Likewise, the recycle material vessel 208 may have a weight sensor 308 and a fill level sensor 310. A controller 312 of the printer 300, as described with respect to FIG. 29, may adjust operation of the feeders 204 and 210 in response to indications of material discharge amount or rate provided by the weight sensors 304 and 308. The controller may adjust operation of the feeders 204 and 210 to maintain a desired ratio of new material to recycle material. In examples described herein, the controller 312 may control the dispensing of build material from a build material container, or the offloading of build material to a build material container.

The 3D printer 300 may include a new supply station 112 to hold a build material container for adding new build material in a cylindrical cage, along a horizontal axis. The new material vessel 302 may receive new build material from the build material container held by the new supply station 112. As described herein, the new supply station 112 may include several sensors and actuators to determine if a build material container is present, and control the dispensing of build material from the build material container. The sensors may include a weighing device 314 that may be used to determine the weight of the new supply station 112 and the build material container. The actuators may include a motor 316 to rotate the cylindrical cage in a first angular direction to dispense build material to the new material vessel 202.

The number of rotations of the cylindrical cage may be used to control the dispensing of an expected amount of build material from a build material container. Accordingly, the motor 316 may be a stepper motor, a servo motor, or other type of motor that may be used to control the number of revolutions and the speed of the rotation. In some examples, a motor having a controlled speed, such as a motor control using pulse width modulation or pulse frequency modulation, may be used with a sensor that counts the number of revolutions. For example, a base position sensor as described herein may be used to count the revolutions.

The 3D printer 300 may include a recycle supply station 114 to hold a build material container for recycled material. As described for the new supply station 112, the recycle supply station 114 may include several sensors and actuators to determine if a build material container is present, and control the dispensing of recycled build material from the build material container, for example, into a recycled material vessel. The sensors may include a weighing device 318 that may be used to determine the weight of the recycle supply station 114 and a build material container. The actuators may include a motor 320 to rotate the cylindrical cage in a first angular direction to dispense build material to the recycle material vessel 208. The recycle supply station 114 may also rotate the cylindrical cage in a second angular direction, opposite the first angular direction, to add recovered or recycled material to the build material container.

The new supply station 112 and the recycle supply station 114 may also include several other sensors and actuators 322 to provide functionality, as described in greater detail herein. The other sensors and actuators 322 may include a latching sensor to determine if a build material container is secured in a supply station, and a position sensor to determine if a build material container is in a base position, among others. As used herein, a base position is an initial position of the build material container after insertion into a supply station 112 or 114. In the base position, sensors and actuators 322 on a support structure may interact with the cylindrical cage. Further, the sensors and actuators 322 may include actuators to actuate a valve on the build material container, for example, opening or closing the valve, or advance the read head to an information chip on a build material container, among others.

As described herein, the printer 300 may include a recovered material vessel 212 which discharges recovered material 216 through a recovery feeder 214 into the first conveying system 302. The recovered material vessel 212 may have a weight sensor 324 and a fill level sensor 326. Accordingly, the build material 328 may include recovered material 216 from the recovered material vessel 212 in addition to the recycle material from the recycle material vessel 208 and new material from the new material vessel 202.

Conveying air may flow through the first conveying system 302. An air intake such as a filtered manifold or an open conduit as may receive, pull in, and/or filter air (e.g., ambient air) as conveying air for the first conveying system 302. The air may also be used for the second conveying system discussed below. The first conveying system 302 may transport the build material 328, e.g., a mix of new material, and recycle material from the vessels 202 and 208, respectively. In some instances, the build material 328 may also include recovered material 216. In the illustrated example, the first conveying system 302 may convey the build material 328 to a separator 330 associated with a dispense vessel 332. The dispense vessel 332 may be a feed hopper. The separator 330 may include a cyclone, a screen, a filter, and the like. The separator 330 may separate conveying air 334 from the build material 328.

After the conveying air 334 has been separated, the build material 328 may flow into the dispense vessel 332. A feeder 336 may receive build material from the dispense vessel 332 and discharge the build material to a build material handling system 338 for the 3D printing. The dispense vessel 332 may have a fill level sensor 340. The fill level sensor 340 may measure and indicate the level or height of build material in the dispense vessel 332.

The first conveying system 302 may divert build material 328 via a diverter valve 342. The diverted material 344 may be sent to an alternate vessel 346 through a separator 348 such as cyclone, filter, etc. The alternate vessel 346 may discharge the diverted material 344 through a feeder 350 and diverter valve 352 to either a build material container in the supply station 114, or to the recycle material vessel 208. As described in examples herein, the diverter valve 352 may be part of a valve mechanism used to dispense recycled build material from a build material container.

This diversion of build material 328 by diverter valve 342 as recycle material 344 may occur, for instance, when the build material 328 is primarily recycle material or recovered material 216. This may be performed to offload material, for example, by diverting the material through diverter valve 352 to a build material container. In other examples, the recycle material 344 may be sent by the diverter valve 352 to the recycle material vessel 208. As with other material vessels, the alternate vessel 346 may have a fill level sensor 354.

The separator 348 associated with the alternate vessel 346 may remove conveying air 356 from the build material 328. After the conveying air 356 is removed from the build material 328, the build material 328 may discharge from the separator 348 into the alternate vessel 346. In the illustrated example, the conveying air 356 from the separator 348 may flow to a Y-fitting 358, where the conveying air 356 is combined with the conveying air 334 from the separator 330 associated with the dispense vessel 332. The Y-fitting 358 may be a conduit fitting having two inlets and one outlet. The combined conveying air 360 may be pulled from the Y-fitting 358 by a motive component 362 of the first conveying system 302 and discharged 364 to the environment or to additional equipment for further processing. In some examples, the combined conveying air 360 may flow through a filter 366 as it is being pulled out by the motive component 362. The filter 366 may remove particulates from the conveying air 360 before it is discharged 364.

The motive component 362 applies motive force for the conveying air in the first conveying system 302 to transport build material. The motive component 362 may be an air blower, eductor, ejector, vacuum pump, compressor, or other motive component. Because the first conveying system 302 is generally a pneumatic conveying system, the motive component may typically include a blower such as a centrifugal blower, fan, axial blower, and the like.

As for the 3D printing, as mentioned, the dispense vessel 332 may discharge the build material 328 through a feeder 336 to the build material handling system 338. The feeder 336 and the build material handling system 338 may provide a desired amount of build material 328 across a build platform 368, for example, in layers. The build material handling system 338 may include a feed apparatus, dosing device, build-material applicator, or powder spreader, and the like, to apply the build material to the build platform 368 in the build enclosure 370. The printer 300 may form a 3D object from build material 328 on the build platform 368.

After the 3D object is complete or substantially complete on the build platform 368, a vacuum manifold 372 may remove excess build material from the build enclosure 370 into a second conveying system 374 as recovered material. In some examples, a second conveying system 374 is not used. For example, the excess build material may be offloaded with the 3D object or removed by a stand-alone vacuum.

If the second conveying system 374 is used, it may convey the recovered material through a cyclone or filter 376 to separate the recovered material from the conveying air 378. The conveying air 378 is discharged through a motive component 380 of the second conveying system 374. A filter may be included to remove particulates from the conveying air 378. The motive component 380 may be a blower, fan, eductor, ejector, vacuum pump, or other type of motive component. In this example, the recovered material may discharge from the cyclone or filter 376 and enter a sieve 382 where larger particles, such as solidified build material not incorporated into the 3D object, may be removed. The sieve 382 may have a fill level sensor 384 which monitors the level or height of solid material in the sieve 382.

After separation of the larger particles, the recovered build material may enter the recovered material vessel 212. In some examples, the recovered material may bypass the cyclone or filter 376, sieve 382, and recovered material vessel 212 and flow into a conduit of the first conveying system 302, as indicated by the dashed line 396. The vessels, conveying systems, and associated equipment of the 3D printer 300 may include instrumentation such as pressure sensors and temperature sensors, and the like.

The 3D printer 300 may fabricate objects as prototypes or products for aerospace (e.g., aircraft), machine parts, medical devices (e.g., implants), automobile parts, fashion products, structural and conductive metals, ceramics, and so forth. In one example, the 3D objects formed by the 3D printer 300 are mechanical parts which may be metal or plastic, and which may be equivalent or similar to mechanical parts produced by other fabrication techniques, for example, injection molding or blow molding, among others.

Examples provided herein describe supply stations for moving build material into and out of a 3D printer. The material may be provided in build material containers, which may be purchased with new build material and used for recycle build material once empty. For further flexibility, build material containers may be purchased when empty to store build material offloaded from the 3D printer. This may be convenient when changing the type of build material used in the 3D printer.

To perform these functions, a build material container may be horizontally, or substantially horizontally, secured in a cylindrical cage supported in a stationary support structure in the supply station. The supply station may open a valve in a center of an end of the build material container by sliding the valve outward along a horizontal axis. The supply station may then move material in or out of the build material container by rotating, in an appropriate direction, the cylindrical cage around the horizontal axis. Rotating the cylindrical cage in a first angular direction may be used to dispense build material from a build material container, while rotating the cylindrical cage in a second, or opposite, angular direction may be used to add build material back into the build material container. These operations are discussed in greater detail with respect to the FIGS. 4A and 4B.

FIGS. 4A and 4B are schematic views of the supply stations 112 and 114 for a 3D printer, in accordance with examples. Like numbered items are as described with respect to FIGS. 1 and 3. In FIG. 4A, the new supply station 112 may be located at a slightly higher level than the recycle supply station 114, as the new supply station 112 is not configured to add recycle material to a build material container, and, thus, has less need for space above the new supply station 112. In contrast, the recycle supply station 114 may dispense recycle build material 404 or may accept recovered build material 406. The angled placement of the supply stations 112 and 114 shown in FIG. 4A, for example, with the new supply station 112 at a higher level, may allow the supply stations 112 and 114 to be placed closer together, further saving space in the 3D printer.

Each of the supply stations 112 and 114 has a stationary support structure 408 holding a cylindrical cage 410. A drive motor 409 may be used to rotate the cylindrical cage 410 in the respective supply station 112 or 114. For the recycle supply station 114, the drive motor 409 may rotate the cylindrical cage 410 in either angular direction for dispensing build material from, or adding build material to, the build material container.

In both supply stations 112 and 114, the cylindrical cage 410 has a flat surface 412. A build material container 414 has a corresponding flat surface 416 on the bottom, which rests on the flat surface 412 of the cylindrical cage 410. Accordingly, the build material container 414 may be inserted 418 into a supply station along a horizontal axis 420 as shown for the recycle supply station 114 in FIG. 4B. The flat surface 412 orients the build material container 414 in a base position in the supply station 112 or 114. The base position helps to align a reading head 422 with an information chip 424 mounted to the build material container 414.

As the build material container 414 is inserted in the supply station 112 or 114 a latch mechanism 426 may release a latch 428 which engages a corresponding indentation 430 in the build material container 414. Once the latch 428 is engaged, as determined by a latching sensor 432, the reading head 422 may be advanced towards the information chip 424 by a reader motor 434. A brake 436 may be used to hold the cylindrical cage 410 in a base position while the information chip 424 is read or written. In some examples described herein, the brake 436 may be applied as the reading head 422 is moved towards the information chip 424. The determination that the cylindrical cage 410 is in the base position may be made by a position sensor 438. If the information on the information chip 424 indicates a problem, such as an incorrect material type in the build material container 414, a latch motor 440 may be used to retract and release the latch 428, to allow the build material container 414 to be removed.

If the information on the information chip 424 indicates that the material is type is correct, the build material container 414 may be weighed. This may be performed using a strain gauge 442 on the supply station 112 or 114. The stationary support structure 408 may be mounted in the printer using a pivot rod 444. The pivot rod 444 may allow the stationary support structure 408 to rest against the strain gauge 442. As described herein, the build material in the build material container 414 may not be level, and, thus, the cylindrical cage 410 may be rocked back and forth using the motor 409 and stopping at a high point on each side to take a reading from the strain gauge 442. These readings may be averaged to determine a weight for the stationary support structure 408, which may then be used to determine the weight of the build material container 414. If the weight of the build material container 414 does not match an expected weight, as read from the information chip 424, the cylindrical cage 410 may be returned to the base position, and the latch motor 440 may retract and release the latch 428, to allow the build material container 414 to be removed. In examples, a match in the expected weight to the measure weight may be within a range of about 5%, within about 10%, or within about 15%. The range of the error for the match may be selected based on the material involved, for example, a material that has an increased rate of self-agglomeration may have a higher critical angle, leading to an increased error in weight measurement. This may make the selection of a higher error range more appropriate. Conversely, a material that flows easily may have a very low critical angle, making the weight measurement more accurate, leading to the selection of a decreased error range for the match. This may prevent use of a build material container that has been refilled with build material from outside of the 3D printer where it may not be possible to verify the type of material added to a build material container. This helps prevent non-compatible or non-suitable build materials from being used in the 3D printer.

The new supply station 112 has a dispense valve mechanism 446 to open an auger valve 448 on a build material container 414. Rotating the cylindrical cage holding the build material container 414, for example, in a clockwise direction, may then be used to dispense new build material 402 from the build material container 414. As the build material container 414 is rotated, spiral inset grooves 450 molded into the build material container 414 may move build material towards the front of the build material container 414. An Archimedes screw 452 positioned in a head 454 of the build material container 414 may convey material from the sidewalls of the build material container 414 to the auger valve 448 in the center of the head 454. The auger valve 448 may then convey the material into the dispense valve mechanism 446. Once the desired amount of material has been dispensed, for example, as determined by a set number of rotations of the build material container 414, the dispense valve mechanism 446 may then close the auger valve 448.

Similarly, the recycle supply station 114 has a diverter valve mechanism 456. The diverter valve mechanism 456 may work in a similar fashion to the dispense valve mechanism 446 of the new supply station 112 when dispensing material. However, the diverter valve mechanism 456 may also allow the offloading of recovered build material 406 to a build material container 414. When the diverter valve mechanism 456 opens the auger valve 448 on the build material container 414, a diverter valve may direct recovered build material 406 onto the auger valve 448. The cylindrical cage holding the build material container 414 may be rotated in the opposite direction from the dispense function, for example, in a counterclockwise direction. The auger valve 448 that conveys the material to the Archimedes screw 452 which directs the material to the sidewalls of the build material container 414. The grooves in the build material container 414 may help convey material from the Archimedes screw 452 back into the build material container 414.

Further, the offloading function may be performed at a faster rotational rate than the dispense function. For example, the dispense function may be performed by rotating the cylindrical cage 410 holding the build material container 414 in a first angular direction at around 60 revolutions per minute (rpm), 45 rpm, 30 rpm, or less. In contrast, the offloading, or refilling, function may be performed by rotating the cylindrical cage 410 holding the build material container 414 in a second angular direction at around 90 rpm, 120 rpm, or higher.

The diverter valve mechanism 456 may also be used to bypass the build material container 414. For example, when the diverter valve mechanism 456 is in the closed position for an auger valve 448, the diverter valve may direct recovered build material 406 past the recycle supply station 114, as indicated by line 458, and into the recycle material vessel 208, described with respect to FIG. 2.

More detailed examples of the structural features described with respect to FIGS. 4A and 4B are shown in the following figures. It can be noted that while the figures provide examples for implementation that include detailed structures, the claims are not limited to the structures shown in examples, but cover other structures that implement the same operations. For example, the cylindrical cage 410 may be replaced by cages having other geometric profiles. Further, in some examples, the build material container 414 may be directly rotated without the use of a cylindrical cage 410.

Figure 4:
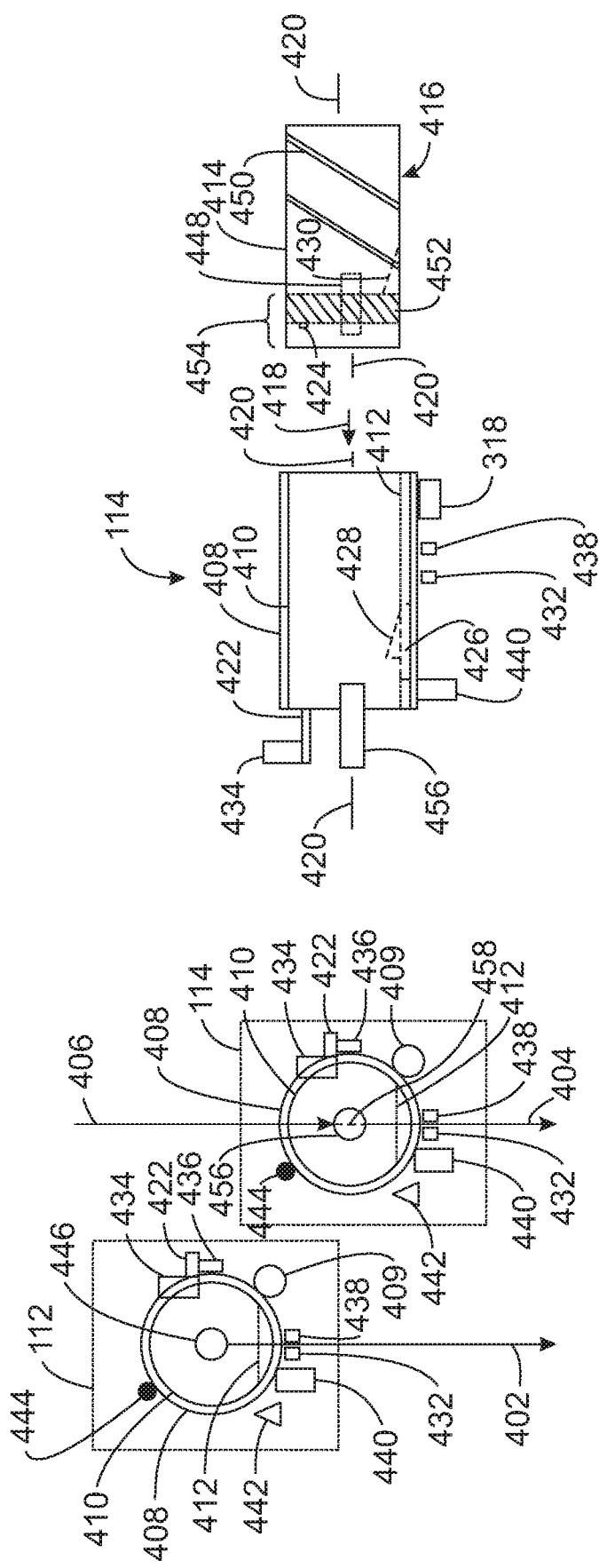
FIGS. 4A and 4B are schematic views of the supply stations for a 3D printer, in accordance with examples.
Figure 5:
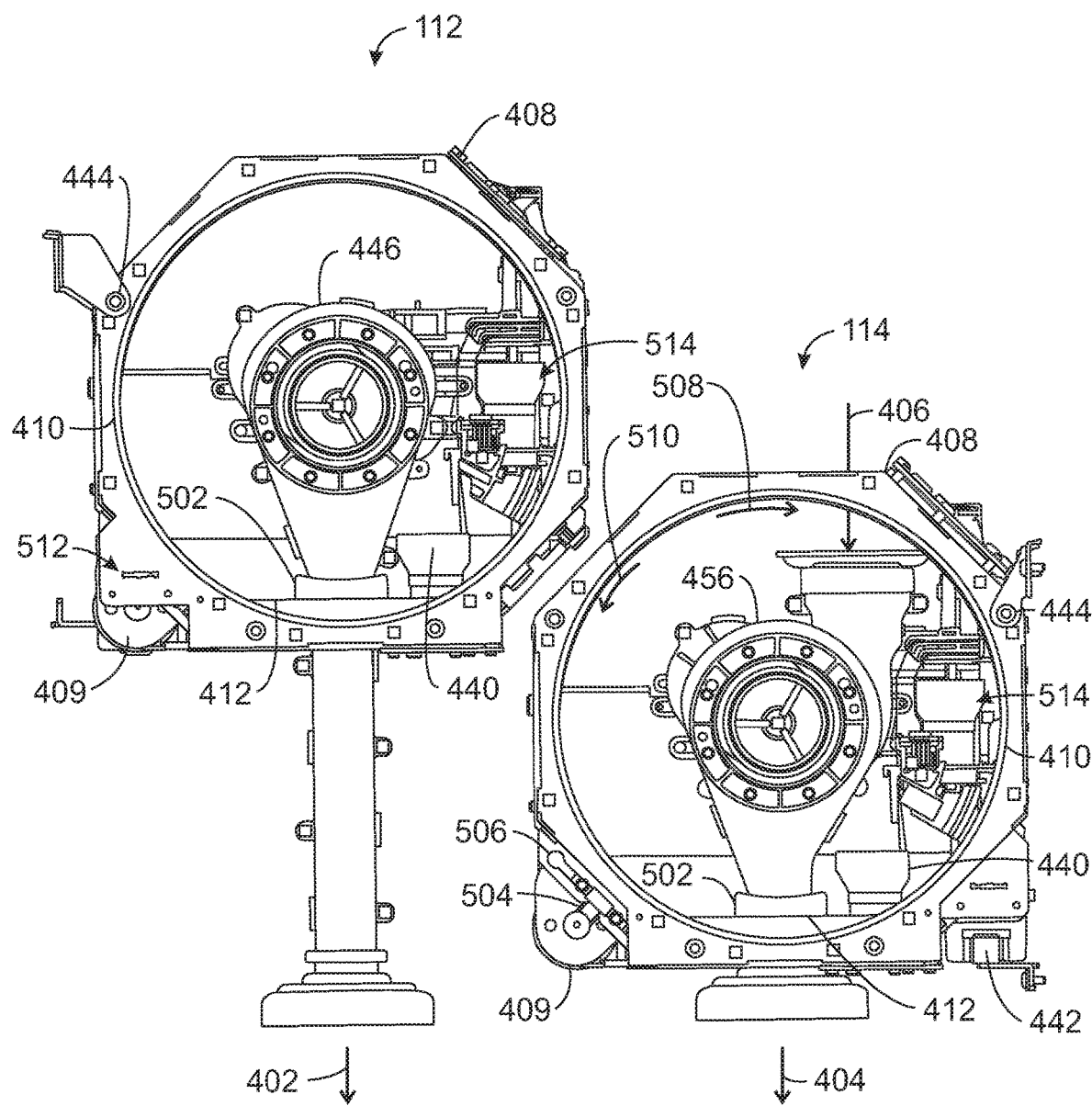
FIG. 5 is a drawing of a front view of the supply stations for a 3D printer, in accordance with examples.

FIG. 5 is a drawing of a front view of the supply stations 112 and 114 for a 3D printer, in accordance with examples. Like numbered items are as described with respect to FIGS. 1, 3, and 4. FIG. 5 illustrates an actuating surface 502 that projects upwards from the flat surface 412 of the cylindrical cage 410. The actuating surface 502 is disposed towards the back of the supply station 112 or 114, proximate to the dispense valve mechanism 446 or the diverter valve mechanism 456. Referring also to FIG. 4, as a build material container 414 is inserted into the supply station 112 or 114, the lower front surface of the build material container 414 contacts the actuating surface 502. Further insertion of the build material container 414 moves the actuating surface 502 and releases the latch 428 that secures the build material container 414 in the supply station 112 or 114.

As illustrated for the recycle supply station 114, the motor 409 may be coupled to the cylindrical cylinder 410 through a drive belt 504 that passes through a bidirectional belt tensioner 506. The bidirectional belt tensioner 506 allows the motor 409 to rotate the cylindrical cage 410 in either direction, for example, in a first angular direction 508 for dispensing material from a build material container 414, or in a second angular direction 510 for adding material to a build material container 414. The angular directions 508 and 510 for these operations may be reversed from the angular directions shown, depending on the design of the build material container 414. A similar coupling is used for the new supply station 112, although it is obscured by a portion 512 of the stationary support structure 408. For both supply stations 112 and 114, rotating the build material container 414 back and forth in each of the angular directions 508 and 510 may be used to weigh the material in the build material container 414, for example, to compensate for an angle of repose in the build material container 414, as described herein.

A reader and brake mechanism 514 is also visible in FIG. 5. This is discussed in greater detail with respect to FIGS. 20 to 26.

Figure 6:
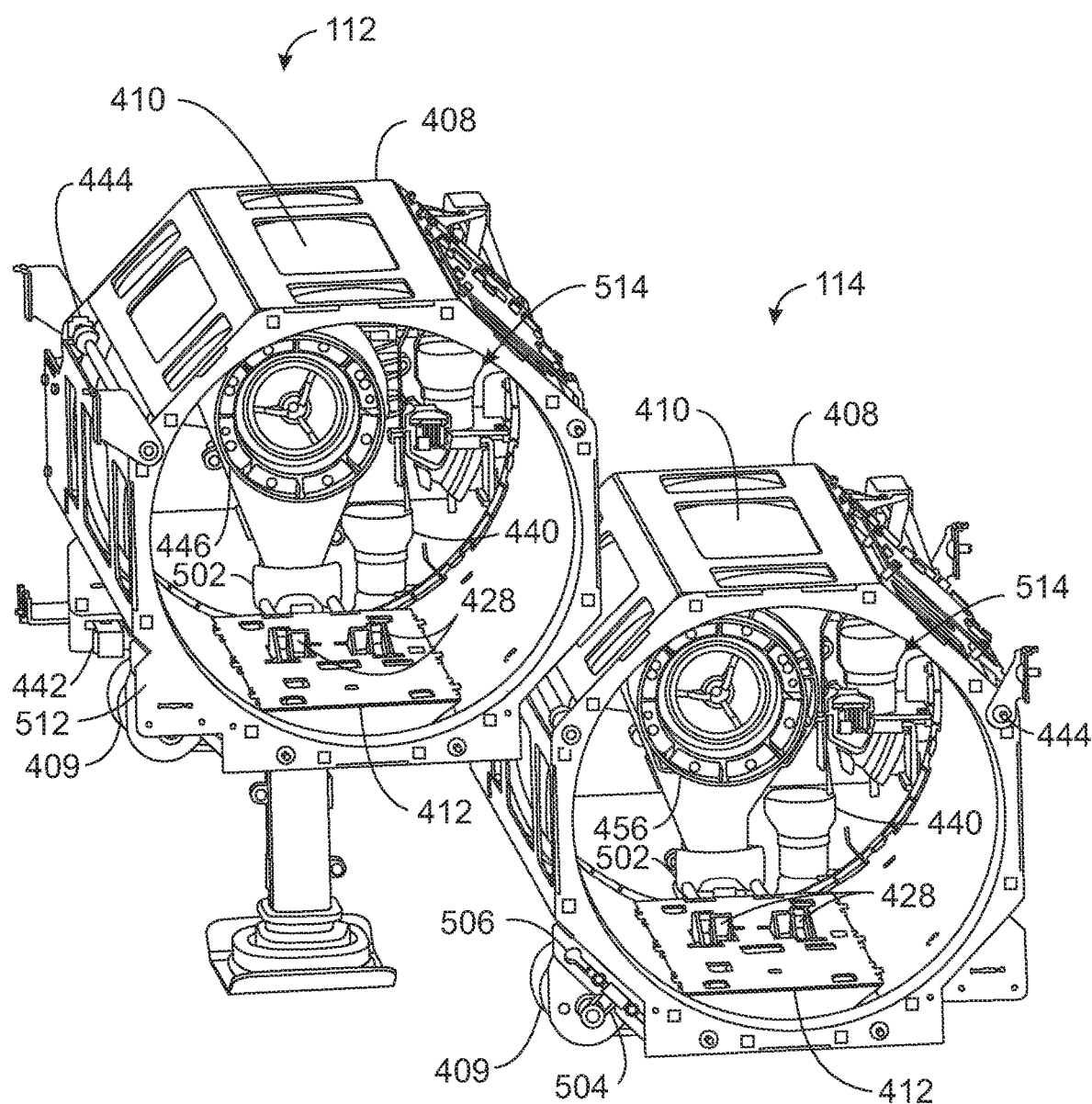
FIG. 6 is a drawing of a perspective view of the supply stations for the 3D printer, in accordance with examples.

FIG. 6 is a drawing of a perspective view of the supply stations 112 and 114 for the 3D printer, in accordance with examples. Like numbered items are as described for previous figures. In FIG. 6, the latch 428 may be seen extending up from the flat surface 412 of the cylindrical cage 410 in both supply stations 112 and 114. This is the position the latch 428 would be in for securing a build material container 414 into a supply station 112 or 114.

Figure 7:
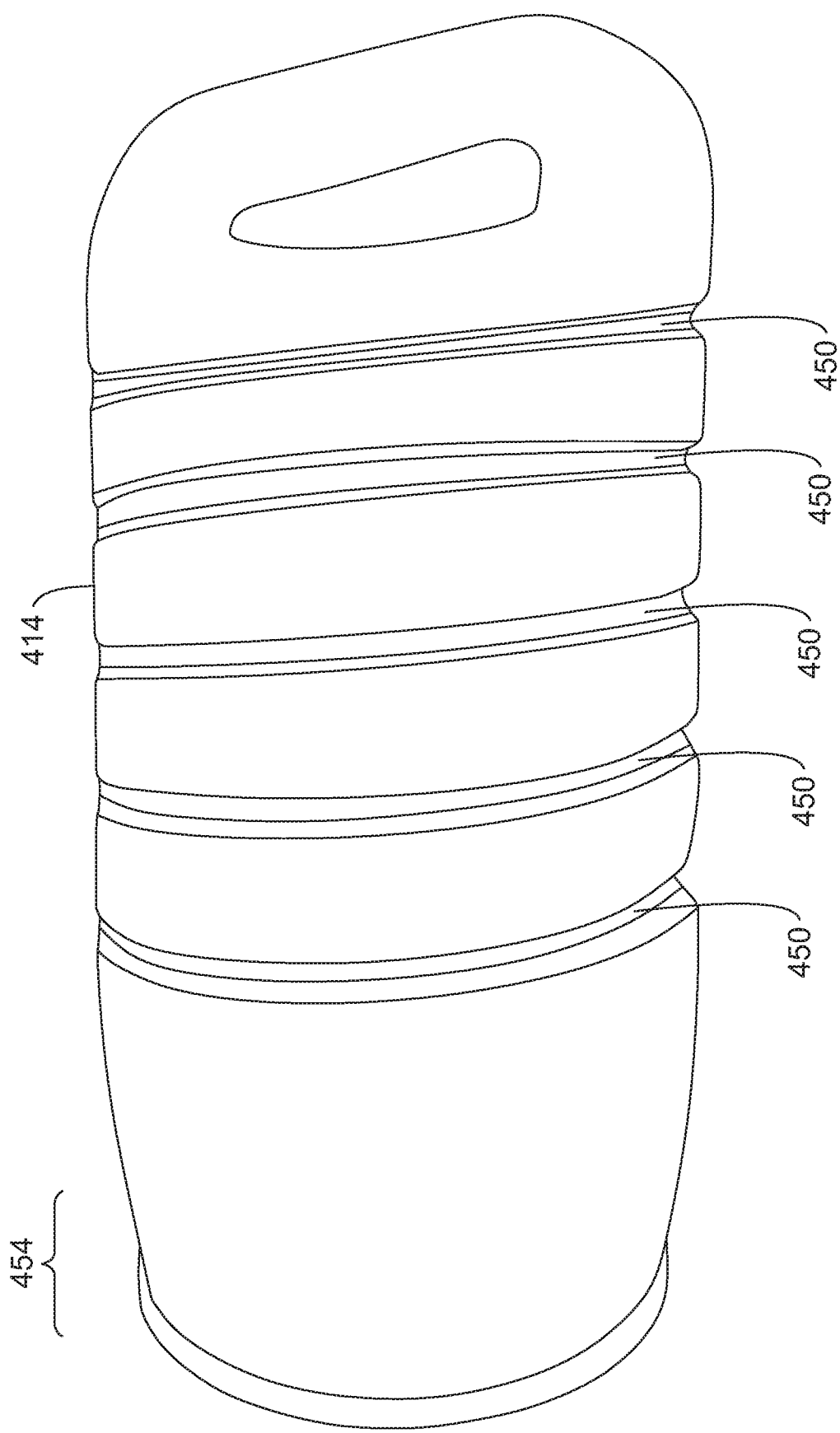
FIG. 7 is a drawing of a side view of a build material container, in accordance with examples.

FIG. 7 is a drawing of a side view of a build material container 414, in accordance with examples. Like numbered items are as described with respect to previous figures. This is one example of what a build material container 414 may look like. Depending on the design of the supply stations 112 and 114, and other configurations may be used for the build material container 414. In this example, the design of the spiral 450 molded into the build material container 414 aids in moving build material towards the head 454 as the build material container 414 is rotated in a clockwise angular direction, relative to the insertion into the supply stations 112 and 114.

In some examples, a build material container 414 used for the new supply station 112 may differ from a build material container 414 used for the recycle supply station 114. This may be used to prevent the addition of recycle build material 404 to a new material vessel 202 or the addition of new build material 402 to a recycle material vessel 208. As described herein, the use of an information chip 424 may help to prevent this as well.

The build material container 414 may be formed from any number of materials. The materials may include high density polyethylene (HDPE), nylon, polyethylene terephthalate, polycarbonate, polyphenylene sulfide, polyether ether ketone (PEEK), and the like. The head 454 of the build material container 414, including the auger valve 448 and the Archimedes screw 452, may be made from the same or a different material as the body of the build material container 414.

The build material container 414 may be formed by blow molding, roto-molding, or 3D printing, among other techniques. The components of the head 454 of the build material container 414, including the auger valve 448 and the Archimedes screw 452, may be formed by injection molding, 3D printing, or machining, among other techniques. In some examples described herein, the build material container 414, the head of the build material container 454, or both, are made from high density polyethylene.

Figure 8:
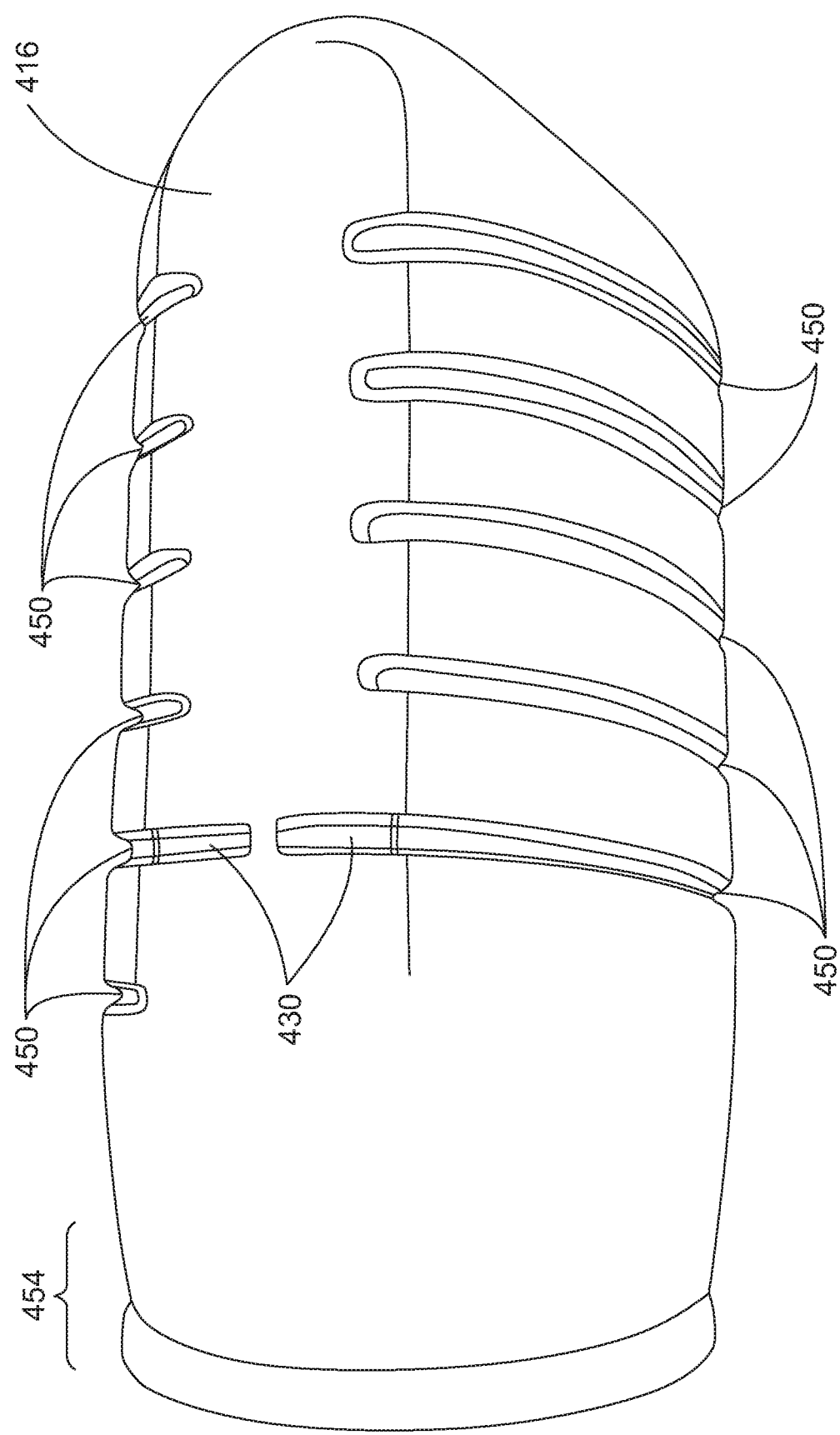
FIG. 8 is a drawing of a bottom view of the build material container in accordance with examples.

FIG. 8 is a drawing of a bottom view of the build material container 414 in accordance with examples. Like numbered items are as described with respect to previous figures. The bottom view of the build material container 414 shows the corresponding flat surface 416 that may engage the flat surface 412 of the supply stations 112 and 114 described with respect to FIG. 1. The bottom view also illustrates the indentation 430 that engages the latch 428 to secure the build material container 414 in a supply station 112 or 114.

In addition to aligning the build material container with the supply station 112 or 114, the flat bottom 416 also makes storage of the build material container 414 easier. The build material container 414 may rest on the flat bottom without rolling over.

Figure 9:
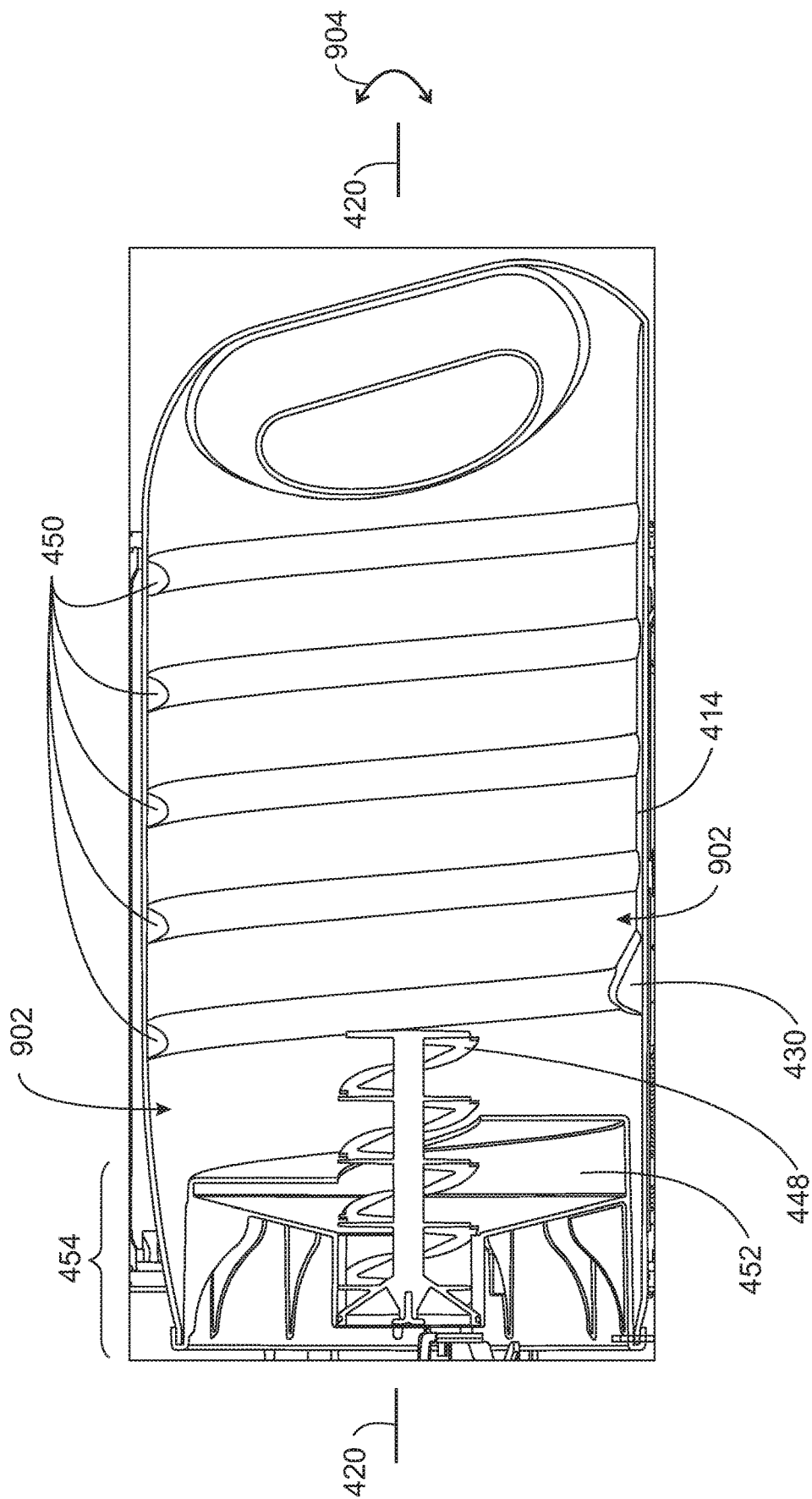
FIG. 9 is a cross-sectional view of a build material container in accordance with examples.

FIG. 9 is a cross-sectional view of a build material container 414 in accordance with examples. Like numbered items are as described with respect to previous figures. As shown in FIG. 9, the head 454 of the build material container 414 includes an Archimedes screw 452 to convey material between the sidewalls 902 of the build material container 414 and the auger valve 448 in the center of the build material container 414 as the build material container is rotated 904 around a horizontal axis 420. The auger valve 448 is configured to convey build material between an interior of the build material container 414 and an exterior of the build material container 414, for example, to a dispense valve mechanism 446 or to or from a diverter valve mechanism 456.

Figure 10:
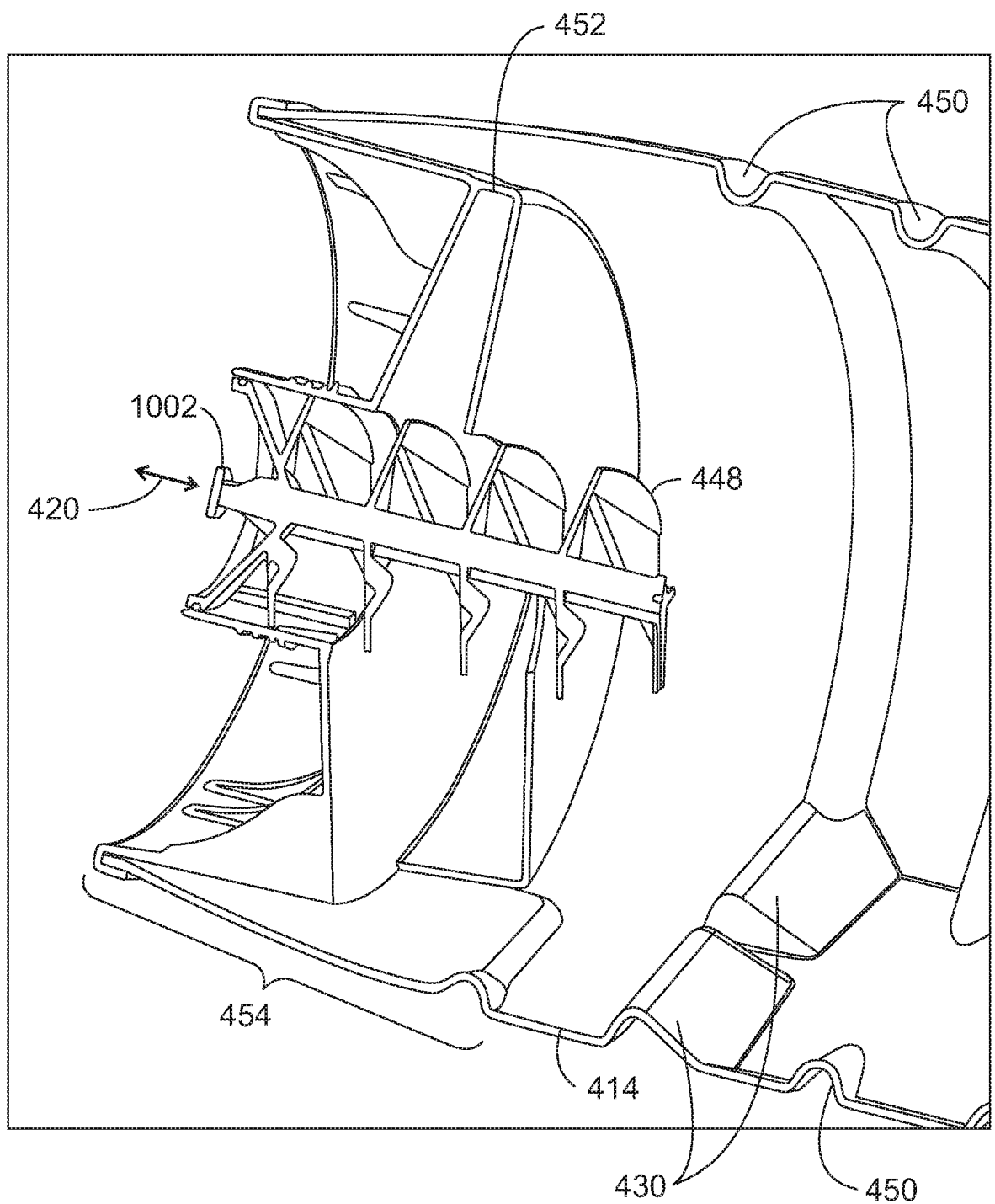
FIG. 10 is a cross-sectional view of a front, or first inserted, portion of the build material container, in accordance with examples.

FIG. 10 is a cross-sectional view of a front portion of the build material container 414, in accordance with examples. Like numbered items are as described with respect to previous figures. The front of the auger valve 448 has an attachment point 1002 to allow the auger valve 448 to be moved along the horizontal axis 420 into and out of the build material container 414. This allows the build material container 414 to be opened for dispensing or receiving build material.

Figure 11:
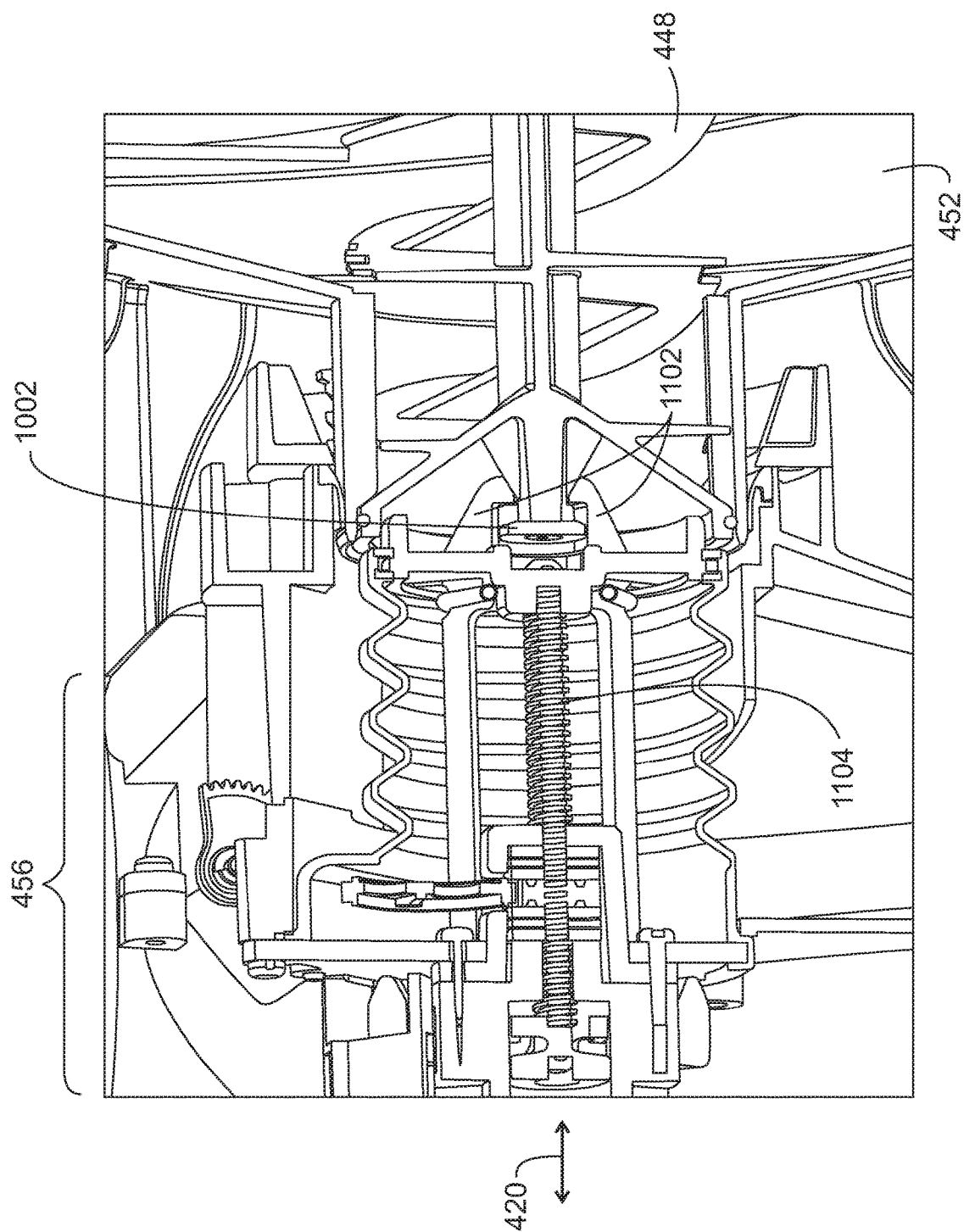
FIG. 11 is a cross-sectional view of a valve mechanism engaging an auger valve at the front of the build material container, in accordance with examples.

FIG. 11 is a cross-sectional view of a valve mechanism engaging the auger valve 448 at the front of the build material container, in accordance with examples. Like numbered items are as described with respect to previous figures. In this example, the valve mechanism is the diverter valve mechanism 456 of the recycle supply station 114. However, a similar mechanism may be included in the dispense valve mechanism 446 of the new supply station 112.

A pulling mechanism 1102 engages with the attachment point 1002 of the auger valve 448. An actuating mechanism 1104, such as a screw tied to a motor, or other powered actuator, may move the auger valve 448 in or out of the build material container 414 along the horizontal axis 420. The pulling mechanism 1102 does not tightly grip or otherwise engage the attachment point 1002, allowing the attachment point 1002, and auger valve 448, to rotate with the build material container 414.

Figure 12:
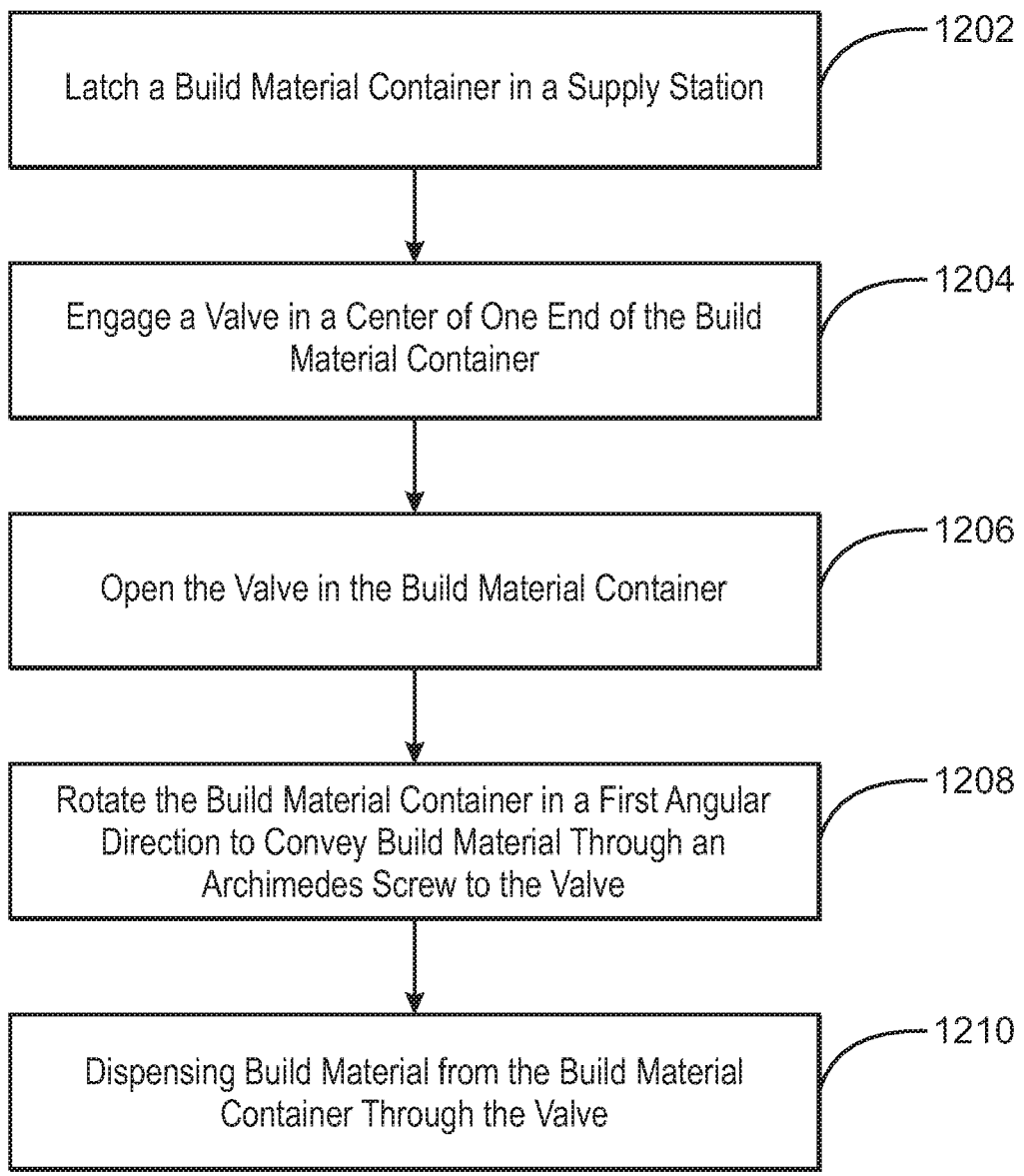
FIG. 12 is a block diagram of a method for moving build material between a build material container in a supply station in a 3D printer, in accordance with examples.

FIG. 12 is a block diagram of a method 1200 for moving build material between a build material container in a supply station in a 3D printer, in accordance with examples. The method 1200 begins at block 1202 when a build material container is latched in the supply station.

In an example, a flat bottom of a build material container may be aligned with a flat surface of a cylindrical cage in the supply station. The build material container may then be slid into the supply station along a horizontal axis, and into contact with an actuating surface. As the build material container is pushed further into the supply station, the actuating surface is pushed inwards, releasing a latch that extends upwards from the flat surface. The latch engages an indentation on the flat bottom of the build material container, securing the build material container in the supply station.

At block 1204, a valve in a center of one end of the build material container may be engaged, for example, by a pulling mechanism. At block 1206, the valve may be opened, for example, by sliding it partially out of the build material container along a horizontal axis running down the center of the build material container.

At block 1208, the build material container may be continuously rotated in a first angular direction to convey build material through an Archimedes screw, for example, from a sidewall or edge of the build material container, to the valve. As described herein, the valve may be an auger valve configured to accept build material from the Archimedes screw and convey it out of the build material container. At block 1210, build material is dispensed from the build material container through the valve.

Figure 13:
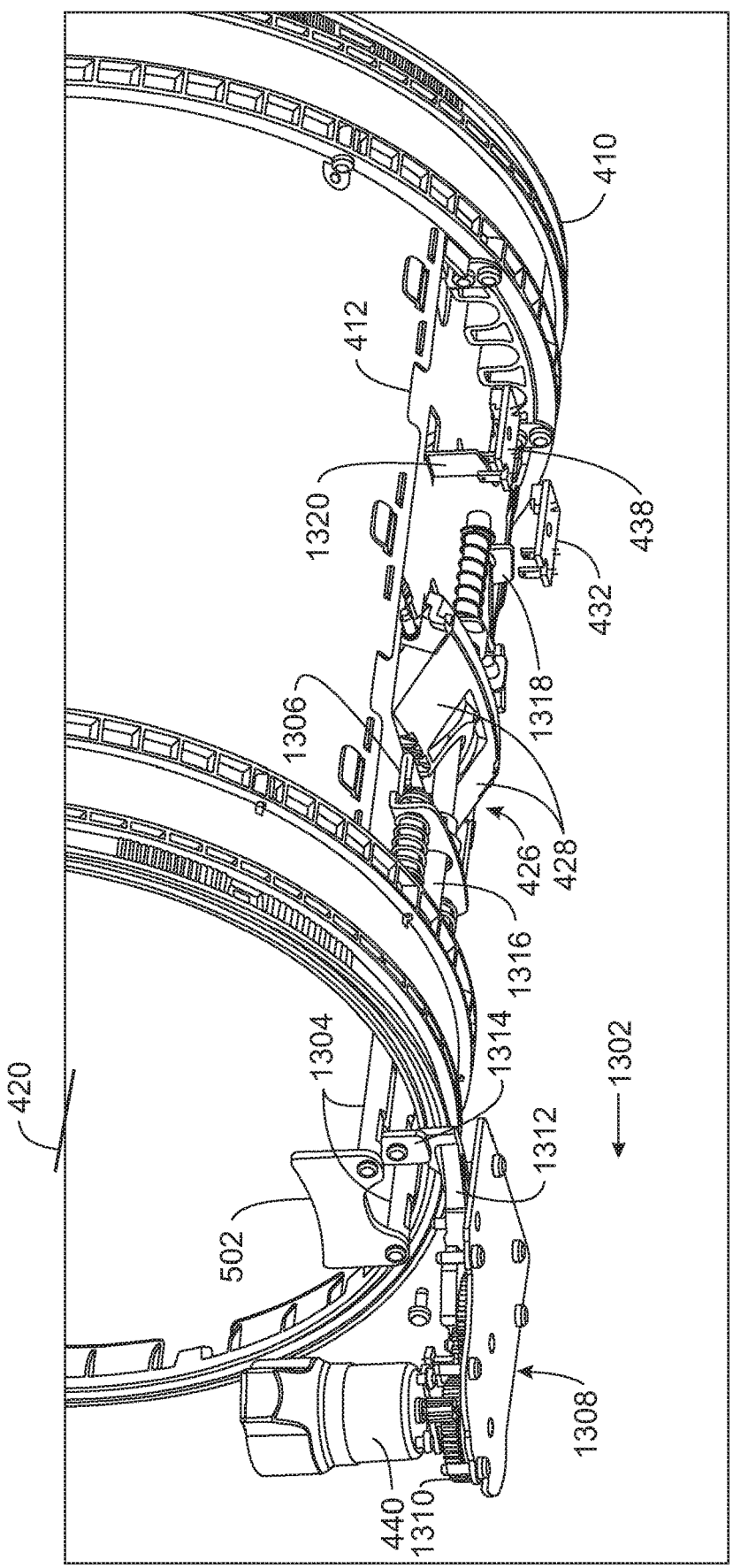
FIG. 13 is a drawing of a cylindrical cage aligned along a horizontal axis, illustrating a latching mechanism to secure a build material container in the cylindrical cage, in accordance with examples.

FIG. 13 is a drawing of a cylindrical cage 410 aligned along a horizontal axis 420, illustrating a latching mechanism 426 to secure a build material container 414 in the cylindrical cage 410, in accordance with examples. Like numbered items are as described in previous figures.

As described herein, as the build material container 414 is slid into the cylindrical cage 410 it contacts the actuating surface 502, for example, near the back 1302 of the cylindrical cage 410. Further pressure by the build material container 414 against the actuating surface may move spring loaded rods 1304 and pull a locking mechanism 1306 from the latch 428. The latch 428 may be spring-loaded, and, once released, may move upwards into the cylindrical cage 410. As the latch 428 moves upwards into the cylindrical cage 410 it may engage indentations in the build material container 414, as described herein.

A release mechanism 1308 may be used to retract the latch 428 to release a build material container 414 from the cylindrical cage 410. The release mechanism 1308 may include a latch motor 440 to drive the release mechanism. Gears 1310 coupled to the motor may drive a pawl 1312 that engages an attachment 1314 on a release rod 1316. As the release rod 1316 is pulled by the pawl 1312, the latch 428 is returned to the initial position, for example, being retracted into the bottom of the cylindrical cage 410, underneath the flat surface 412. The locking mechanism 1306 may then reengage with the latch 428, locking it in a place, and allowing the build material container 414 to be removed from the cylindrical cage 410.

When the latch 428 is released, a flag 1318 may be moved from an initial position to a latch position. The latching sensor 432 may be used to detect the change in the status of the flag 1318, determining that a build material container 414 is secured in the cylindrical cage 410.

The locking mechanism 1306 may be constructed underneath the flat surface 412 of the cylindrical cage 410. The release mechanism 1308 is mounted to the stationary support structure 408, which is not shown in this figure. Accordingly, the pawl 1312 may engage the attachment 1314 on the release rod 1316 when the cylindrical cage 410 is in a base position. While the cylindrical cage 410 is rotating, the pawl 1312 does not engage the attachment 1314.

The determination of whether the cylindrical cage 410 is in the base position may be performed by a position sensor 438. In this example, the position sensor 438 may be an optical sensor that determines if a metal tab 1320 extending from the flat surface 412 in the cylindrical cage is blocking a light beam. In other examples, other sensors may be used in addition to or instead of the optical sensor. For example, the position sensor may be a Hall effect sensor to detect a magnet mounted on the cylindrical cage 410, an optical sensor that detects a reflective surface mounted on the cylindrical cage 410, and the like.

Figure 14:
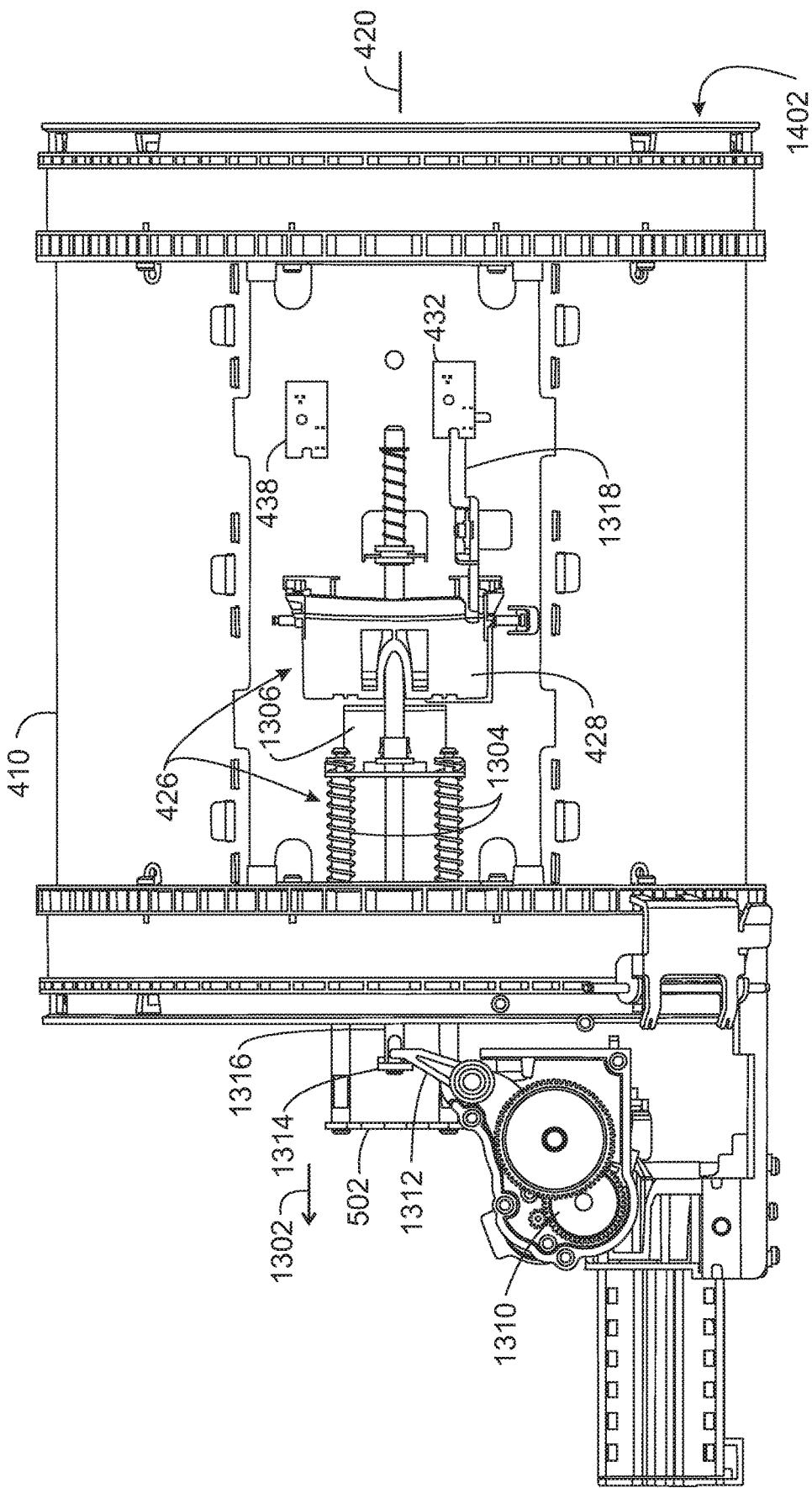
FIG. 14 is a drawing of a bottom view the cylindrical cage along the horizontal axis, illustrating the latching mechanism, in accordance with examples.

FIG. 14 is another drawing of a bottom view the cylindrical cage 410 along the horizontal axis 420, illustrating the latching mechanism 426, in accordance with examples. Like numbered items are as described with respect to previous figures. FIG. 14 provides another perspective of the latching mechanism 426 after the latch 428 has been released, for example, to secure a build material container in the cylindrical cage 410. The actuating surface 502 has been pushed backward, away from the opening 1402 of the cylindrical cage 410. As described herein, the latching mechanism 426 rotates with the cylindrical cage 410, interacting with the latching sensor 432 in the base position, for example, as determined by the position sensor 438. The latching mechanism 426 can be more clearly seen by the removal of the cylindrical cage 410, as shown in FIG. 15.

FIG. 15 is a drawing of the latching mechanism 426 prior to release of the latch 428, in accordance with examples. Like numbered items are as described with respect to previous figures. In FIG. 15, the locking mechanism 1306 is engaged with the latch 428. The locking mechanism 1306 may be a panel that rests in a groove 1502 at the front of the latch 428.

The latch 428 may be supported by a spring-loaded pivot 1504. When the actuating surface 502 is pushed back 1506, the spring-loaded rods 1304 pull the locking mechanism 1306 out of the groove 1502 in the latch 428. This allows the latch 428 to move upwards 1508, for example, into a cylindrical cage 410 to engage indentations 430 in a build material container 414, securing the build material container 414 in the cylindrical cage 410. The latching mechanism 426 with the latch in the release position is described with respect to FIGS. 16A and 16B.

Figure 16A:
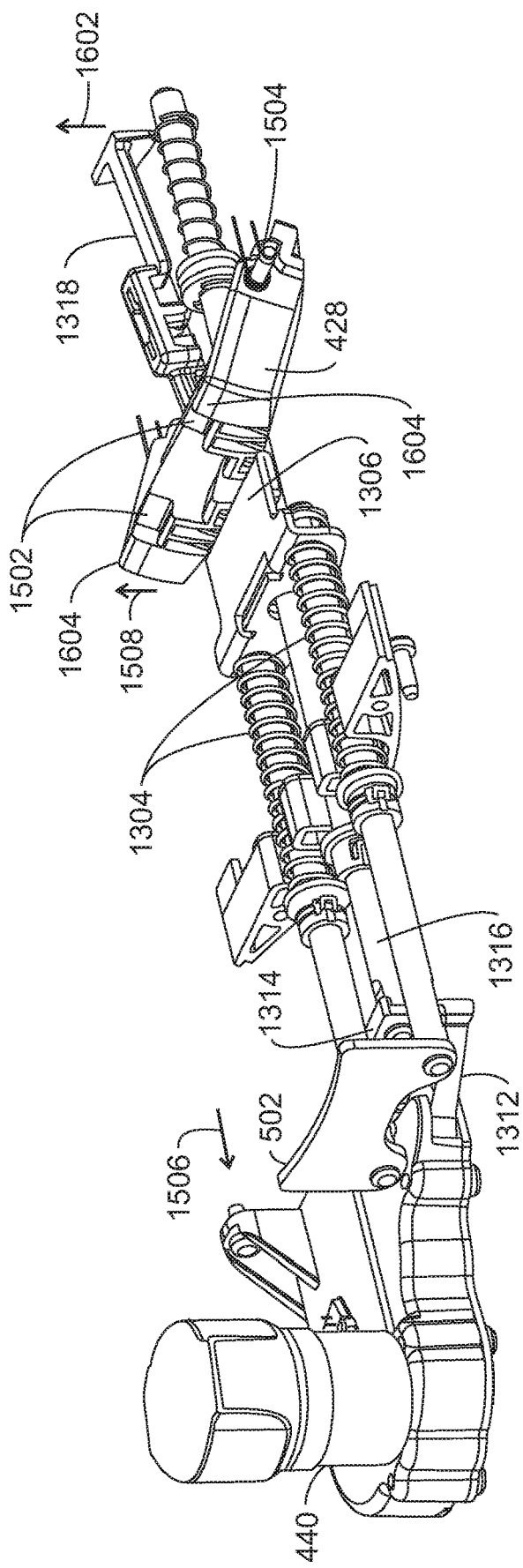
FIGS. 16A and 16B are drawings of the latching mechanism after release of the latch, in accordance with examples.
Figure 16B:
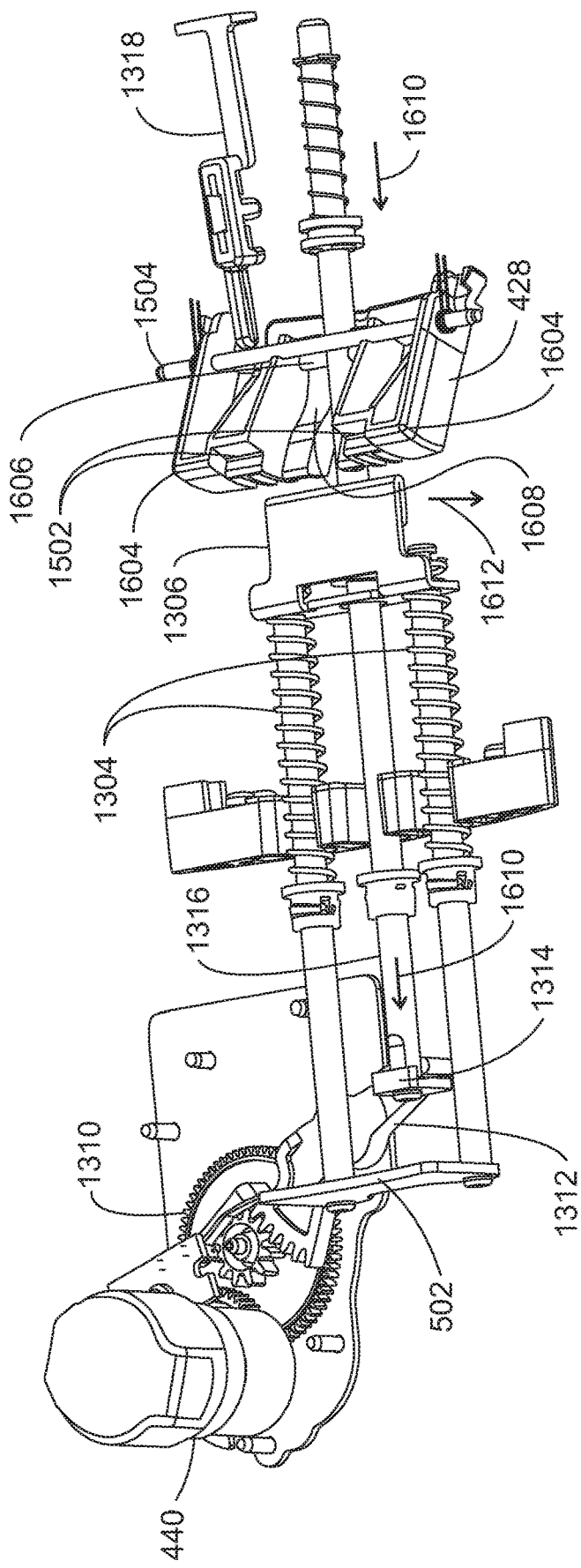

FIGS. 16A and 16B are drawings of the latching mechanism 426 after release of the latch 428, in accordance with examples. Like numbered items are as described with respect to previous figures. In this example, the latch 428 is a single structure but has two prongs 1604 that move upward 1508 to engage with the build material container 414. When the latch 428 is released, the flag 1318 may also be moved in an upwards fashion 1602. This may remove the flag 1318 from the latching sensor 432, indicating that a build material container 414 has been latched into the cylindrical cage 410. In some examples, the functionality may be reversed, for example, placing the flag into a detectable position when the build material container 414 is latched into position.

In FIG. 16B, it can be seen that the release rod 1316 is attached to a cross piece 1606, which rests on a cam 1608, or inclined surface, in the latch 428. As the pawl 1312 pulls the release rod 1316 backwards 1610, the cross piece 1606 slides up the cam 1608, pulling the latch 428 down. When the groove 1502 on the latch 428 reaches the latching mechanism 1306, the spring-loaded rods 1304 push the latching mechanism 1306 back into the groove 1502. As the latch 428 is pulled down 1612, the build material container 414 is released.

Figure 17:
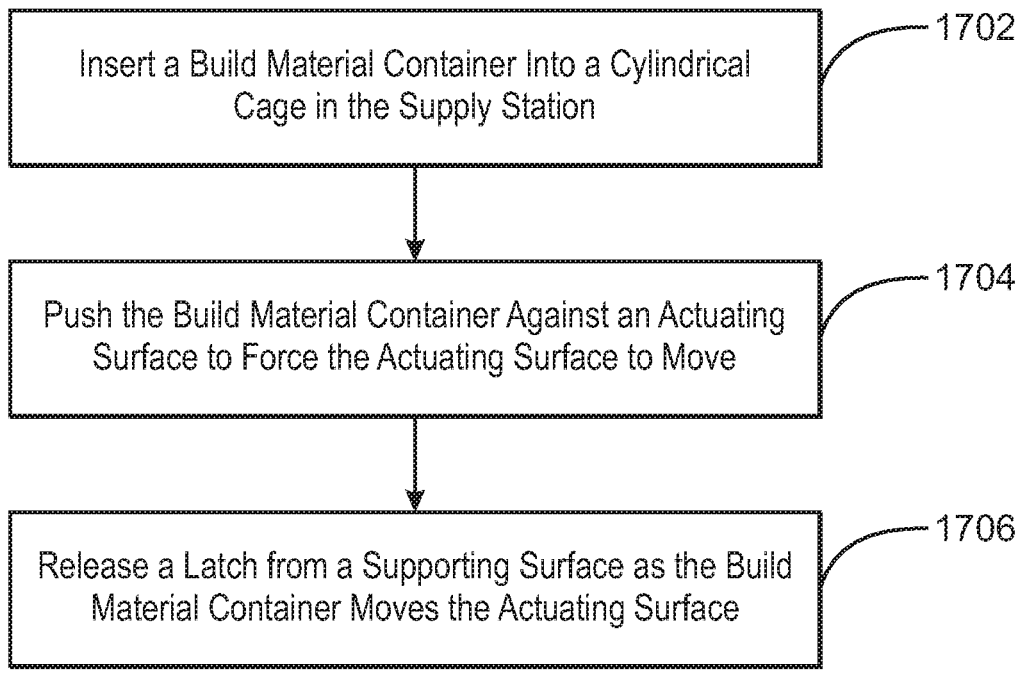
FIG. 17 is a block diagram of a method for securing a build material container in a supply station of a 3D printer, in accordance with examples.

FIG. 17 is a block diagram of a method for securing a build material container in a supply station of a 3D printer, in accordance with examples. The method begins at block 1702 when a build material container is inserted into a cylindrical cage in the supply station. The build material container may be slid into the cylindrical cage until it contacts an actuating surface. At block 1704, the build material container is pushed against an actuating surface to force the actuating surface to move.

At block 1706, a latch is released from a supporting surface to secure the build material container as the actuating surface is moved. As described herein, the latch may be released from a flat surface in a cylindrical cage upwards to engage indentations on a bottom surface of the build material container.

Figure 18:
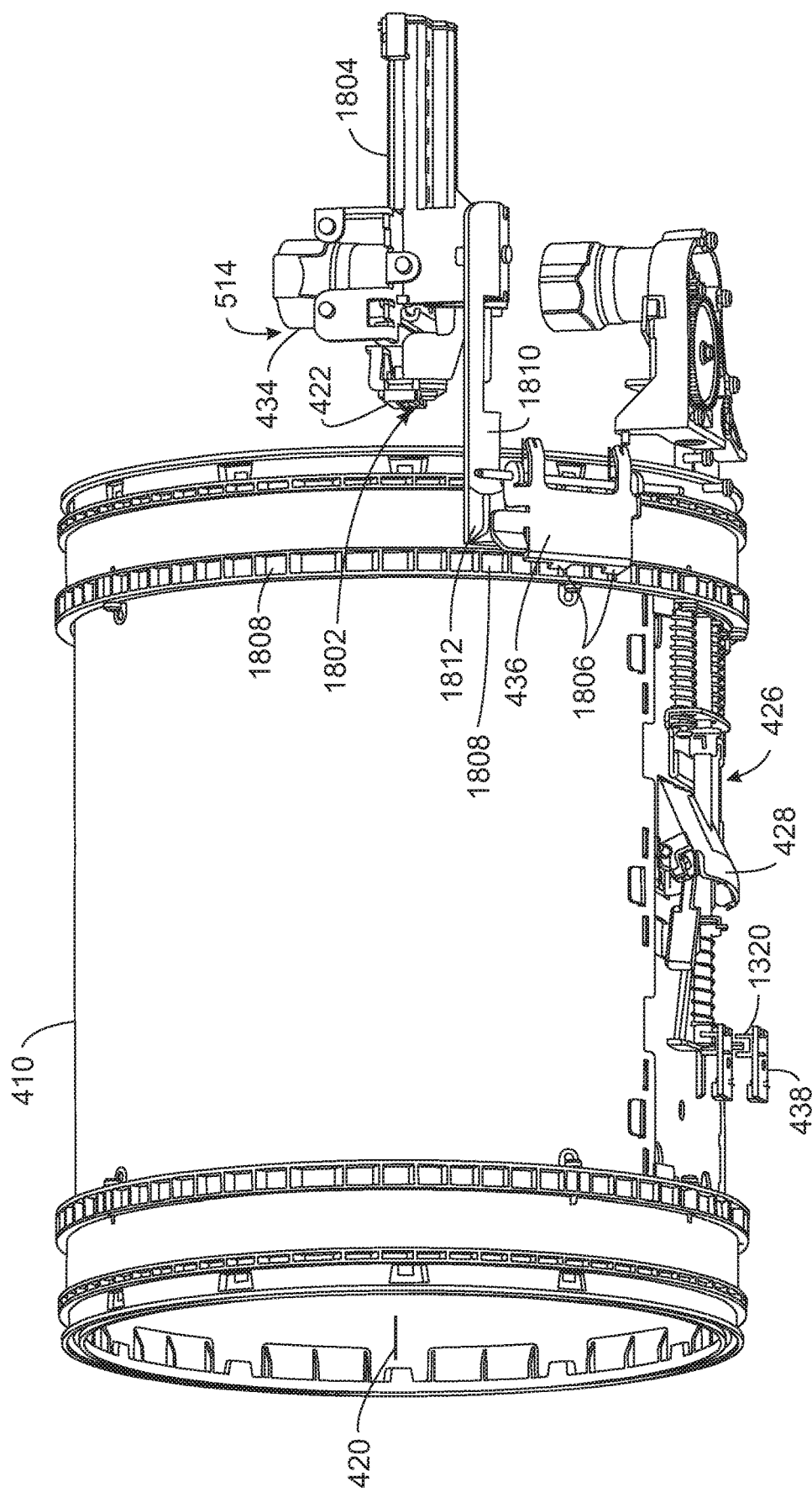
FIG. 18 is a drawing of the cylindrical cage along the horizontal axis, illustrating a reader mechanism for reading an information chip on the build material container, in accordance with examples.

FIG. 18 is a drawing of the cylindrical cage 410 along the horizontal axis 420, illustrating a reader mechanism 514 for reading an information chip 424 on the build material container 414, in accordance with examples. Like numbered items are as described with respect to previous figures. To simplify the drawing, structures described with respect to other figures may not be labeled. the information chip 424 may be a non-volatile, or non-transitory, machine readable memory, as described with respect to FIG. 26. The information chip 424 may include security mechanisms, such as encryption techniques, to prevent writing under incorrect circumstances, for example, writing an incorrect material identity or weight outside of the 3D printer.

The reader mechanism 514 may include a reading head 422 to read an information chip 424 on a build material container 414, as described with respect to FIG. 4. The reading head 422 may have spring contacts 1802 to form electrical connections with contact pads on the top surface of an information chip 424.

The reading head 422 may be mounted on a platform 1804 that holds a reader motor 434, or other powered actuator, such as a stepper motor, a server motor, a linear motor, and the like, to move the reading head 422 in relation to the information chip, for example, towards or away from the information chip 424. A brake 436 may prevent rotation of the build material container 414 by holding the cylindrical cage 410 in place, while the reading head 422 contacts the information chip 424. The brake 436 may be a spring-loaded panel that has prongs 1806 that are designed to insert into indentations 1808 along the cylindrical cage 410, preventing the cylindrical cage 410 from rotating.

A brake actuator 1810 may be coupled to the platform 1804 and move with the reading head 422. The brake actuator 1810 may include an inclined surface 1812 that lifts the prongs 1806 of the brake 436 out of the indentations 1808 of the cylindrical cage 410 as the reading head is pulled away from cylindrical cage 410 and a build material container 414 secured in the cylindrical cage 410. As the brake actuator 1810 is moved forward with the reading head 422, towards the cylindrical cage 410 and a build material container 414 secured in the cylindrical cage 410, the inclined surface 1812 allows the prongs 1806 of the brake 436 to engage the indentations 1808 on the cylindrical cage 410.

Figure 19:
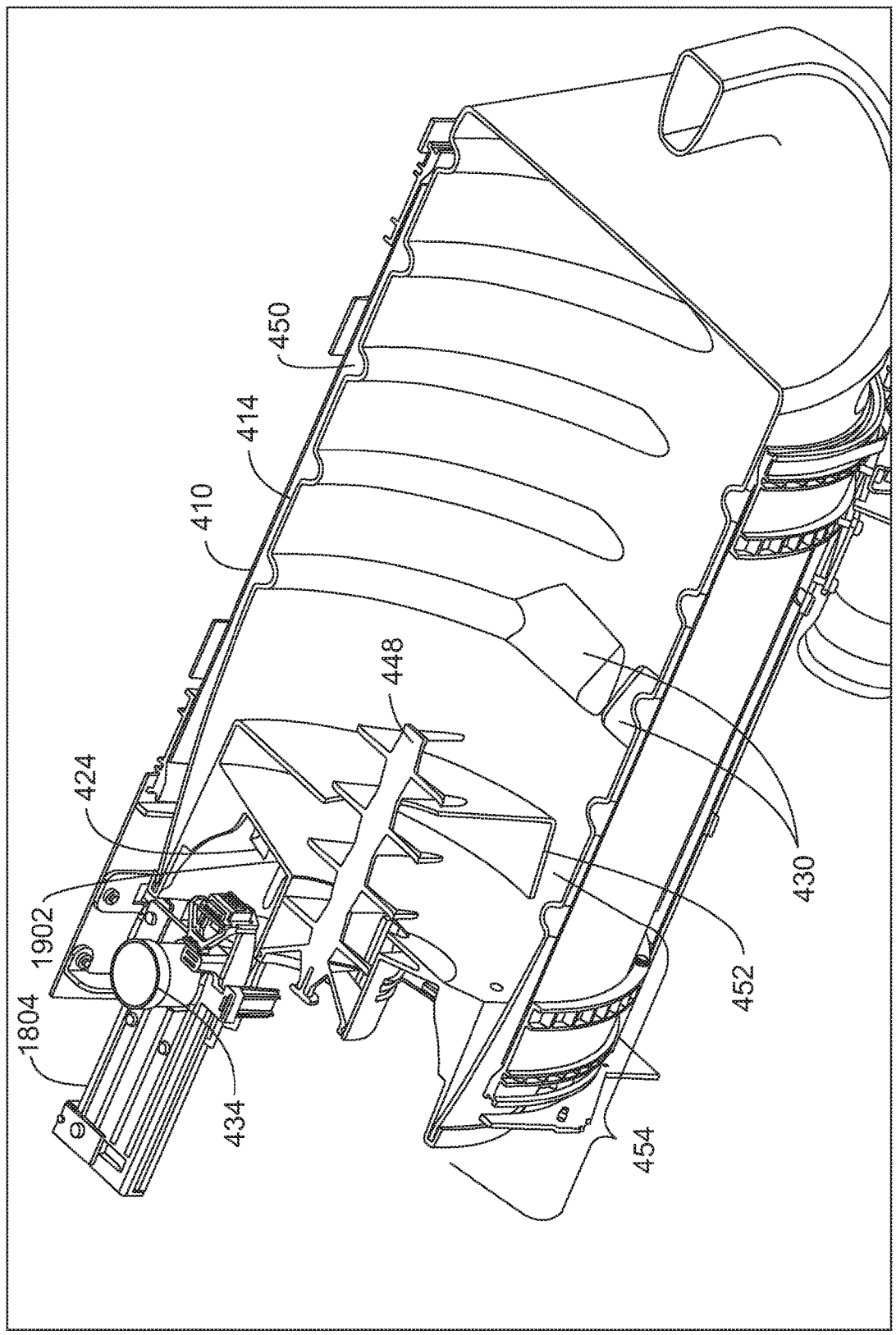
FIG. 19 is a cross-sectional view of the cylindrical cage holding a build material container, in accordance with examples.

FIG. 19 is a cross-sectional view of the cylindrical cage 410 holding a build material container 414, in accordance with examples. Like numbered items are as described with respect to previous figures. The information chip 424 may be mounted on an outside surface 1902 of the head 454 of the build material container 414, for example, proximate to the auger valve 448.

Figure 20:
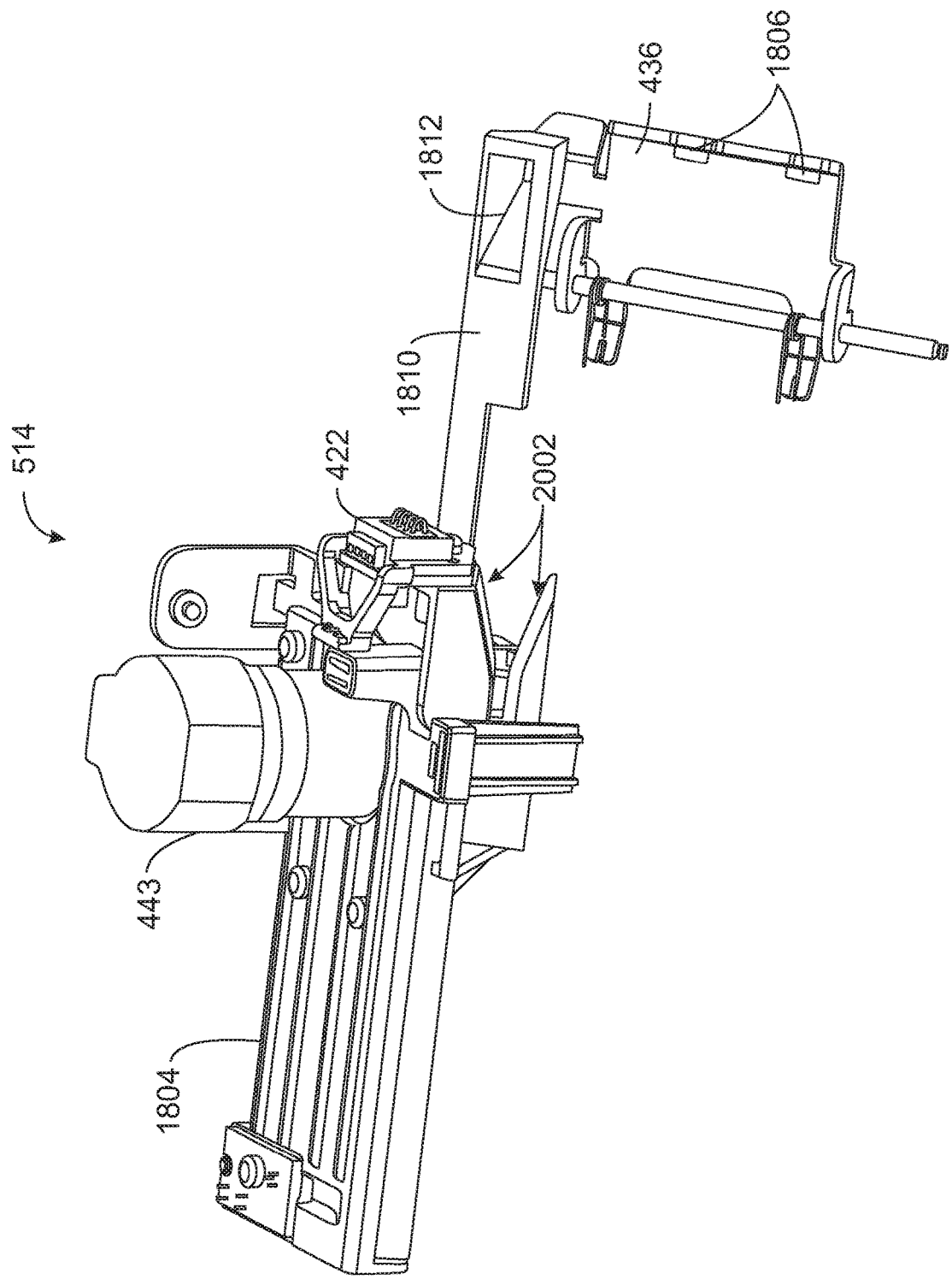
FIG. 20 is a drawing of the reader mechanism, illustrating a reading head, a platform, a brake, and a brake actuator in accordance with examples.

FIG. 20 is a drawing of the reader mechanism 514, illustrating the reading head 422, the platform 1804, the brake 436, and the brake actuator 1810 in accordance with examples. Like numbered items are as described with respect to previous figures. In this example, the reading head 422 is retracted, and thus the inclined surface 1812 of the brake actuator 1810 is lifting the prongs 1806 of the brake 436. Accordingly, a cylindrical cage 410 would be allowed to freely rotate in this position.

A V-shaped structure 2002 may be used to align the reading head 422 with an information chip. This may be performed as the V-shaped structure 2002 overlaps a tab on a build material container. This is described further with respect to FIG. 23.

Figure 21:
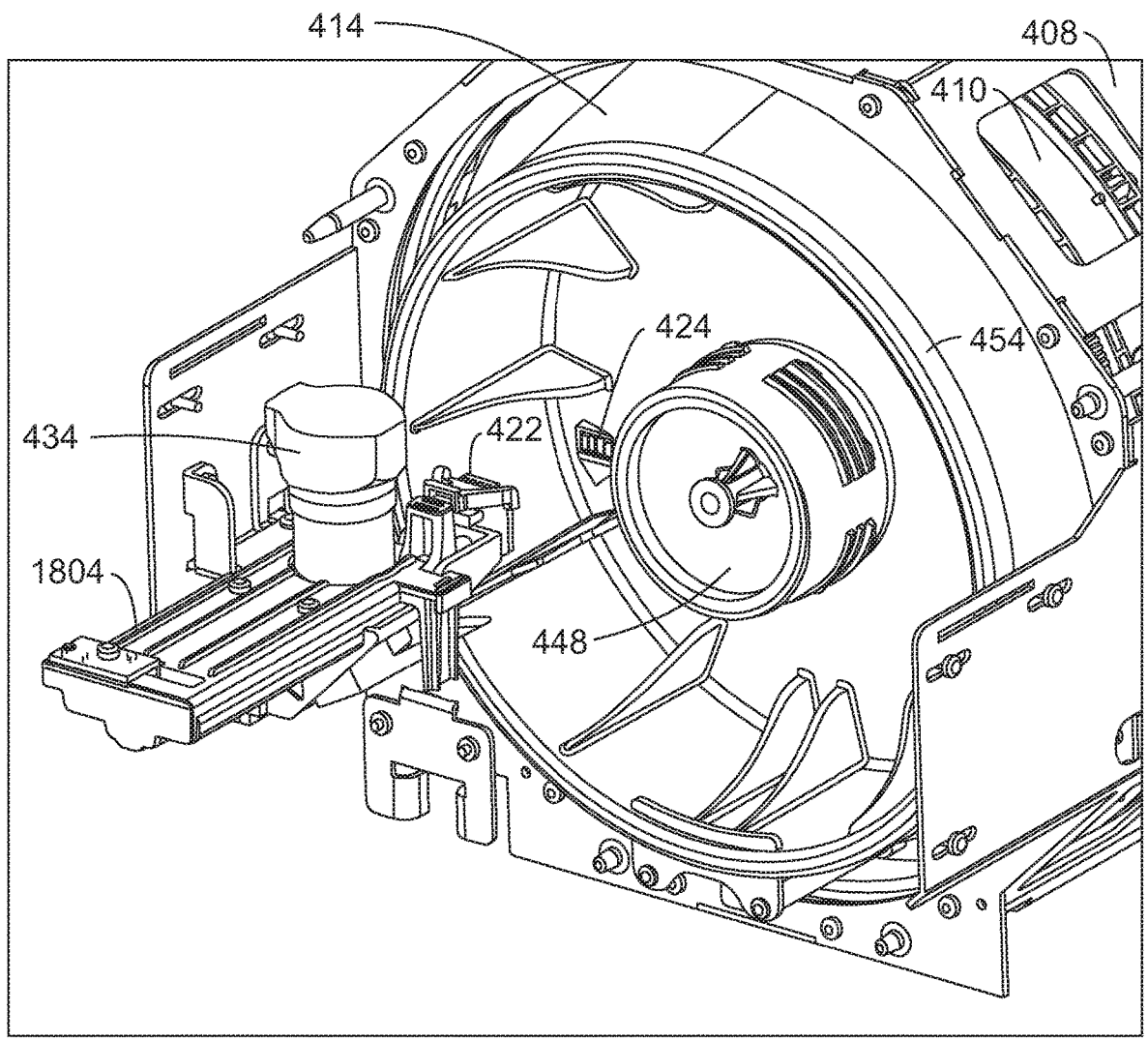
FIG. 21 is a cut-away drawing of the reader mechanism and a build material container with the reading head in a retracted position, in accordance with examples.

FIG. 21 is a cut-away drawing of the reader mechanism 514 and a build material container 414 with the reading head 422 in a retracted position described with respect to FIG. 20, in accordance with examples. Like numbered items are as described with respect to previous figures. In this example, the cylindrical cage 410 would be free to rotate the build material container 414, as the brake 436 would be retracted. This is discussed further with respect to FIG. 22.

Figure 22:
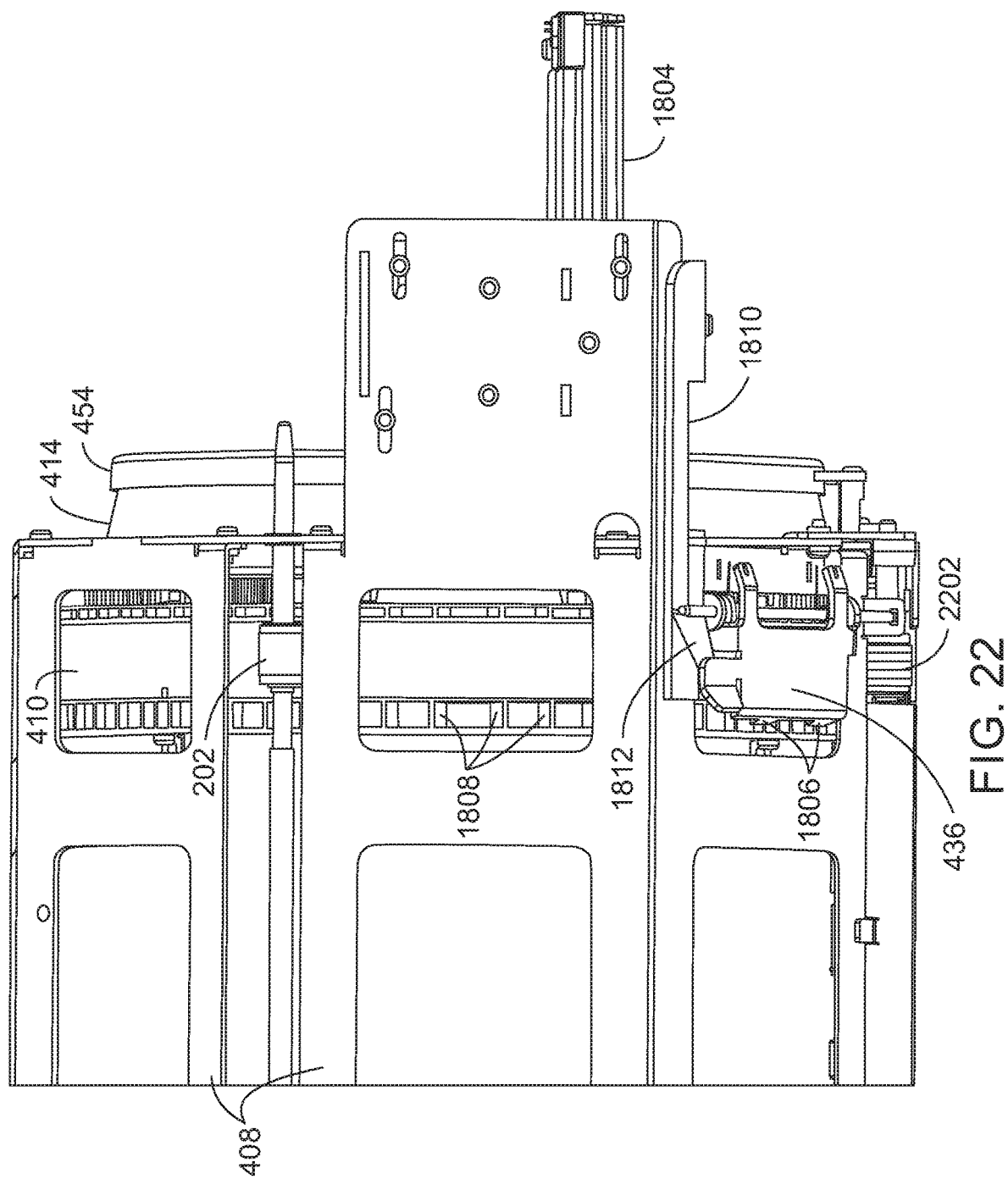
FIG. 22 is a drawing of the reader mechanism with the reading head in a retracted position, in accordance with examples.

FIG. 22 is a drawing of the reader mechanism 514 with the reading head in a retracted position, in accordance with examples. Like numbered items are as described with respect to previous figures. As shown in FIG. 22, the inclined surface 1812 of the brake actuator 1810 is holding the brake 436 away from the cylindrical cage 410. This prevents the prongs 1806 from engaging with the indentations 1808 of the cylindrical cage 410, allowing the cylindrical cage 410 to freely rotate.

This figure also illustrates the rollers 2202 that may be used to support the cylindrical cage 410 in the stationary support structure 408. The rollers 2202 allow the cylindrical cage 410 to rotate within the stationary support structure 408.

Figure 23:
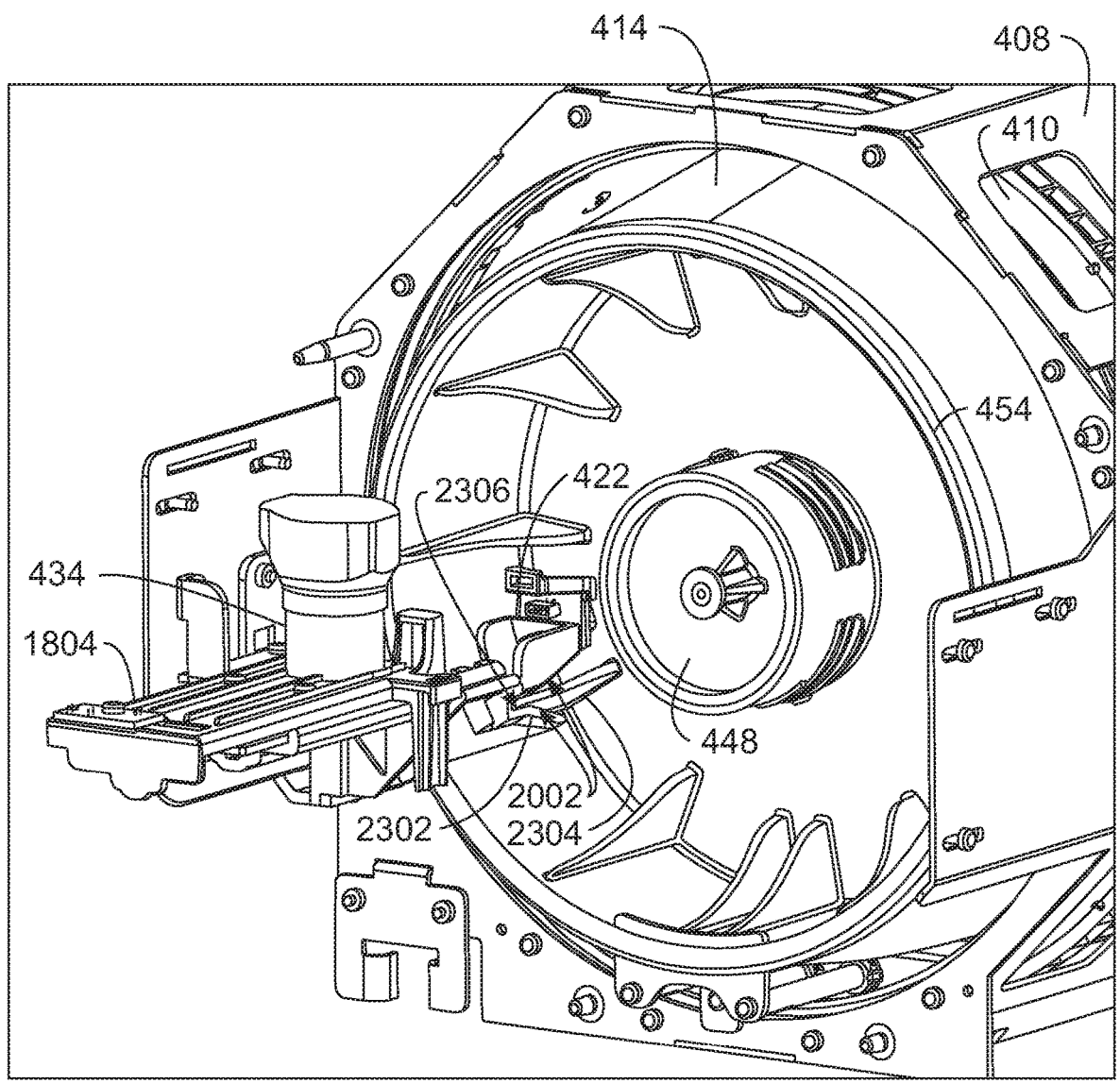
FIG. 23 is a cut-away drawing of the reader mechanism and a build material container with the reading head in a reading position, in accordance with examples.

FIG. 23 is a cut-away drawing of the reader mechanism and a build material container 414 with the reading head 422 in a reading position, in accordance with examples. Like numbered items are as described with respect previous figures.

The reader mechanism 514 may include alignment elements to align the reading head 422 with the information chip 424. In this example, the alignment elements include an alignment slot 2302 that engages with an alignment tab 2304 on the head 454 of the build material container 414. As illustrated, the alignment slot 2302 includes a V-shaped structure 2002 to overlap the alignment tab 2304 and directed into a narrow opening 2306 at the back of the alignment slot 2302.

Figure 24:
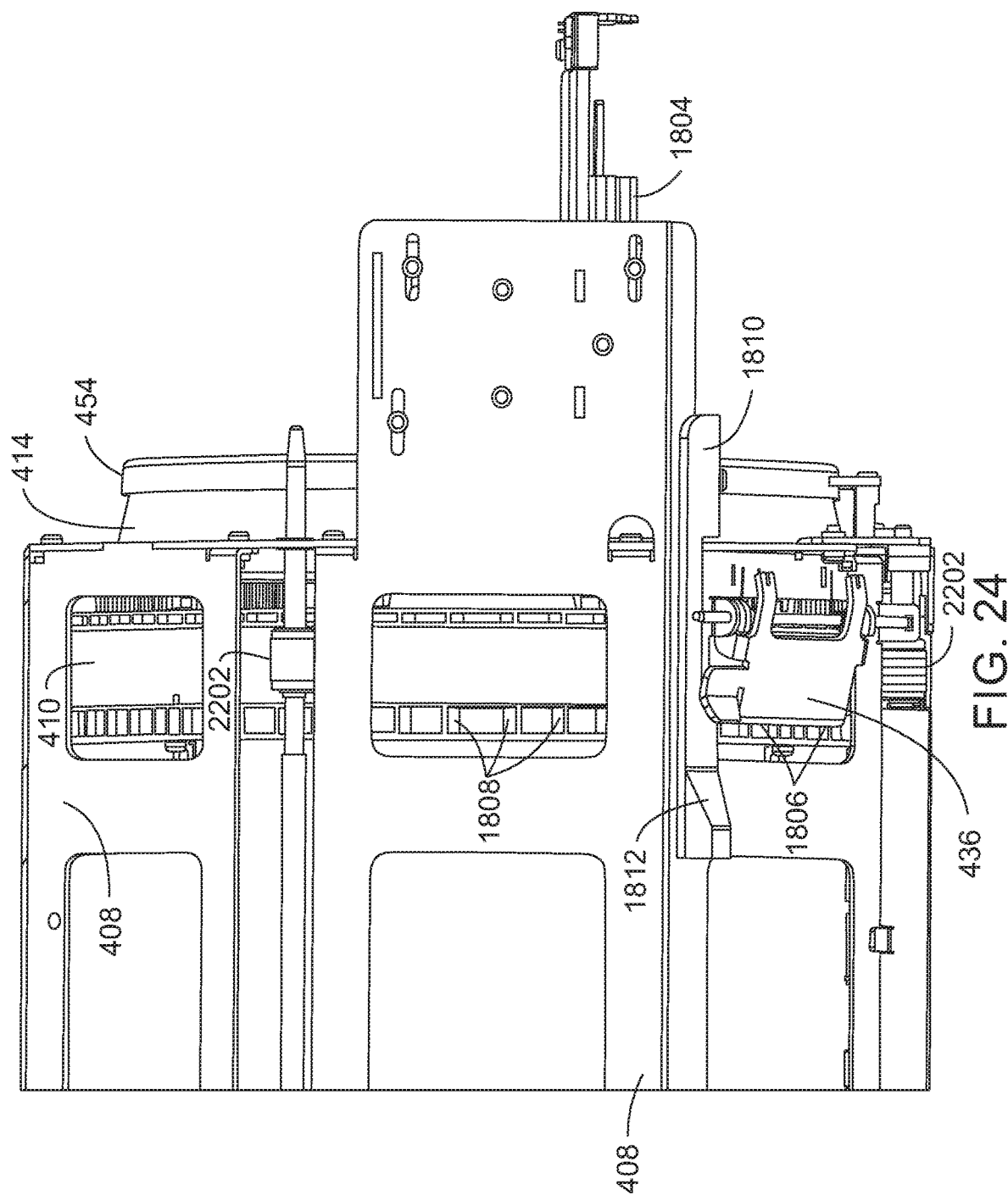
FIG. 24 is a drawing of the reader mechanism with the reading head in a reading position, in accordance with examples.

As the reader mechanism 514 has the reading head 422 in the reading position, the brake may be engaged to prevent any movement of the build material container 414 this is discussed further with respect to FIG. 24.

FIG. 24 is a drawing of the reader mechanism with the reading head in a reading position, in accordance with examples. Like numbered items are as described with respect to previous figures. As shown in FIG. 24, the inclined surface 1812 of the brake actuator 1810 is moved away from the brake 436, allowing the brake 436 to move towards the cylindrical cage 410. This allows the prongs 1806 to engage with the indentations 1808 of the cylindrical cage 410, preventing the cylindrical cage 410 from rotating.

Figure 25:
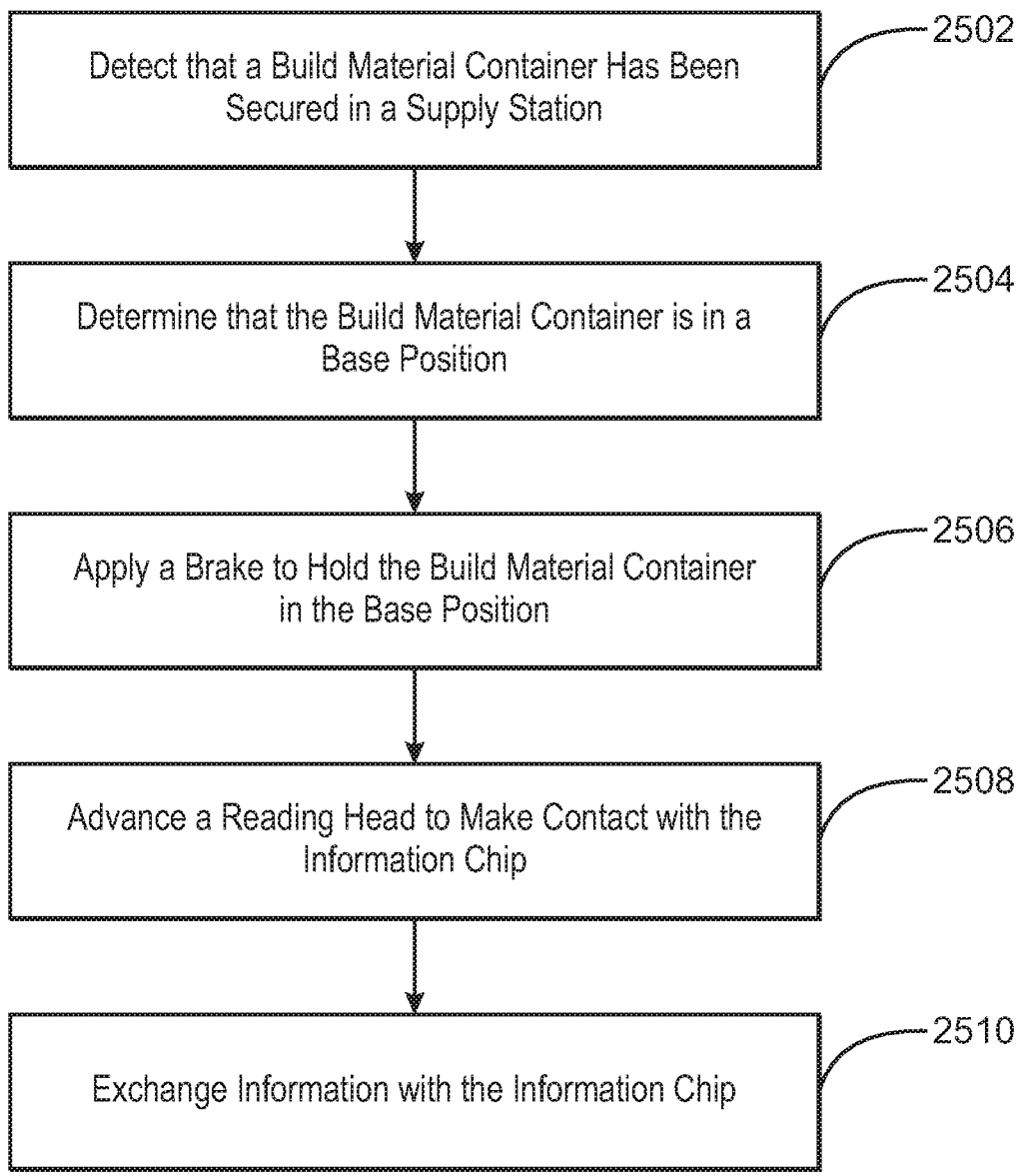
FIG. 25 is a block diagram of a method for reading an information chip on a build material container, in accordance with examples.

FIG. 25 is a block diagram of a method 2500 for reading an information chip on a build material container, in accordance with examples. The method 2500 begins at block 2502 with a detection that a build material container has been secured in the supply station. As described herein this may be done by detecting that a flag associated with the latch has moved.

At block 2504, a determination is made as to whether the build material container is in a base position. As described herein, this may be done by detecting a tab associated with the position of a cylindrical cage.

At block 2506, a brake may be applied to hold the build material container in the base position and prevent rotation. This may be done by applying a brake on the cylindrical cage as a reading head is moved towards an information chip on the build material container. At block 2508, the reading head is advanced to electrically contact the information chip.

At block 2510, information may be exchanged with the information chip. This may include reading parameters from the information chip, such as an expected weight for the build material container, an identity of a build material in the build material container, and the like. Parameters may be written to the information chip, such as a new weight for the build material container, a projected amount of build material to be dispensed from the build material container, a predicted amount of build material to be added to the build material container, or any combinations thereof.

Once the information exchange with the information chip is completed, the reading head may be withdrawn from contact with the information chip. The brake may be released from the build material container, for example, as the reading head is moved back.

Figure 26:
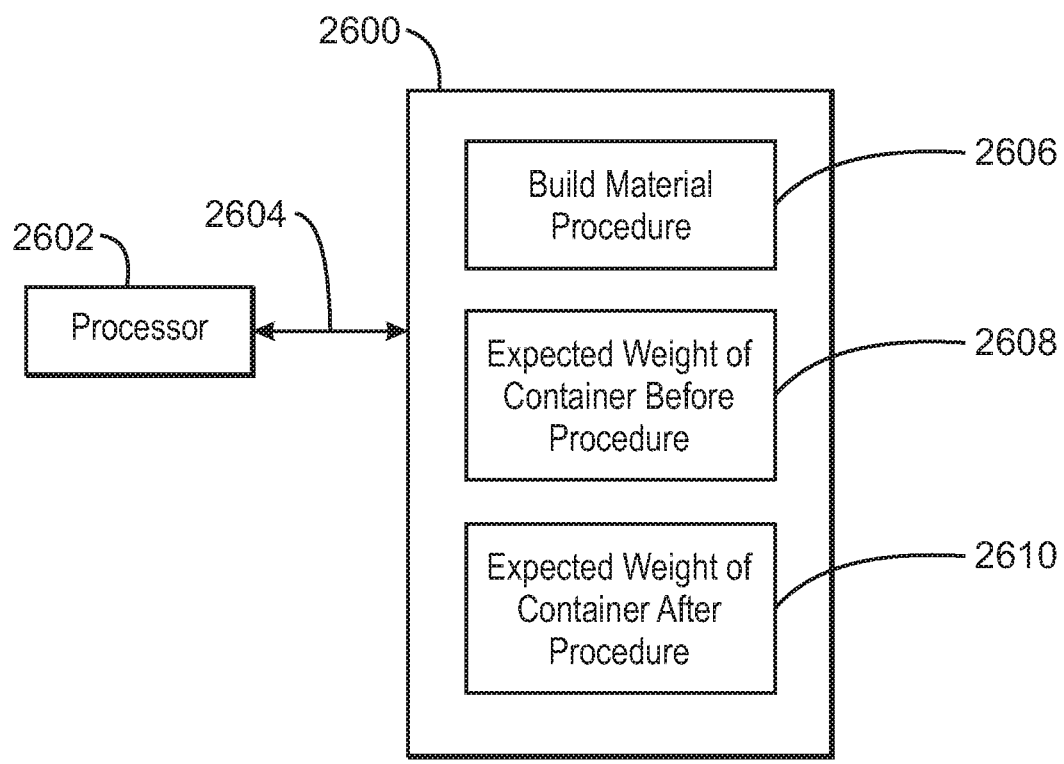
FIG. 26 is a block diagram of a non-transitory, machine-readable medium attached to a build material container, in accordance with examples.

FIG. 26 is a block diagram of a non-transitory, machine-readable medium 2600 attached to a build material container, in accordance with examples. Like numbered items are as described with respect to previous figures. The non-transitory, machine readable medium may be the information chip 424 attached to the build material container. A processor 2602, for example, in a control system of a printer, may access the non-transitory, machine readable medium over a reader mechanism 514, as indicated by arrow 2604.

The non-transitory, machine readable medium 2600 may include code 2606 to direct the processor 2602 to implement a build material procedure, such as dispensing a predetermined amount of build material from the build material container, adding a predetermined amount of build material to the build container, and the like. This may also include special instructions for using the build material in the build material container, for example, other types of build materials or conditions that may be used with the build material, such as fusing agents, fusing settings, and the like. Further, the build material procedure may be written to the non-transitory, machine readable medium 2600 after a procedure is determined by the printer. Writing the build material procedure to the information chip may provide a backup in case of a power loss during a procedure.

The non-transitory, machine readable medium 2600 may also include parameters for the build material container. These may an initial weight parameter 2608 that provides the expected weight of the build material container as inserted, before a build procedure is performed. The parameters may include a final weight parameter 2610 that provides the expected weight of the build material container after build material has been dispensed from or added to the build material container.

Other parameters and procedures may also be stored on the non-transitory, machine readable medium 2600. For example, the non-transitory, machine readable medium 2600 may include a material type for a build material in the build material container. Code may be stored on the non-transitory, machine readable medium 2600 to direct the processor to respond to a mismatch between the material type and an expected material type. These procedures may be instead of or in addition to procedures stored by a controller on the 3D printer.

Figure 27:
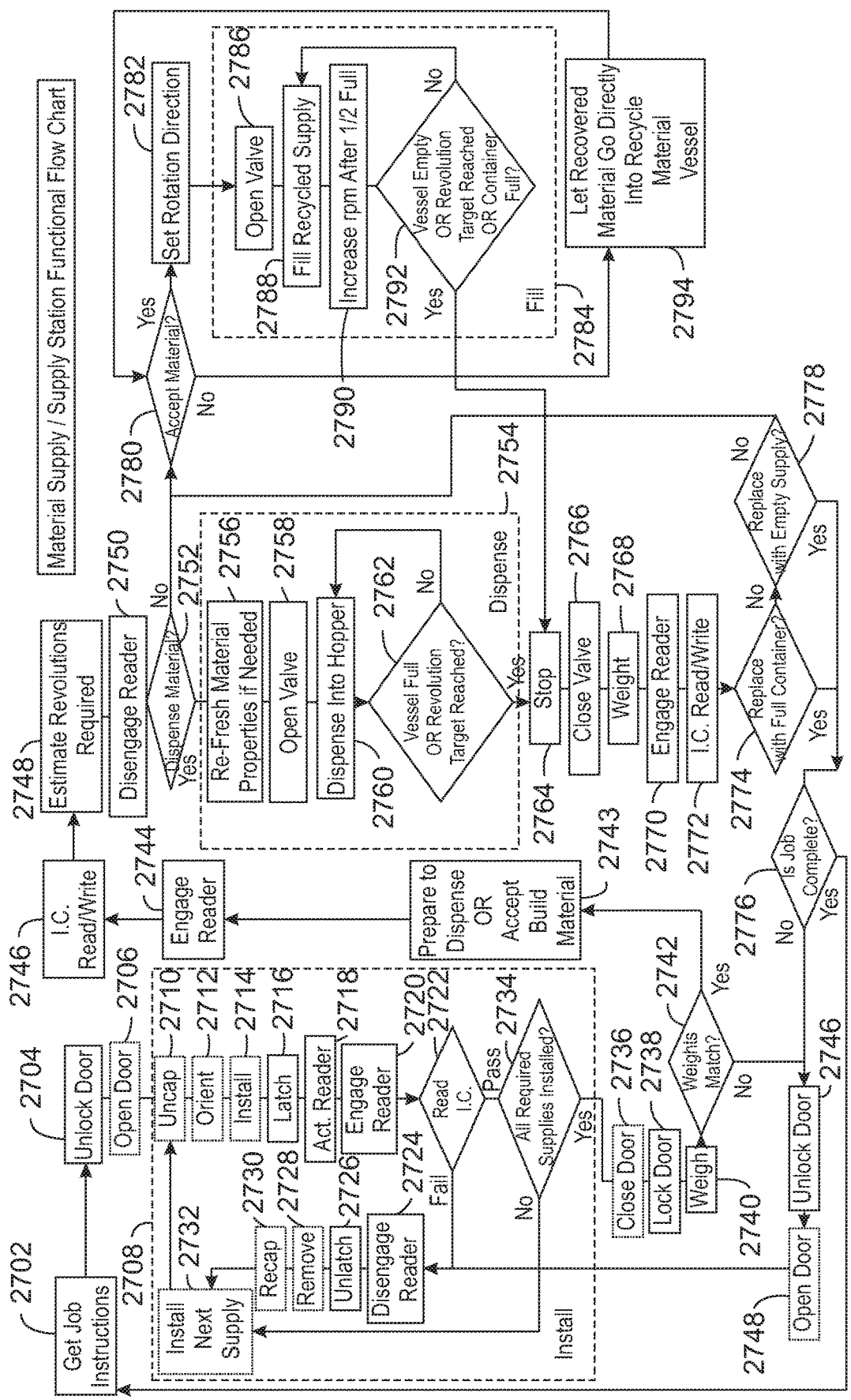
FIG. 27 is a block diagram of a method for operating a supply station for a 3D printer, in accordance with examples.

FIG. 27 is a block diagram of a method 2700 for operating a supply station for a 3D printer, in accordance with examples. The method 2700 begins at block 2702, when the 3D printer receives job instructions. These may be entered into a control system for the 3D printer from a control panel on the 3D printer, sent or obtained over a network, or read from a storage device, among others. The storage device may include a thumb drive, an optical drive, an information chip on a build material container, and the like.

Once the 3D printer has processed the instructions, at block 2704 it may unlock a door over the supply station. For example, as described with respect to FIG. 1, the door 108 may allow access to both the new supply station 112 and the recycle supply station 114.

The user may perform several actions to add build material through the supply station. For example, at block 2706 the user may open the unlocked door leading to the supply stations. The installation procedure for build material container is shown in the group of blocks labeled 2708.

As part of the installation procedure 2708, at block 2710, the user may remove a cap from a build material container holding the desired build material. The build material may be new build material, or recycled build material. At block 2712, the user may orient the build material container with the supply station. For example, a flat bottom on a build material container may be set on a flat surface in a cylindrical cage in a supply station. At block 2714, the user may then install the build material container. In an example, this may be performed by pushing the build material container into the supply station until the build material container contacts an actuating surface. The user may then push the build material container against the actuating surface until the build material container is secured.

At block 2716, the latch is released to secure the build material container as the actuating surface is moved. The release of the latch may be detected by the 3D printer, and at block 2718, a reader mechanism may be activated. The controller for the 3D printer may confirm that the build material container is in the base position, or rotation home position and that the latch is secure. At block 2720, the reader mechanism may advance a reading head to make an electrical connection with an information chip on the build material container.

At block 2722, a determination is made as to whether the information chip has been read and that the information obtained identifies the build material container as container a correct type of material. For example, if the information chip fails to read, is not correctly identified, or identifies that the build material container holds an incorrect build material, the read operation fails. Process control resumes at block 2724, where the reader mechanism withdraws the reading head from the information chip.

At block 2726, the latch may be retracted to release the build material container from the supply station. At block 2728, a user may then remove the build material container from the supply station and, at block 2730, replace the cap on the build material container. The user may then be prompted to install the next build material container at block 2732, for example, returning to block 2710 to begin with the next build material container. In some examples, no prompt is provided if the user moves directly to uncapping the next build material container for insertion.

If the read is successful at block 2722, at block 2734, a determination is made as to whether all supplies for a particular build operation have been installed. For example, this may include determining if sufficient amounts of new build material and recycle build material has been added to the printer. If not, process flow returns to block 2732 to install the next supply or other supplies, such as a fusing liquid container. For example, if a build requires the addition of a single build material container holding new build material, a single build material container holding recycle build material, and a fusing liquid, among others, the determination at block 2734 may continue to loop back to block 2732 until all materials have been added.

If all supplies have been installed at block 2734, at block 2736 the user may close the door to the supply stations. At block 2738, the controller for the 3D printer may lock the door over the supply stations.

At block 2740, the controller for the 3D printer may weigh the build material containers that have been installed. As described in examples herein, this may be performed by taking multiple readings from a strain gauge that supports the supply station holding the build material container. For example, the build material container may be rotated a certain angle clockwise from the base position before a first reading is taken from the strain gauge, then rotated counter clockwise the same angle from the base position before taking a second reading from the strain gauge. This may be performed to obtain an accurate reading when build material is piled at one side or the other of the build material container.

The angle may be determined by the critical angle of repose for the type of build material in the build material. The critical angle of repose is the steepest angle that the type of build material may be piled without slumping. Depending on the type of build material, and the coefficient of friction between the material particles, this angle may be between 0° and 90°. For example, the angle may be 20° from the base position in each direction, 45° from the base position in each direction, 90° from the base position in each direction, or any angle there between. The measurements taken at the two angles may then be used to calculate the weight of the build material container.

At block 2742, a determination may be made as to whether the expected weight read from the information chip matches the weight determined for the build material container. If the weights do not match at block 2742, the user may be alerted with a message, and the controller may unlock the door at block 2746. At block 2748 the user may open the door, and process flow may return to block 2724 to allow removal of the build material container.

At block 2743, preparations may be made to dispense build material from a build material container or add build material to a build material container. For example, measurements may be taken on levels, weights, or both of build material in the new material vessel, the recycle material vessel, the recovered material vessel, and the like. Further, the amount of material in a build material container holding recycle material may be determined from the weight prior to adding build material to the build material container.

At block 2744, the reader mechanism may advance a reading head to make an electrical connection with an information chip on the build material container. As described herein, a confirmation that the build material container is in a base position may be made before the reading head is advanced. At block 2746, the information chip may be read to determine the parameters of the build material container, or the information chip may be written with the procedure that is about to be performed, or both.

Writing the procedure to the information chip may provide a backup in case of a power loss to the 3D printer during the procedure. For example, at block 2748 the number of revolutions used to dispense a predetermined amount of build material may be estimated. This may be written to the information chip. At block 2750, the reading head may be disengaged by the reader mechanism, for example, releasing a brake on the build material container.

At block 2752, a confirmation is made as to whether build material will be dispensed. If so, process flow proceeds to a dispense procedure 2754. The dispense procedure starts at block 2756, where the material properties may be refreshed, for example, by reading the information chip. At block 2758, the valve on the build material container may be opened, for example, an auger valve may be pulled out of the build material container along a horizontal axis. At block 2760, build material may be dispensed from the build material container, for example, into the new material vessel or the recycled material vessel. Dispensing the build material from the build material container may involve rotating the cylindrical cage holding the build material container, as described herein. To determine if the dispense procedure 2754 is completed, at block 2762, a determination may be made as to whether the target vessel is full, or the number of revolutions has reached the estimated number of revolutions. If not, process flow returns to block 2760 in the dispense procedure 2754 is continued.

If the dispense procedure 2754 has been completed, the rotation of the cylindrical cage may be halted at block 2764. At block 2766, the valve on the build material container may be closed, for example, by sliding an auger valve back into the build material container along a horizontal axis. At block 2768, the build material container may be weighed, for example, as described with respect to block 2740. At block 2770, the reader may be engaged as described herein. At block 2772, the information chip may be read or written. For example, the new weight of the build material container may be written to the information chip. Further, the completed procedure may be removed from the information chip, as a backup may no longer be needed.

At block 2774, a determination may be made as to whether the build material container should be replaced with a full build material container. If so, process flow may proceed to block 2776 to determine if the build operation, or print job is complete. If not, process flow may proceed to block 2746 to unlock the door, and allow the insertion of another build material container. If at block 2776, it is determined that the job is complete, process flow may proceed to block 2702, to await job instructions for another job.

If at block 2774, it is determined that the build material container should not be replaced with a full build material container, process flow may proceed to block 2778 to determine if the build material container should be replaced with an empty container, for example, in the recycle supply station. If so, the method 2700 may proceed to block 2776 to determine if the job is complete. If not, process flow may proceed to block 2780 to determine if build material is to be added to the build material container.

If build material is to be added to the build material container, at block 2782, the rotation direction may be set to the angular direction for adding material to the build material container. In examples described herein, this is performed for the recycle supply station. Once the rotation direction has been set, process flow proceeds to a fill procedure 2784.

The fill procedure 2784 may begin at block 2786 with the opening of a valve on the build material container. This may be performed as described with respect to block 2758. At block 2788, the build material container may be rotated in the addition direction while build material is added, for example, through the auger valve. At block 2790, the rotational speed of the cylindrical cage holding the build material container may be increased when the build material container is half full, for example, as determined by the number of revolutions performed. This may assist in moving build material towards the walls of the build material container, and away from the valve. At block 2792, a determination may be made as to whether the fill procedure 2784 is completed. This may be performed by determining if the vessel from which the build material is being added is empty, if a predetermined revolution target has been reached, or if the build material container is full, among others. If the fill procedure 2784 is completed, process flow may proceed to block 2764 where the rotational motion is stopped.

If at block 2780, it is determined that build material is not to be added to a build material container, process flow may proceed to block 2794. At block 2794, recovered build material, for example, from a recovered material vessel, may be directly added to the recycled material vessel, bypassing the build material container. This may be performed using a diverter valve mechanism as described with respect to FIGS. 31 to 38.

Figure 28:
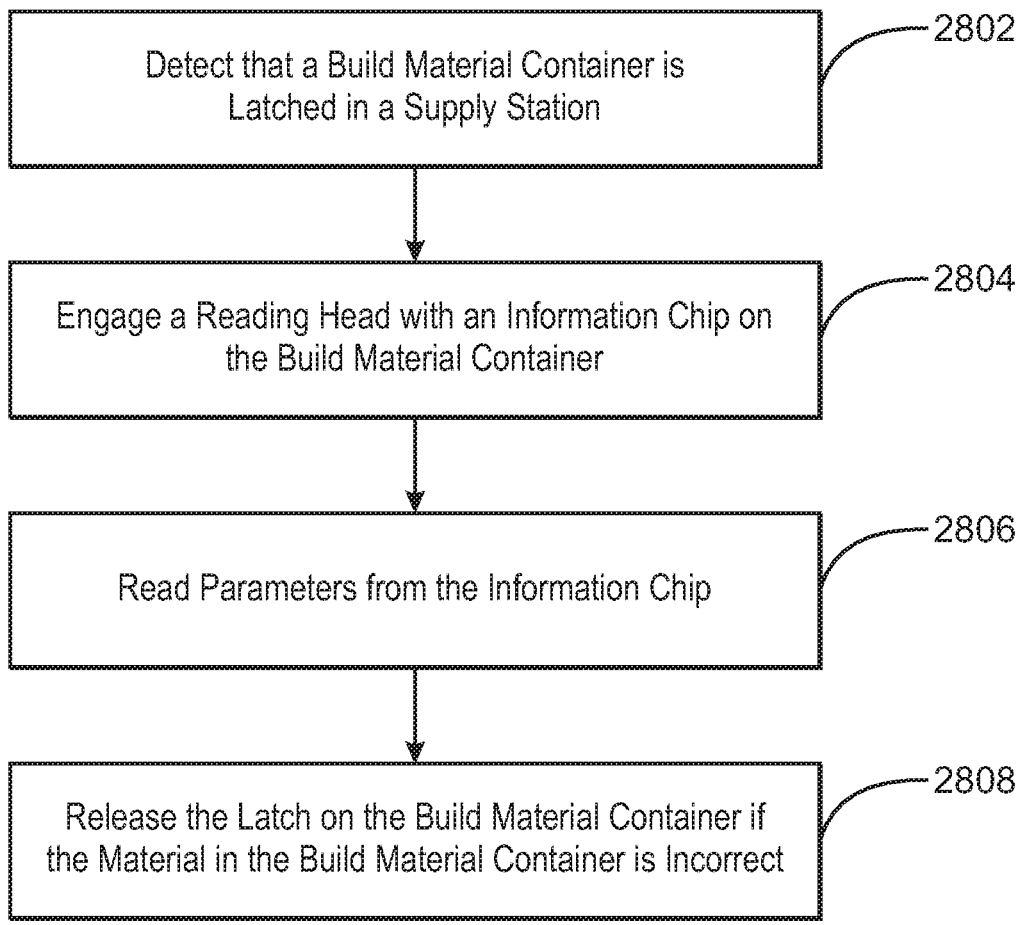
FIG. 28 is a block diagram of a method for initializing a supply station, in accordance with examples.

FIG. 28 is a block diagram of a method 2800 for initializing a supply station, in accordance with examples. The method 2800 may begin at block 2802, when it is detected that a build material container is secured, or latched, into a supply station. At block 2804, a reading head is engaged with an information chip on the build material container. At block 2806, parameters are read from the information chip. The parameters may include a material type of a build material in the build material container, an expected weight of the build material container, or procedure for the build material container, among others. At block 2808, the latch on the build material container may be released if the material type of the build material in the build material container is incorrect.

Figure 29:
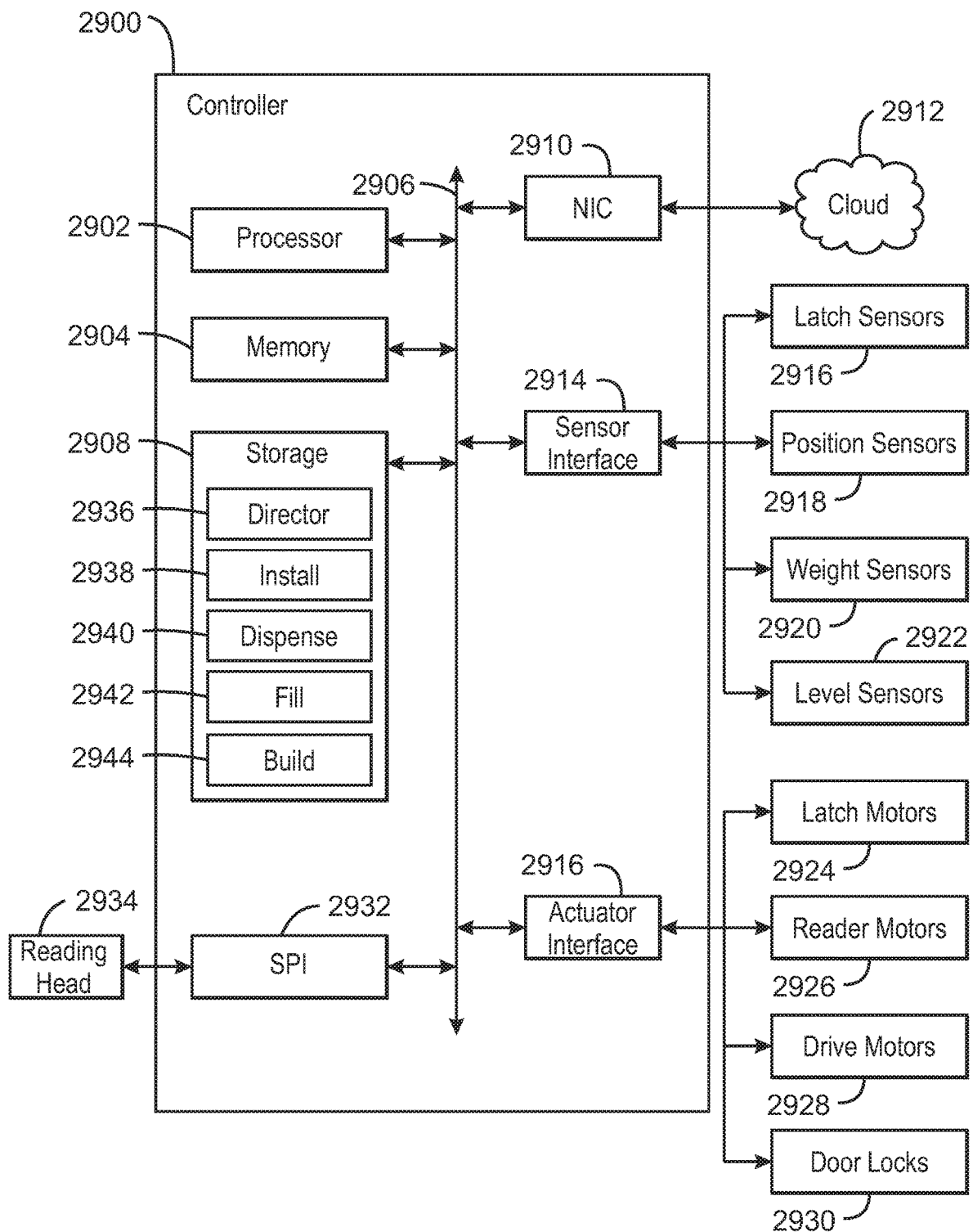
FIG. 29 is a block diagram of a controller for operating a supply station in a 3-dimensional printer, in accordance with examples.

FIG. 29 is a block diagram of a controller 2900 for operating a supply station in a 3-dimensional printer, in accordance with examples. The controller 2900 may be part of the main controller for the 3D printer, or a separate controller associated with the supply stations.

The controller 2900 may include a processor 2902, which may be a microprocessor, a multi-core processor, a multi-threaded processor, an ultra-low voltage processor, an embedded processor, or other type of processor. The processor 2902 may be an integrated microcontroller in which the processor 2902 and other components are formed on a single integrated circuit board, or a single integrated circuit, such a system on a chip (SoC). As an example, the processor 2902 may include a processor from the Intel® Corporation of Santa Clara, Calif., such as a Quark™, an Atom™, an i3, an i5, an i7, or an MCU-class processor. Other processors that may be used may be obtained from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters. The processors may include units such as an A5-A10 processor from Apple® Inc., a Snapdragon™ processor from Qualcomm® Technologies, Inc., or an OMAP™ processor from Texas Instruments, Inc.

The processor 2902 may communicate with a system memory 2904 over a bus 2906. Any number of memory devices may be used to provide for a given amount of system memory. The memory may be sized between about 2 GB and about 64 GB, or greater. The system memory 2904 may be implemented using non-volatile memory devices to protect from power loss, such as static RAM (SRAM), or memory modules having backup power, for example, from batteries, super-capacitors, or hybrid systems.

Persistent storage of information such as data, applications, operating systems, and so forth, may be performed by a mass storage 2908 coupled to the processor 2902 by the bus 2906. The mass storage 2908 may be implemented using a solid-state drive (SSD). Other devices that may be used for the mass storage 2908 include flash memory cards, such as SD cards, microSD cards, xD picture cards, and the like, and USB flash drives. In some examples, the controller 2900 may have an accessible interface, such as a USB connection, an SD card socket, or a micro-SD socket to all the insertion of memory devices with build plans, instructions, and the like.

In some examples, the mass storage 2908 may be implemented using a hard disk drive (HDD) or micro HDD. Any number of other technologies may be used in examples for the mass storage 2908, such resistance change memories, phase change memories, holographic memories, or chemical memories, among others.

The components may communicate over the bus 2906. The bus 2906 may include any number of technologies, such as industry standard architecture (ISA), extended ISA (EISA), peripheral component interconnect (PCI), peripheral component interconnect extended (PCIx), PCI express (PCIe), or any number of other technologies. The bus 2908 may include proprietary bus technologies, for example, used in a SoC based system. Other bus systems may be included, such as an I2C interface, I3C interface, an SPI interface, point to point interfaces, and a power bus, among others. A network interface controller (NIC) 2910 may be included to provide communications with a cloud 2912 or network, such as a local area network (LAN), a wide area network (WAN), or the Internet.

The bus 2906 may couple the processor 2902 to interfaces 2914 and 2916 that are used to connect to other devices in the 3D printer. For example, as described with respect to FIGS. 3 and 4, a sensor interface 2914 may be used to couple to latch sensors 2916 to detect if a build material container is latched in a supply station, and position sensors 2918 to detect if a build material container is in a base position in a supply station. Other sensors that may be present in examples include weight sensors 2920 to determine the weights of various containers or vessels, such as the supply stations, the new material vessel, the recycle material vessel, or the recovered material vessel, among others. Level sensors 2922 may be coupled to the sensor interface 2914 to monitor the level of build material in various vessels, such as the new material vessel, the recycle material vessel, or the recovered material vessel, among others.

An actuator interface 2916 may be included to control various actuators in the 3D printer. The actuators may include latch motors 2924, to release build material containers from supply stations, and reader motors 2926 to move reading heads towards, and away from, information chips on build material containers. Drive motors 2928 may be used to rotate cylindrical cages that hold build material containers. The drive motors 2928 may be stepper motors, server motors, or other kinds of motors that have rotation controlled by the supplied power signal, allowing the number of revolutions per minute in total revolutions to be controlled by the actuation. In some examples, a sensor may be used to determine the number of revolutions, for example, the position sensors 2918 may be used to count the number of revolutions of the cylindrical cage in the new supply station or the recycle supply station. The actuation interface 2916 may also couple to door locks 2930 which may be used to lock the doors to prevent access to the build material containers while they are being moved.

A serial peripheral interface (SPI) 2932 may be coupled to the reading head 2934 for interface with an information chip. Other types of interfaces may also be used to read the information chip, such as a two wire I2C serial bus. In some examples, the information chip may be accessed through an RFI system.

While not shown, various other input/output (I/O) devices may be present within, or connected to, the controller 2900. For example, a display panel may be included to show information, such as build information, action prompts, warnings of incorrect material, or messages concerning status of doors, build material containers, and the like. Audible alarms may be included to alert a user of a condition. An input device, such as a touch screen or keypad may be included to accept input, such as instructions on new builds, and the like.

The mass storage 2908 may include modules to control the supply stations, as described herein. Although shown as code blocks in the mass storage 2908, it may be understood that any of the modules may be fully or partially implemented in hardwired circuits, for example, built into an application specific integrated circuit (ASIC). The modules may generally be used to implement the functions described with respect to FIG. 27.

A director module 2936 may implement the general functions for setting up the supply station and build procedures. These may include the general operations not included in one of the more specific procedures, such as getting job instructions, estimating revolutions required to dispense or add build material, and moving recovered build material directly into the recycle material vessel past the recycle supply station.

An install module 2938 may implement the installation procedure 2708 described with respect to FIG. 27. This may include the actions used to install a build material container in a supply station, for example, determining if the build material container includes the correct material type, and rejecting the build material container if not, among others.

A dispense module 2940 may implement the dispense procedure 2754 described with respect to FIG. 27. This may include the actions used to dispense build material from a build material container, such as monitoring the number of revolutions of the build material container during the dispense procedure 2754 and the level of the vessel accepting the build material, among others.

A fill module 2942 may implement the fill procedure 2784 described with respect to FIG. 27. This may include the actions used to add build material to a build material container in the recycle supply station.

Other functions may be present, including, for example, a build module 2944. The build module 2944 may direct the build procedure for forming the 3D object.

Figure 30:
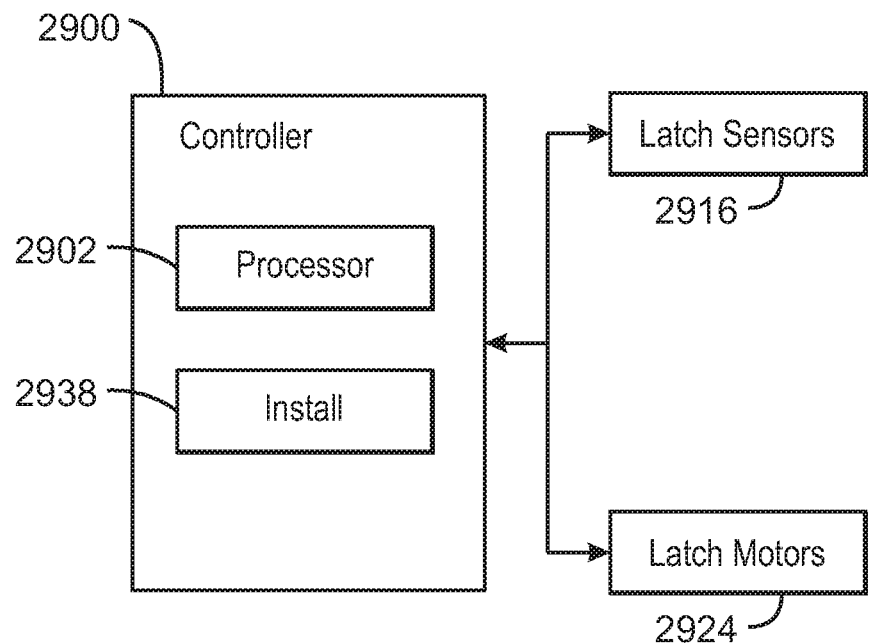
FIG. 30 is a simplified block diagram of a controller for initializing a supply station, in accordance with examples.

FIG. 30 is a simplified block diagram of a system for initializing a supply station, in accordance with examples. Like numbered items are as described with respect to FIG. 29. In this example, a controller 2900 includes a processor 2902 to execute modules. An install module 2938 may be included to confirm parameters of a build material container after determining that the build material container is secured into a supply station by one of the latch sensors 2916. The install module 2938 may determine if the parameters of the build material container match expected parameters, and unlatch the build material container if the parameters do not match the expected parameters, for example, by actuating one of the latch motors 2924.

Figure 31:
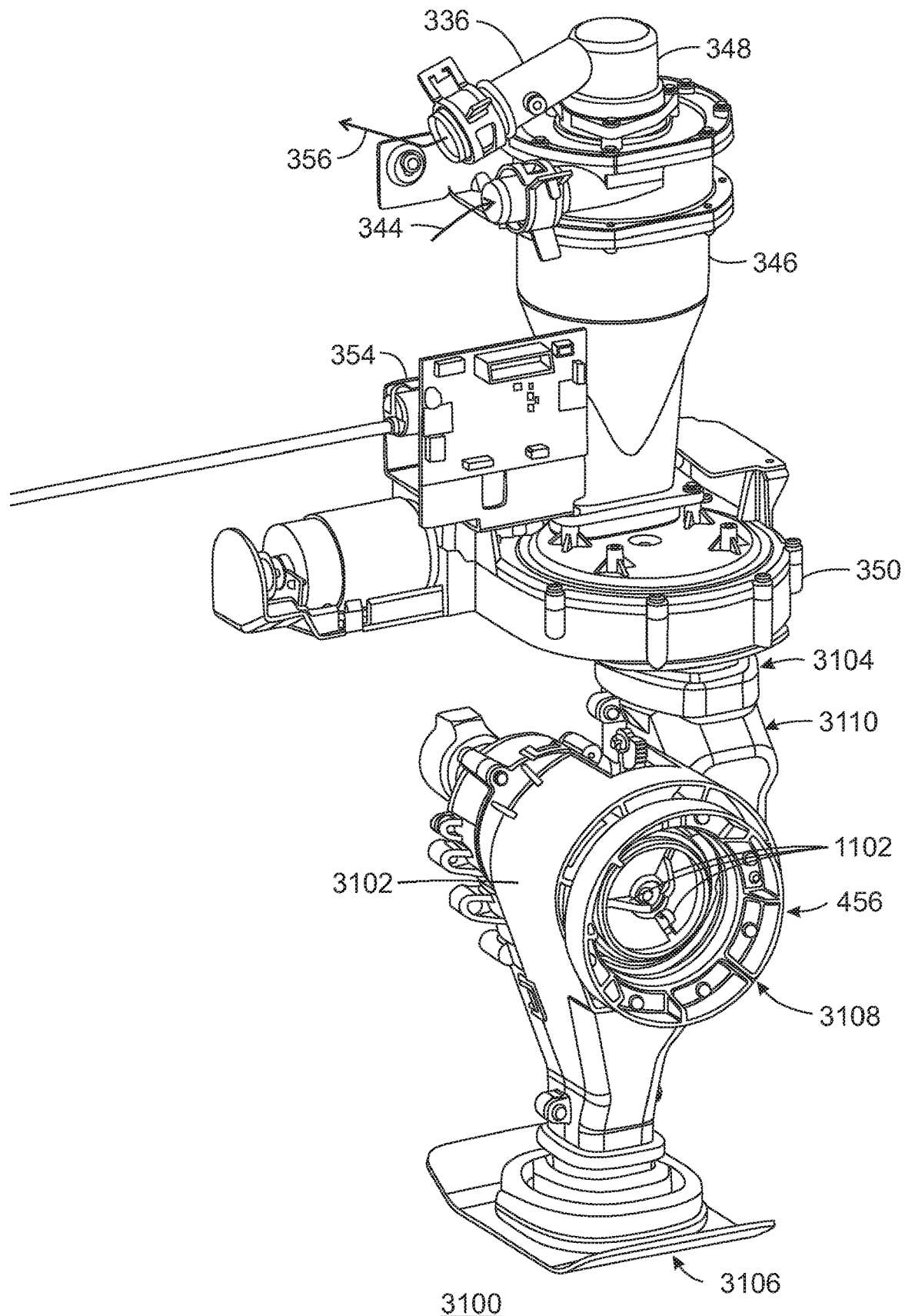
FIG. 31 is a drawing of a build material mechanism in a recycle supply station for directing build material to a build material container or a recycled material vessel, in accordance with examples.

FIG. 31 is a drawing of a build material routing mechanism 3100 in a recycle supply station for directing build material to a build material container or a recycled material vessel, in accordance with examples. Like numbered items are as described with respect to FIGS. 3 and 4. The build material mechanism 3100 may include a diverter valve mechanism 456 to direct build material to different destinations.

The diverter valve mechanism 456 has a valve body 3102 that has a top opening 3104, a bottom opening 3106, and a front opening 3108. The front opening 3108 may be located at the back of a recycle supply station, for example, opposite the insertion point for a build material container, and is configured to couple to a build material container. In some examples, build material from a feeder 350 may enter the top opening 3104 of the diverter valve mechanism 456. If the pulling mechanism 1102 is in a first or closed position, a diverter valve 3110 may direct build material from the top opening 3104 to the bottom opening 3106. In other examples, if the pulling mechanism 1102 is in a second or open position, for example, having opened an auger valve on a build material container, the diverter valve 3110 may direct build material from the top opening 3104 to the front opening 3108, to be offloaded to the build material container.

Figure 32:
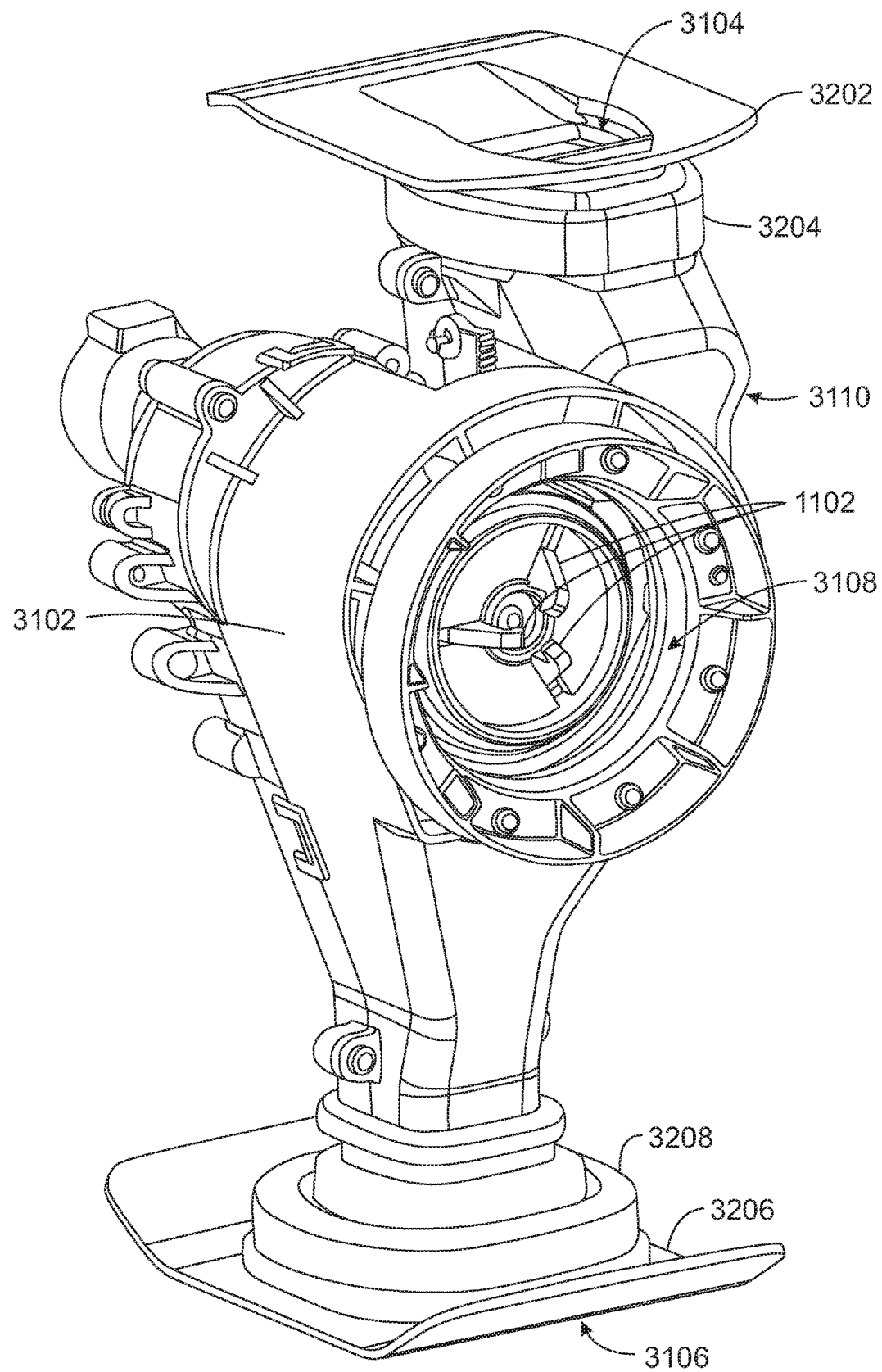
FIG. 32 is a perspective view of the diverter valve mechanism for a recycle supply station, in accordance with examples.

FIG. 32 is a perspective view of the diverter valve mechanism 456 for a recycle supply station, in accordance with examples. Like numbered items are as described with respect to FIGS. 4 and 36. In this perspective view, the pulling mechanism 1102 is shown in the first or closed position. In this position, build material entering through the top opening 3104 would be directed to the bottom opening 3106.

As mentioned, the diverter valve mechanism 456 may include a top sliding plate 3202 attached to the valve body 3102 by a flexible collar 3204. Similarly, a bottom sliding plate 3206 may be attached to the valve body 3102 by another flexible collar 3208. The sliding plates 3202 and 3206 may allow the recycle supply station to be easily removed or installed in the 3D printer, making servicing easier. For example, the recycle supply station may be removed by disabling the diverter valve mechanism 456, for example, by the disconnection of a wiring harness. One or more fasteners that hold the recycle supply station in the 3D printer may be removed, and the recycle supply station may be slid out. Similar construction and operations may be used to remove the new supply station described with respect to FIGS. 2, 3, and 4.

Either supply station may be installed in a 3D printer by sliding the recycle supply station into the 3D printer, engaging the sliding plates 3202 and 3206 with the feeder 350 and recycled material vessel 208. One or more fasteners may be installed to hold the supply station in place, and the valve mechanism may be enabled, along with the rest of the sensors and actuators for the supply station, for example, by the connection of a wiring harness.

Figure 33:
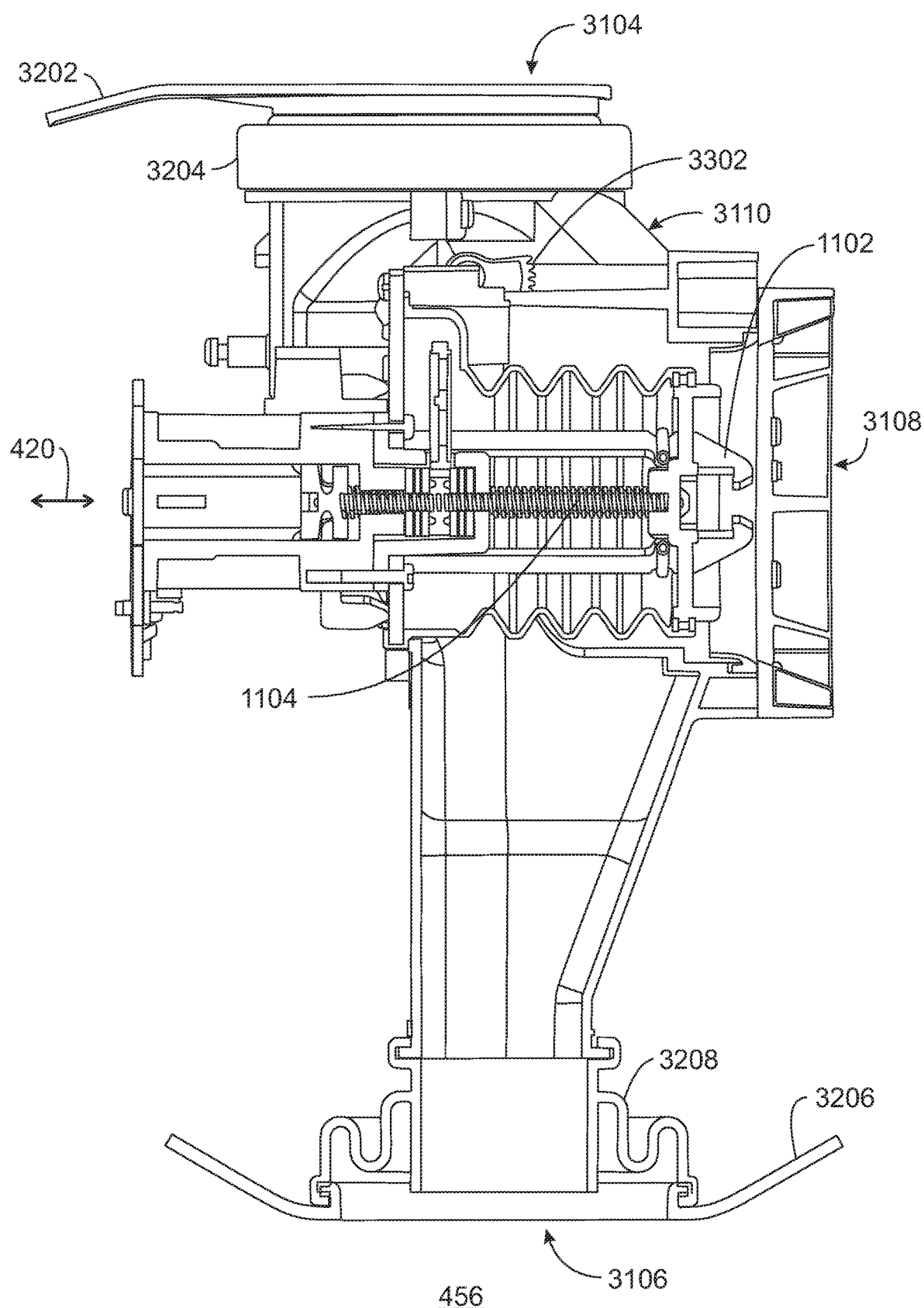
FIG. 33 is a side cross-sectional view of the diverter valve mechanism for a recycle supply station, in accordance with examples.

FIG. 33 is a side cross-sectional view of the diverter valve mechanism 456 for a recycle supply station, in accordance with examples. Like numbered items are as described with respect to previous figures. As for FIGS. 31 and 32, the pulling mechanism 1102 is shown in the first or closed position in FIG. 33. This would direct build material from the top opening 3104 to the bottom opening 3106.

In this example, as the actuating mechanism 1104 is moved along the horizontal axis 420, a diverter gear 3202 is rotated to move a diverter flap in the diverter valve 3110 to direct the build material to the bottom opening 3106 or, in other examples, to the front opening 3108.

Figure 34:
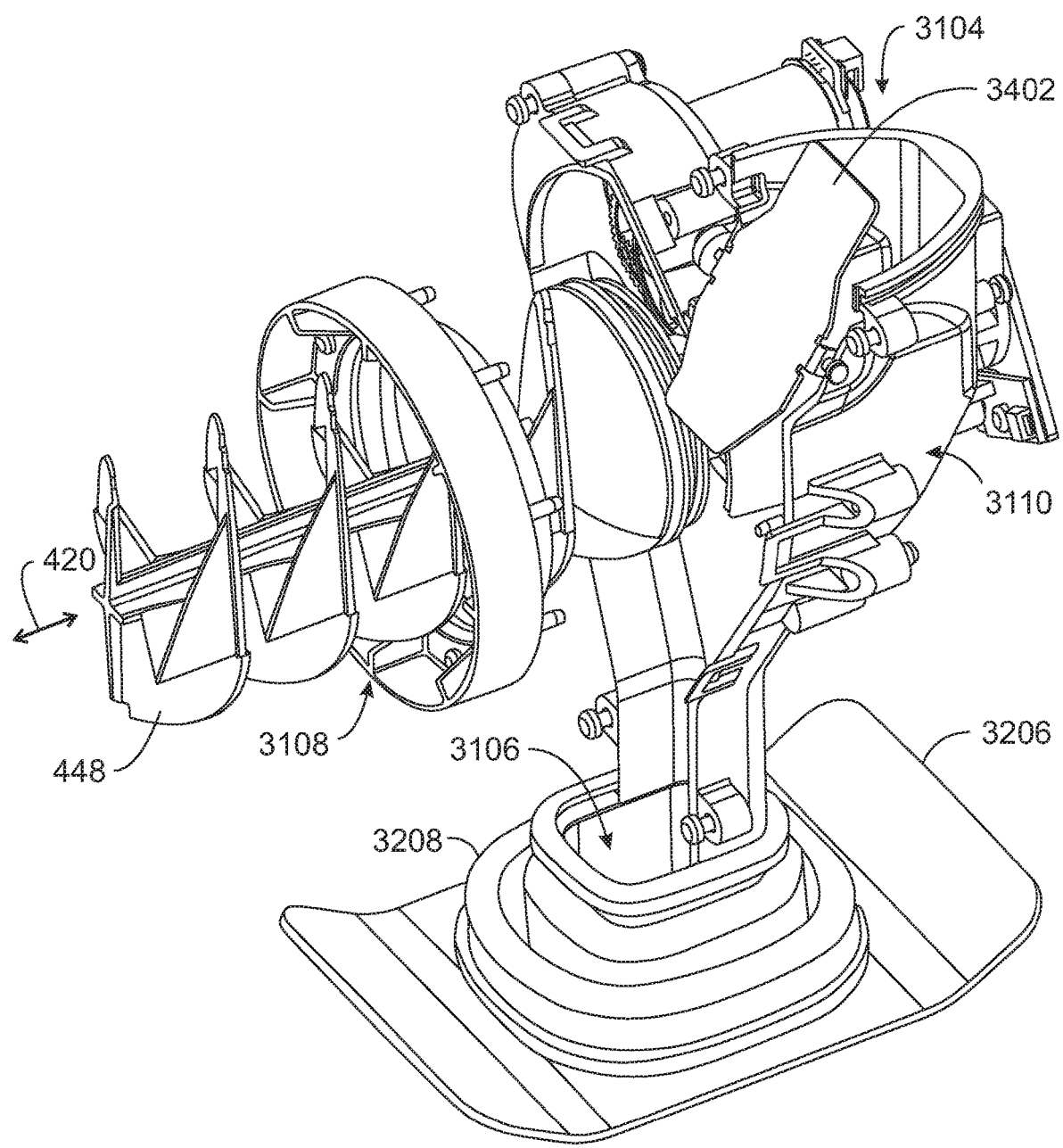
FIG. 34 is a cutaway view of the diverter valve mechanism for a recycle supply station, in accordance with examples.

FIG. 34 is a cutaway view of the diverter valve mechanism 456 for a recycle supply station, in accordance with examples. Like numbered items are as described with respect to previous figures. In the example shown in FIG. 34, an auger valve 448 has been pulled into an open position along the horizontal axis 420. In this second or open position a diverter flap 3402 in the diverter valve 3110 directs build material from the top opening 3104 to the auger valve 448 to be added to a build material container through the front opening 3108.

Figure 35:
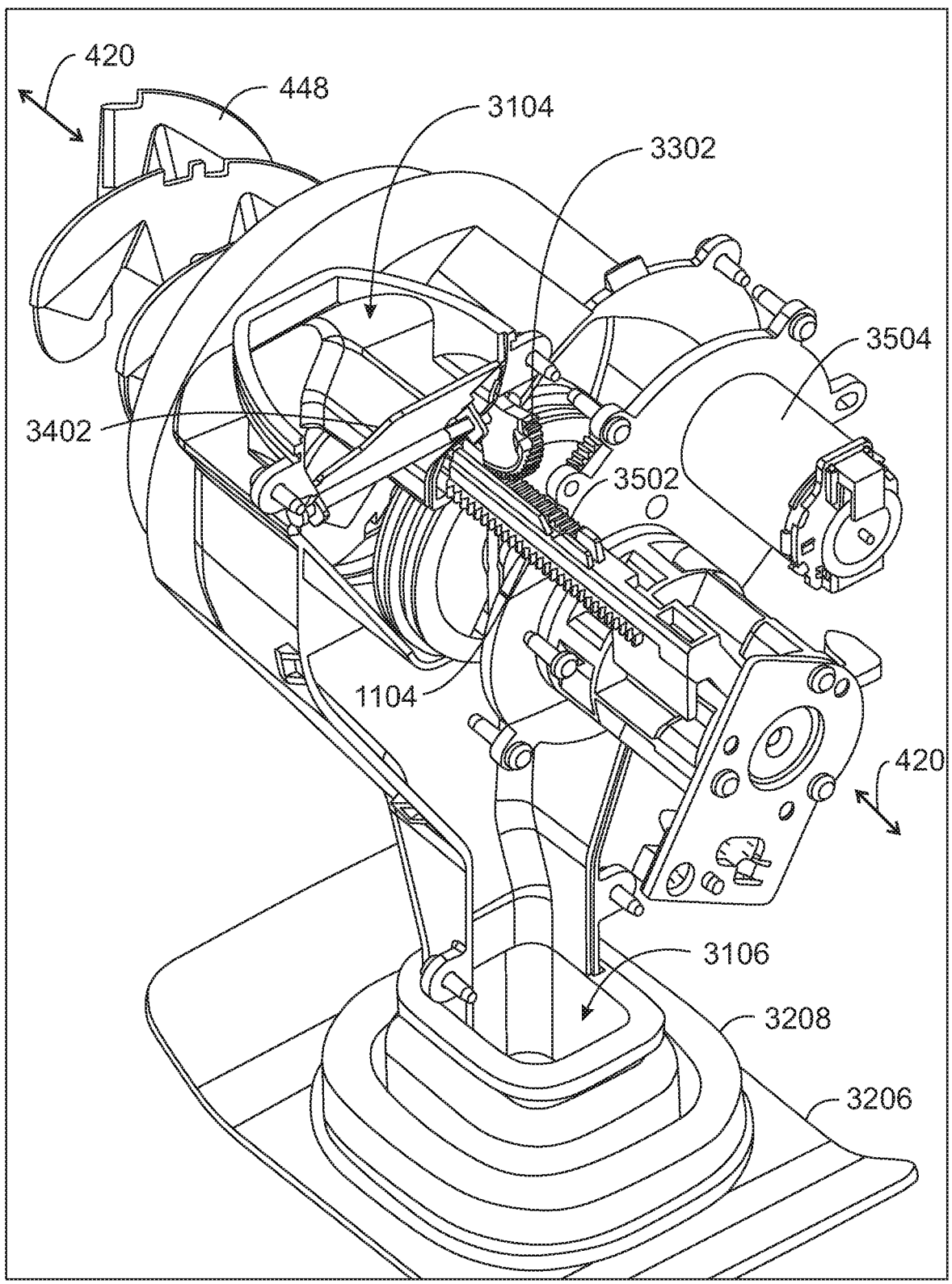
FIG. 35 is another cutaway view of the diverter valve mechanism for a recycle supply station, in accordance with examples.

FIG. 35 is another cutaway view of the diverter valve mechanism 456 for a recycle supply station, in accordance with examples. Like numbered items are as described with respect to previous figures. A rack gear 3502 may be attached to the actuating mechanism 1104 to engage with the diverter gear 3302, for example, in a rack and pinion configuration, and move the diverter flap 3402 as the actuating mechanism 1104 is moved along the horizontal axis 420. In this example, an auger valve 448 has been pulled into the open position along the horizontal axis 420, moving the diverter valve 3402 into a position to feed build material entering through the top opening 3104 to the auger valve 448 for addition to the build material container.

A valve motor 3504, or other powered actuation mechanism may be used to drive the actuating mechanism 1104. The valve motor 3504 may be a stepper motor, a servo motor, or other motor having precise movement controlled by the actuation signal. In some examples, the valve motor 3504 may be a simple AC or DC direct drive motor, to move the actuating mechanism 1104 between the first position and the second position.

Figure 36:
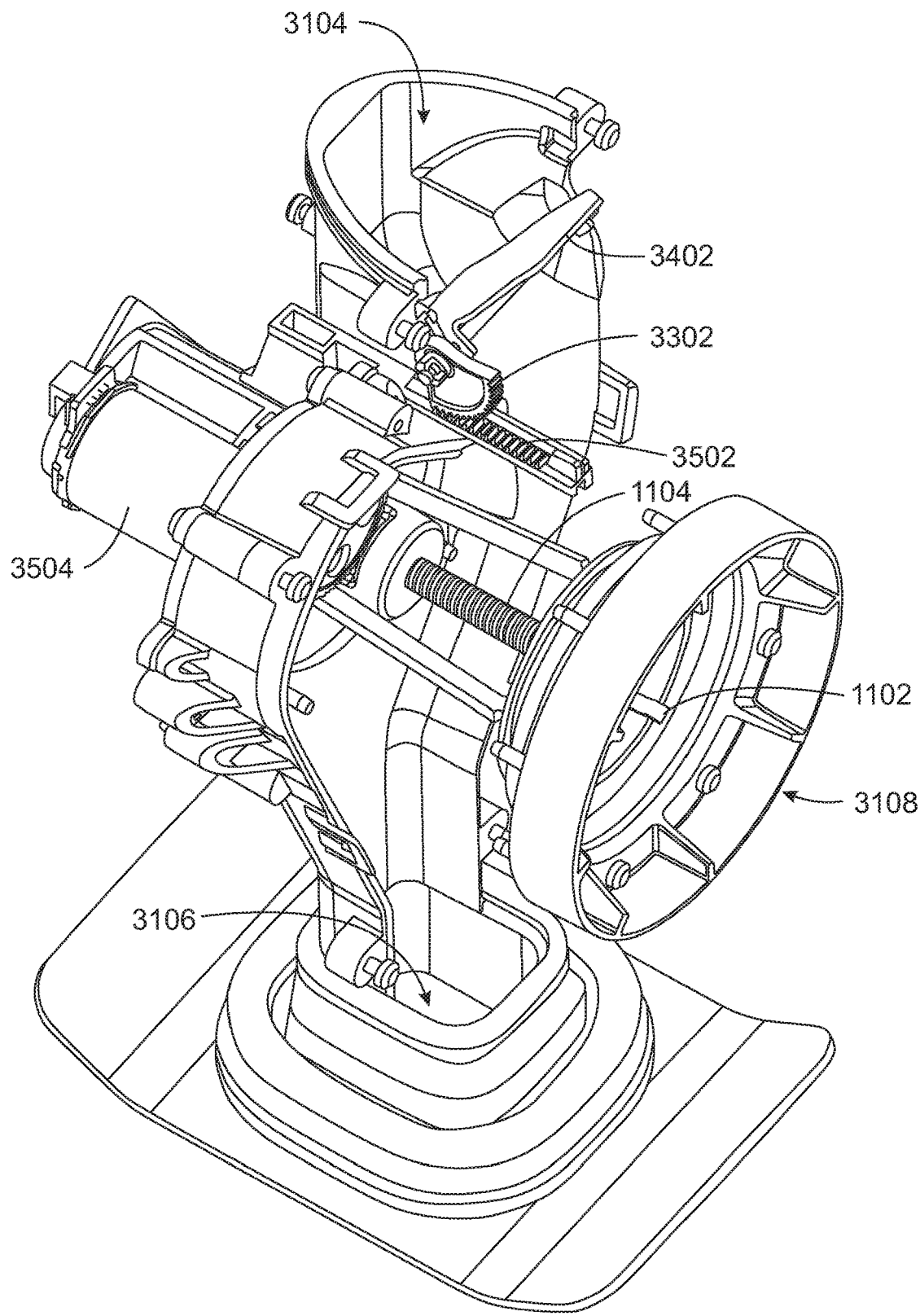
FIG. 36 is another cutaway view of the diverter valve mechanism for a recycle supply station, in accordance with examples.
Figure 37:
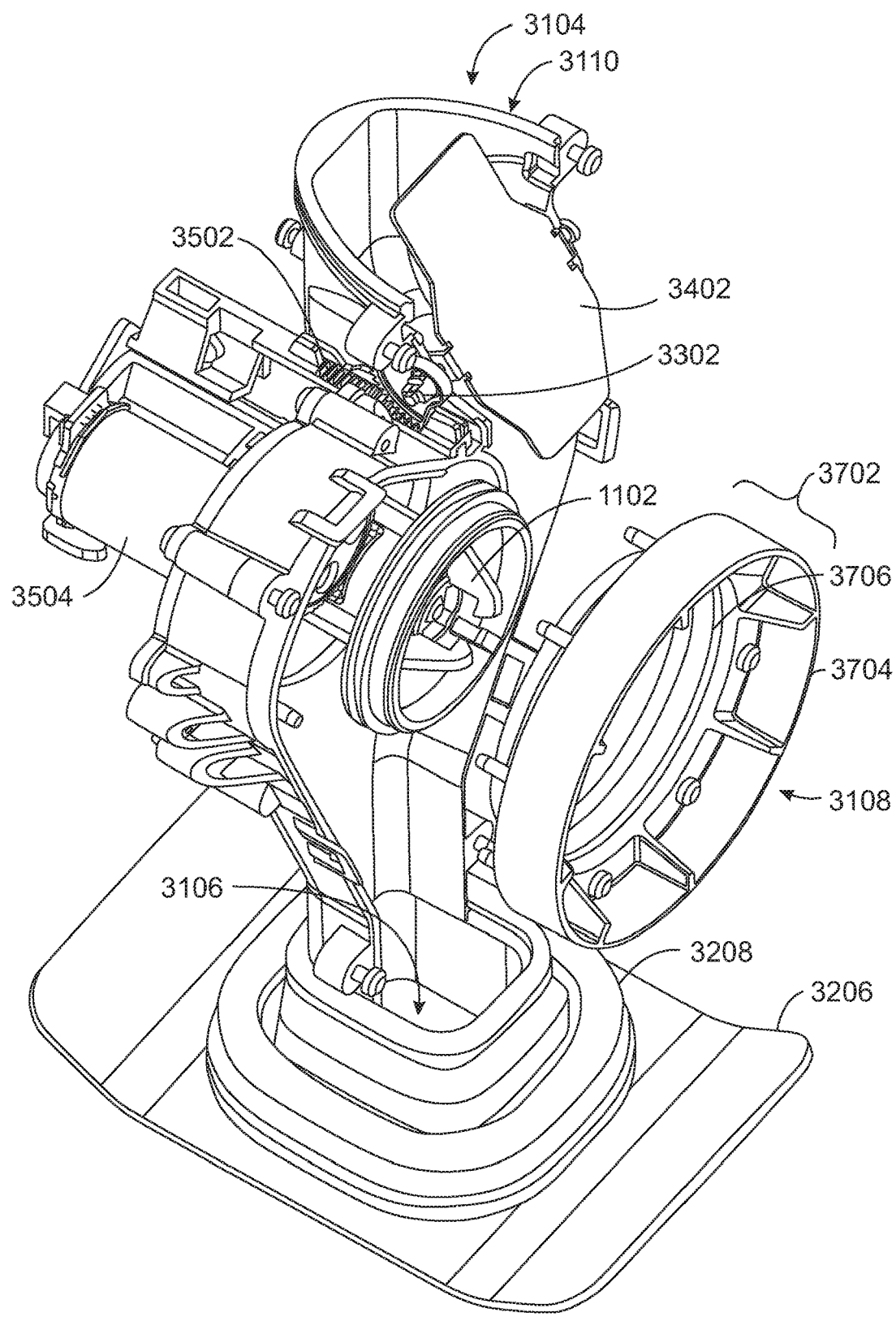
FIG. 37 is another cutaway view of the diverter valve mechanism for a recycle supply station, in accordance with examples.

FIG. 36 is another cutaway view of the diverter valve mechanism 456 for a recycle supply station, in accordance with examples. Like numbered items are as described with respect to previous figures. FIGS. 36 and 37 provide a comparison of the first or closed position and the second or open position, respectively. In the example shown in FIG. 36, the actuating mechanism 1104 has moved the valve puller 1102 to the closed position, for example, closing a build material container if one is present.

In this position, the diverter flap 3402 is positioned to direct build material entering through the top opening 3104 to the bottom opening 3106. For example, this may be used to move recovered material 216 from the recovered material vessel 212 to the recycled material vessel 208, as described with respect to FIG. 2. In some examples, a build material container is not present while the build material is directed from the top opening 3104 to the bottom opening 3106.

FIG. 37 is another cutaway view of the diverter valve mechanism 456 for a recycle supply station, in accordance with examples. Like numbered items are as described with respect to previous figures.

In the example shown in FIG. 37, the actuating mechanism 1104 has moved the valve puller 1102 to the open position, for example, pulling out an auger valve to open a build material container. In this position, the diverter flap 3402 is positioned to direct build material entering through the top opening 3104 to the front opening 3108 for addition to a build material container. For example, this may be used to move recovered material 216 from the recovered material vessel 212 to a build material container, as described with respect to FIG. 2. Further, this may be used to offload recycled material from the recycled material vessel 208.

The cutaway view of the diverter valve mechanism 456 also illustrates the compliant seal 3702 used to couple to a build material container. The compliant seal 3702 may include a guide ring 3704 to direct a build material container into contact with a contact surface of a seal ring 3706. As described further with respect to FIGS. 39 to 43, the seal ring 3706 is configured to retain build material as it is transferred between the diverter valve mechanism 456 and a build material container.

Figure 38:
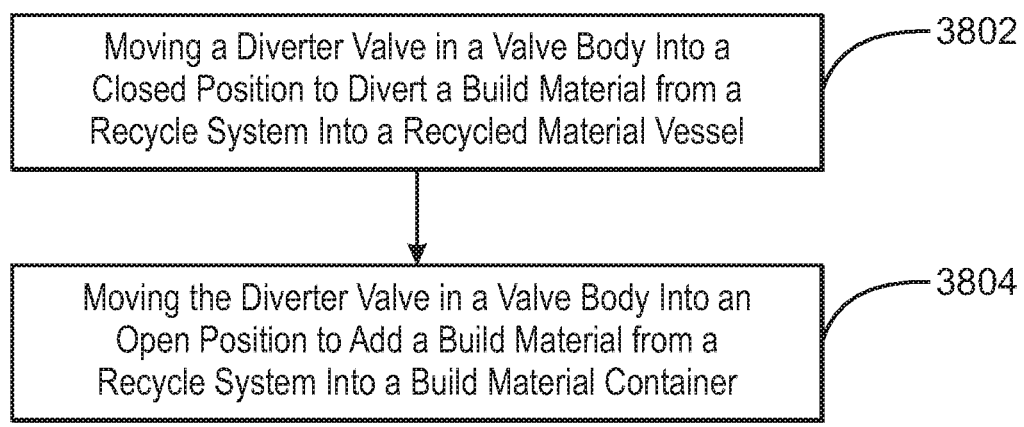
FIG. 38 is a block diagram of a method for operating a diverter valve mechanism in a recycle supply station, in accordance with examples.

FIG. 38 is a block diagram of a method 3800 for operating a diverter valve mechanism in a recycle supply station, in accordance with examples. The method 3800 may begin at block 3802, when a diverter valve in a valve body is moved into a closed position to divert a build material from a recycle system into a recycled material vessel. At block 3804, the diverter valve may be moved into an open position to add build material from a recycle system into a build material container.

Figure 39:
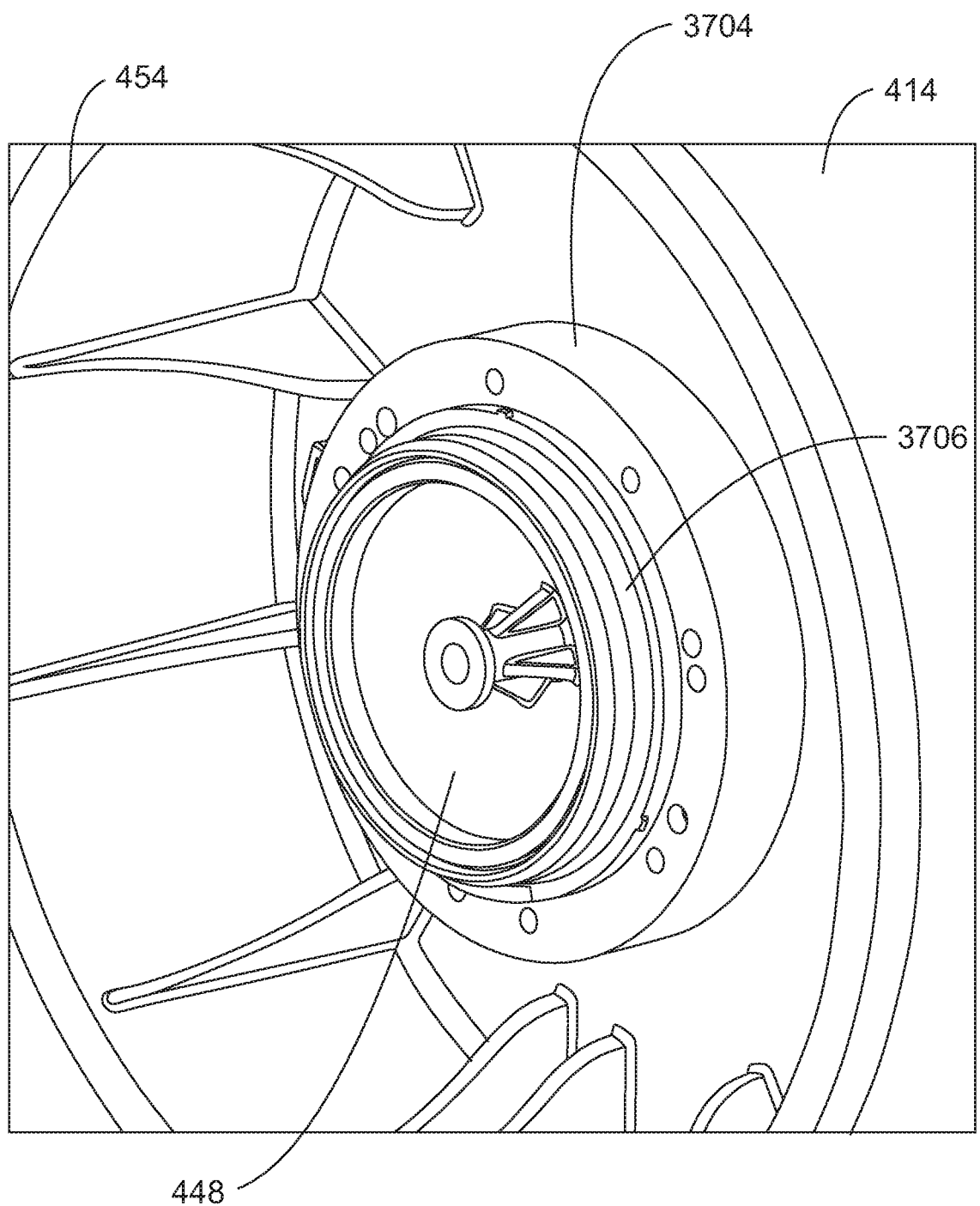
FIG. 39 is a cutaway view of a head of a build material container in contact with a seal ring that allows the build material container to rotate freely, in accordance with examples.

FIG. 39 is a cutaway view of a head 454 of a build material container 414 in contact with a seal ring 3706, for example, in the compliant seal of the valve mechanism, that allows the build material container 414 to rotate freely, in accordance with examples. Like numbered items are as described with respect to previous figures. While the cylindrical cage rotates the build material container 414 in contact with the seal ring 3706, the valve mechanism, remains fixed in place. The seal ring 3706 maintains a sealed channel between the valve mechanism and the build material container, which may help to retain the build material in either the valve mechanism or the build material container during operations, preventing the loss of build material, or lessening the chances of a spill. Referring also to FIGS. 1, 4, and 37, the compliant seal 3702 may be used in the dispense valve mechanism 446 of the new supply station 112, or the diverter valve mechanism 456 of the recycle supply station 114, or both.

The materials of the seal ring 3706 may be selected to provide a low coefficient of friction between a contact surface of the seal ring 3706 and the build material container 414, for example, to allow free rotation of the build material container 414 in contact with the seal ring 3706. The contact surface of the seal ring 3706 may be the same as or different from the bulk material of the seal ring 3706.

Materials that may be chosen for the contact surface of the seal ring 3706, or for the entire seal ring 3706, may include, for example, polytetrafluoroethylene (PTFE), a blend of nylon with PTFE, a polyoxomethylene (POM), a polyurethane, or blend with a perfluoropolyether, among others. These materials may be used in laminations over the seal ring 3706 or to form the entire seal ring 3706. Further any number of combinations of these materials may be used to achieve a low coefficient of friction with the build material container 414 and a desired lifespan.

The materials used to form the guide ring 3704 may be selected to provide a long lifespan and impact resistance as build material containers are removed and inserted in the supply stations. For example, the guide ring 3704 may be formed from polyether ether ketone, polyphenylene sulfide, or metal, among others.

Figure 40:
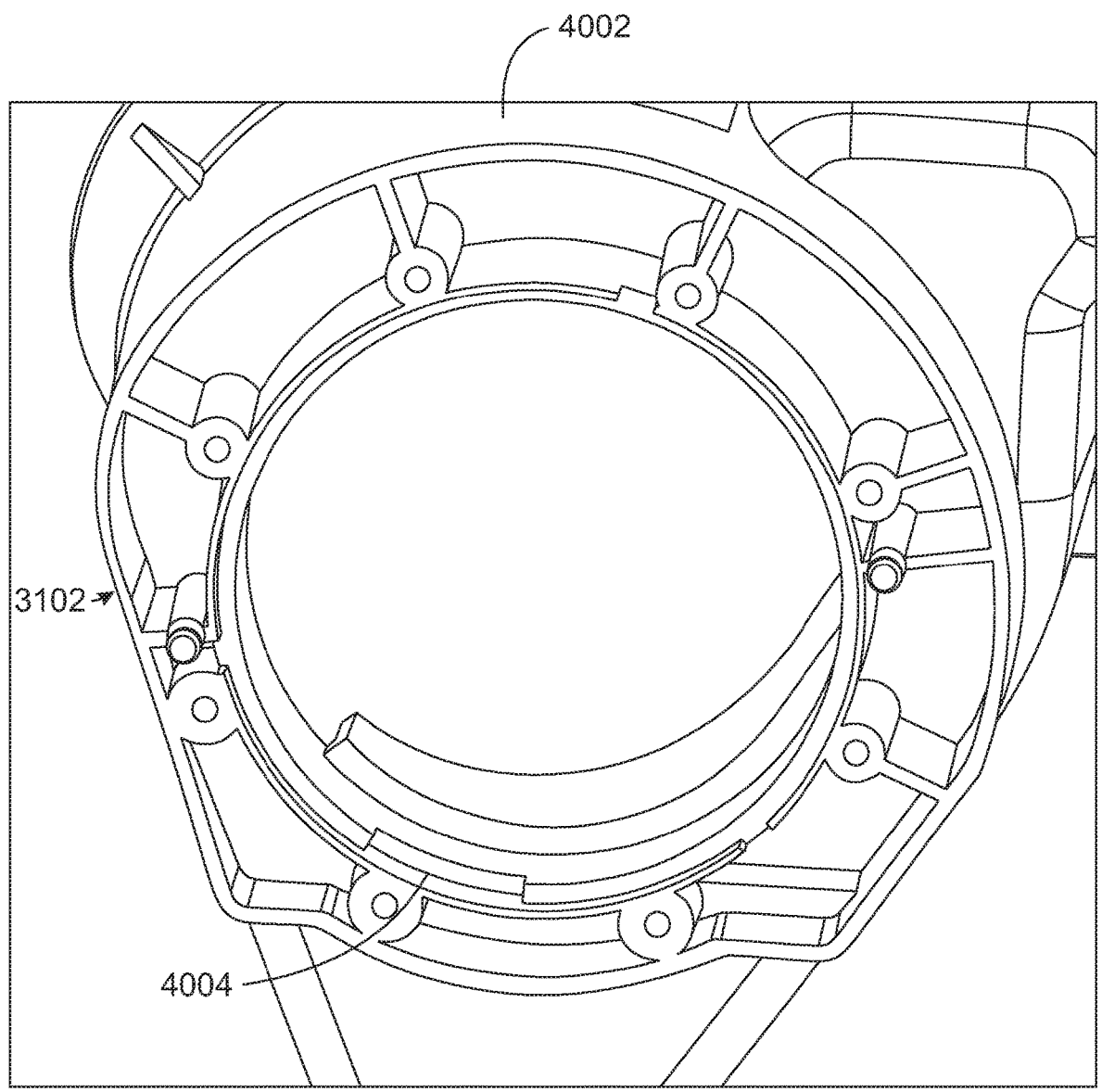
FIG. 40 is a drawing of a face of a valve mechanism after removal of a seal ring and guide ring, in accordance with examples.

FIG. 40 is a drawing of a face 4002 of a valve mechanism after removal of a seal ring 3706 and guide ring 3704, in accordance with examples. Like numbered items are as described with respect to previous figures. The face 4002 may include a notch 4004, or other feature on the face 4002 of the valve mechanism to mate with a corresponding feature on the back surface of the seal ring 3706. This may be used to prevent the seal ring 3706 from rotating with the build material container. Referring also to FIGS. 1 to 4, the valve mechanism may include the dispense valve mechanism 446 of the new supply station 112 or the diverter valve mechanism 456 of the recycle supply station 114.

Figure 41:
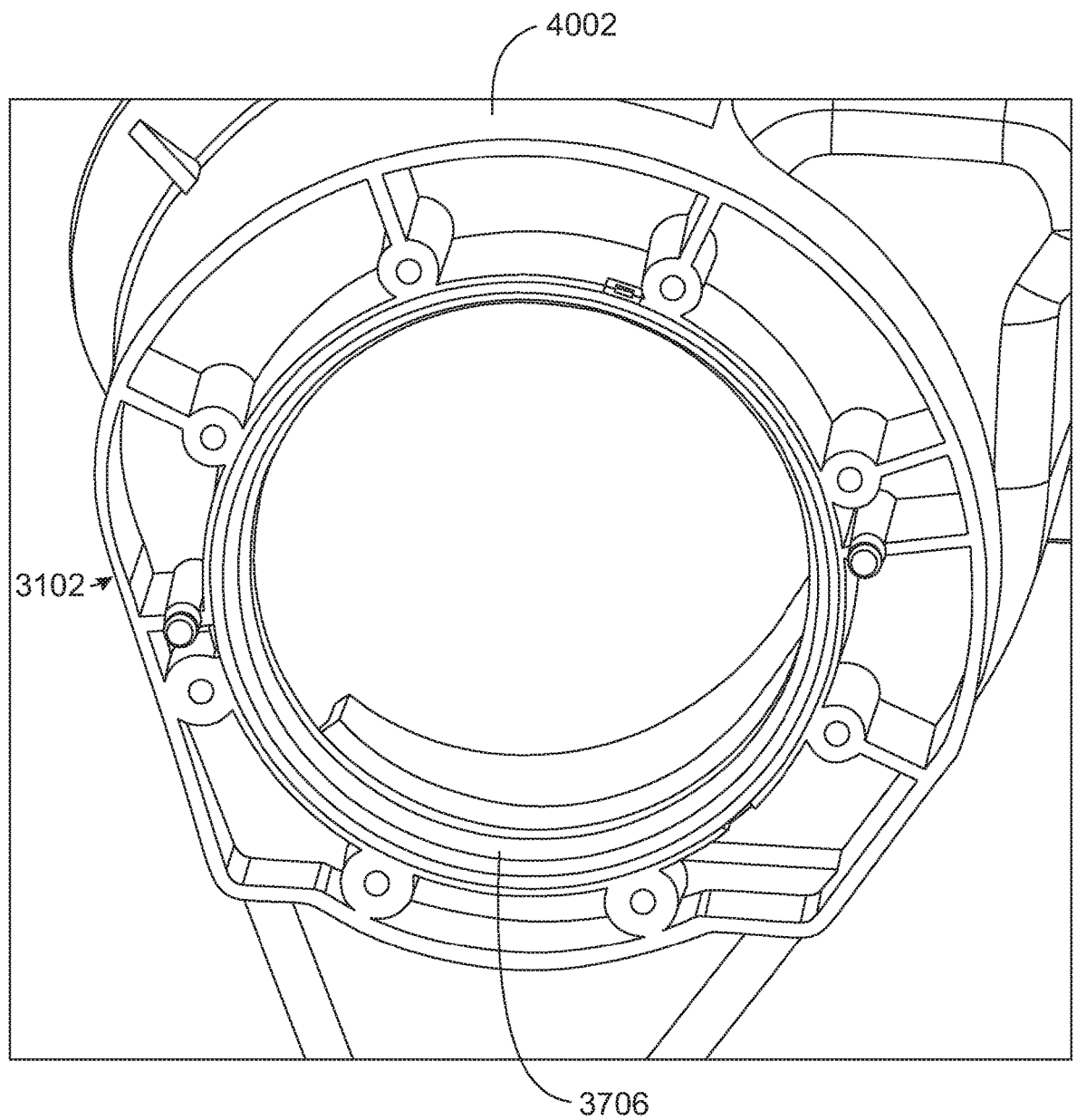
FIG. 41 is a drawing of the face of the valve mechanism illustrating the seal ring, in accordance with examples.

FIG. 41 is a drawing of the face 4002 of the valve mechanism illustrating the seal ring 3706, in accordance with examples. Like numbered items are as described with respect to previous figures. In this example, the seal ring 3706 is seated on the face 4002 of the valve mechanism with a feature of the seal ring 3706, such as a protrusion, matched to a corresponding feature on the valve mechanism, such as the notch 4004 described with respect to FIG. 40. In this drawing, the guide ring that will hold the seal ring 3706 in place, and will later be used to guide a build material container into contact with the seal ring 3706, is removed. The removal of the guide ring, and the seal ring 3706, may be performed from the front of the supply station, allowing the seal ring to be easily replaced without significant disassembly of the 3D printer or supply station.

Figure 42:
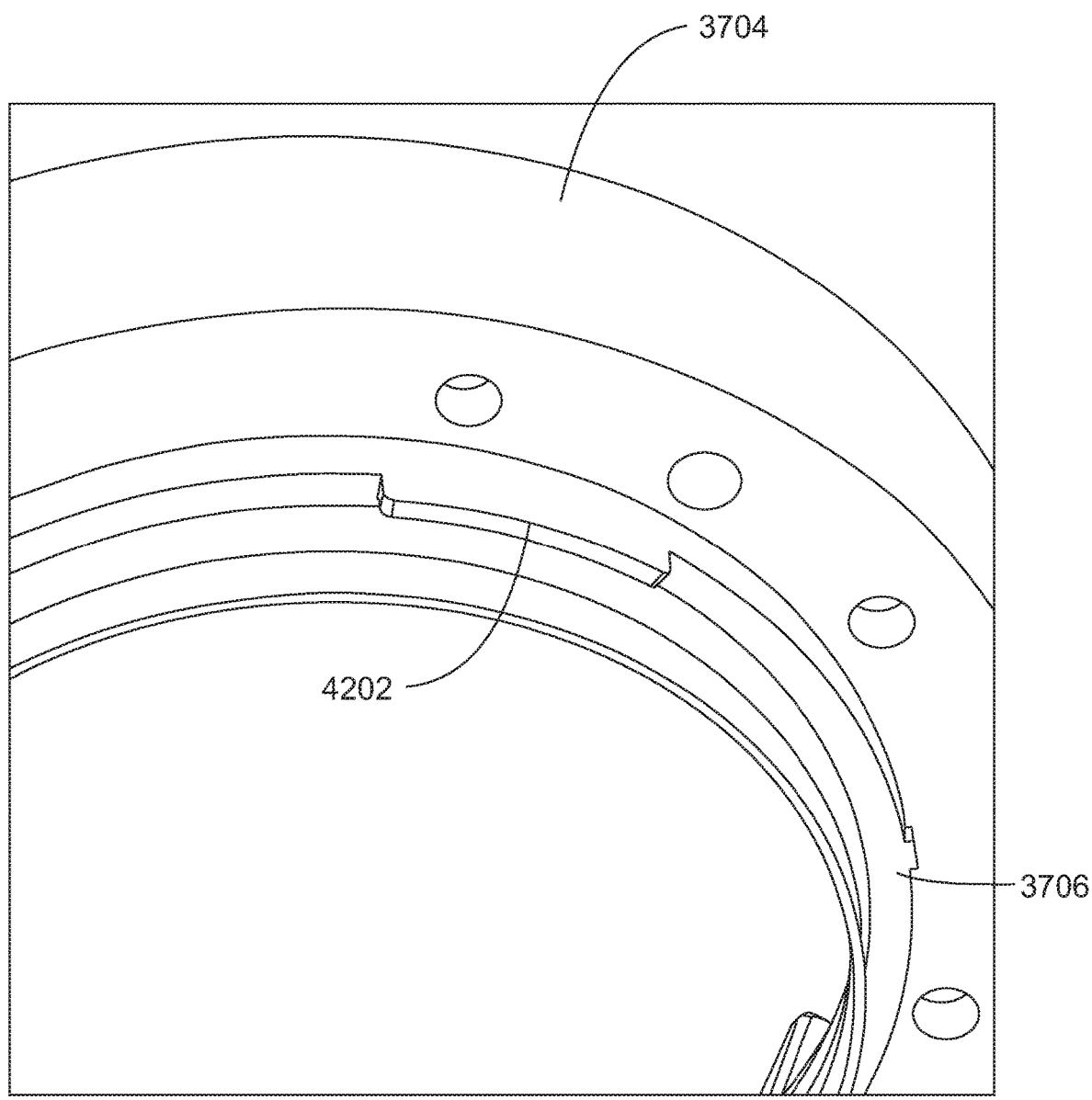
FIG. 42 is a drawing of a backside of a seal ring and a guide ring, in accordance with examples.

FIG. 42 is a drawing of a backside of a seal ring 3706 and a guide ring 3704, in accordance with examples. Like numbered items are as described with respect to previous figures. In the example of FIG. 42, the protrusion 4202 on the back side of the seal ring 3706 is shown. This protrusion 4202 may align with the notch 4004 as the seal ring 3706 is seated on the face 4002 of the valve mechanism.

Figure 43:
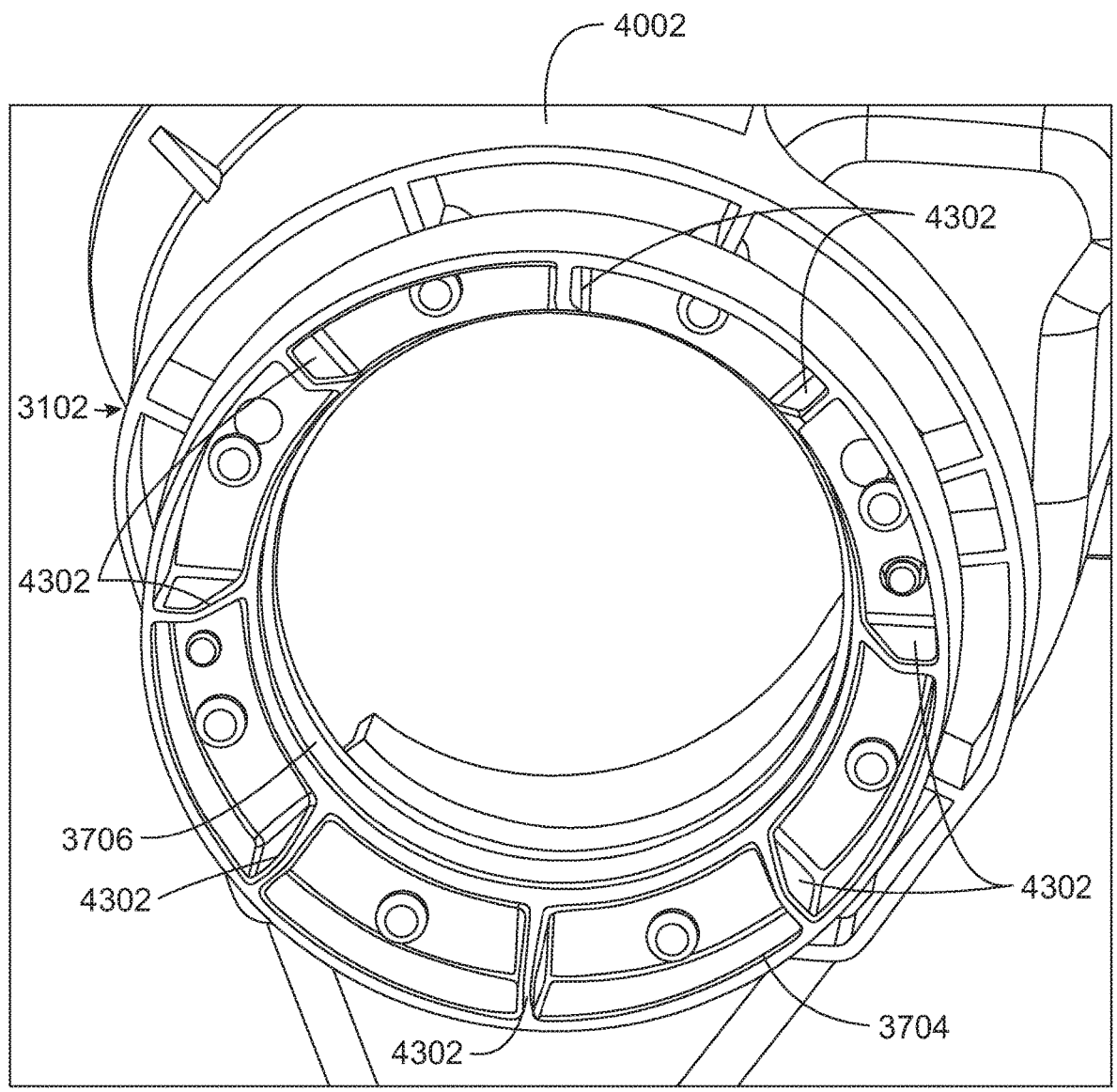
FIG. 43 is a drawing of the face of the valve mechanism with the seal ring and guide ring installed, in accordance with examples.

FIG. 43 is a drawing of the face 4002 of the valve mechanism with the seal ring 3706 and guide ring 3704 installed, in accordance with examples. Like numbered items are as described with respect to previous figures. In this view, guide tabs 4302, formed into the guide ring 3706, are clearly visible. The guide tabs 4302 align the build material container during insertion, helping to direct the build material container into contact with the seal ring 3706. Once the build material container latches into place in the cylindrical cage, the build material container remains in contact with the seal ring 3706.

Figure 44:
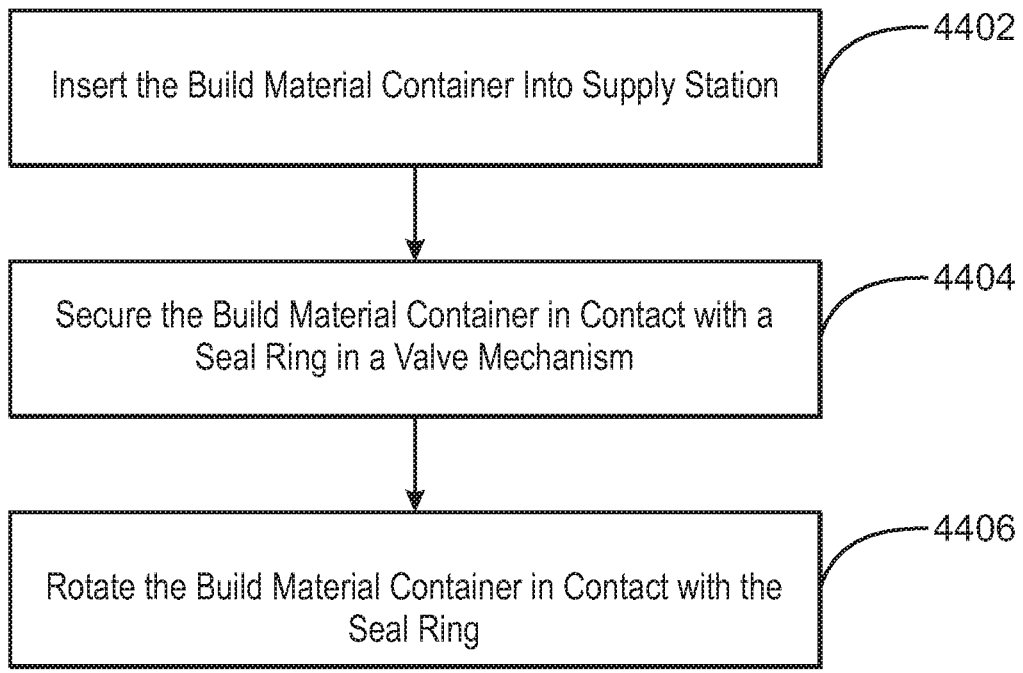
FIG. 44 is a block diagram of a method for sealing a build material container in a supply station, in accordance with examples.

FIG. 44 is a block diagram of a method 4400 for sealing a build material container in a supply station, in accordance with examples. The method begins at block 4402, when the build material container is inserted into the supply station. The build material container is guided into contact with a seal ring by a guide ring. At block 4404, the build material container is secured in contact with the seal ring in a valve mechanism. At block 4406, the build material container is rotated in contact with the seal ring. Material may then be moved between the build material container in the valve mechanism while the seal ring prevents a loss of build material.

While the present techniques may be susceptible to various modifications and alternative forms, the examples discussed above have been shown by way of example. It is to be understood that the techniques are not intended to be limited to the particular examples disclosed herein. Indeed, the present techniques include all alternatives, modifications, and equivalents falling within the scope of the present techniques.

What is claimed is:

1. A supply station for dispensing build material from a build material container, comprising:
   a stationary support structure supporting a cylindrical cage along an axis, wherein the cylindrical cage is configured to releasably receive and retain the build material container and to be rotated in a first angular direction to rotate the build material container to dispense build material from the build material container, wherein the cylindrical cage comprises:
   a flat surface positioned upon an interior-facing curved surface of the cylindrical cage, the flat surface to align the build material container within the cylindrical cage; and
   a latching mechanism extending from the flat surface, the latching mechanism to lock the build material container in place within the cylindrical cage.

2. The supply station of claim 1, wherein the cylindrical cage is configured to be rotated in a second angular direction, opposite the first angular direction, to add build material to the build material container.

3. The supply station of claim 1, comprising a valve mechanism configured to actuate a valve on the build material container.

4. The supply station of claim 1, wherein the stationary support structure comprises a motor coupled to the cylindrical cage through a drive belt, wherein the drive belt passes through a bidirectional belt tensioner.

5. The supply station of claim 1, wherein the latching mechanism extends a latch up from the flat surface in the cylindrical cage to engage indentations on the build material container.

6. The supply station of claim 1, wherein the latching mechanism comprises a flag that is moved when a build material container is secured in place within the cylindrical cage.

7. The supply station of claim 6, wherein the stationary support structure comprises a sensor to detect the flag.

8. The supply station of claim 1, wherein the stationary support structure comprises a reader configured to couple to an information chip on the build material container.

9. The supply station of claim 1, wherein the stationary support structure comprises a brake mechanism configured to engage openings along the cylindrical cage and hold the cylindrical cage in a base position.

10. The supply station of claim 1, wherein the flat surface is configured to support a flat bottom of the build material container oriented along a horizontal axis of the cylindrical cage.

11. The supply station of claim 1, wherein the cylindrical cage further comprises an actuating surface to actuate the latching mechanism in response to contact by the build material container.

12. The supply station of claim 11, wherein the contact by the build material container on the actuating surface causes the latching mechanism to extend out from the flat surface to engage the build material container.

13. The supply station of claim 11, wherein the cylindrical cage further comprises a release mechanism to retract the latching mechanism into the cylindrical cage under the flat surface.

14. The supply station of claim 1, wherein the flat surface is configured to orient the build material container in a base position in the supply station, wherein the base position is to align a reading head of the supply station with an information chip mounted to the build material container.

* * * * *